US012099229B2

(12) United States Patent
Yagi et al.

(10) Patent No.: US 12,099,229 B2
(45) Date of Patent: Sep. 24, 2024

(54) ILLUMINATION DEVICE AND DISPLAY DEVICE

(71) Applicant: Sharp Display Technology Corporation, Mie (JP)

(72) Inventors: Shugo Yagi, Mie (JP); Junichi Masuda, Mie (JP); Yuuichi Kanbayashi, Mie (JP); Satoshi Tsubooka, Mie (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/113,022

(22) Filed: Feb. 22, 2023

(65) Prior Publication Data

US 2023/0296821 A1    Sep. 21, 2023

(30) Foreign Application Priority Data

Feb. 28, 2022  (JP) .................................. 2022-029143

(51) Int. Cl.
*F21V 8/00*    (2006.01)
(52) U.S. Cl.
CPC .......... *G02B 6/0036* (2013.01); *G02B 6/0046* (2013.01); *G02B 6/0053* (2013.01); *G02B 6/0068* (2013.01); *G02B 6/0076* (2013.01)
(58) Field of Classification Search
CPC .. G02B 6/0036; G02B 6/0046; G02B 6/0053; G02B 6/0068; G02B 6/0076
See application file for complete search history.

(56) References Cited

U.S. PATENT DOCUMENTS

| 2003/0123262 A1 | 7/2003 | Suehiro et al. |
| 2005/0024890 A1 | 2/2005 | Yamamoto et al. |
| 2007/0189033 A1 | 8/2007 | Watanabe et al. |
| 2017/0069236 A1 | 3/2017 | Klippstein et al. |
| 2021/0041620 A1 | 2/2021 | Kijima et al. |
| 2021/0294023 A1 | 9/2021 | Kijima et al. |
| 2021/0311242 A1 | 10/2021 | Yagi et al. |
| 2022/0238763 A1* | 7/2022 | Ho .......................... G02B 6/006 |
| 2023/0101373 A1* | 3/2023 | Kim ..................... G02B 6/0036 362/613 |

FOREIGN PATENT DOCUMENTS

| JP | 2001210120 A | 8/2001 |
| JP | 2003173712 A | 6/2003 |
| JP | 2005011689 A | 1/2005 |

(Continued)

*Primary Examiner* — Evan P Dzierzynski
*Assistant Examiner* — Jessica M Apenteng
(74) *Attorney, Agent, or Firm* — ScienBiziP, P.C.

(57) ABSTRACT

According to an aspect of the disclosure, an illumination device includes: a first light source; a first light guide plate including at least a part of an outer circumferential end face as a first end face configured to face the first light source and receive incident light, a first main surface, and a second main surface; a first sheet including one main surface as a third main surface configured to face the first main surface and a fourth main surface; a second light source; and a second light guide plate including at least a part of an outer circumferential end face as a second end face configured to face the second light source, a fifth main surface, and a sixth main surface configured to face the fourth main surface.

14 Claims, 36 Drawing Sheets

(56) References Cited

FOREIGN PATENT DOCUMENTS

| | | | |
|---|---|---|---|
| JP | 2007220347 | A | 8/2007 |
| JP | 3226894 | U | 7/2020 |
| JP | 2021026905 | A | 2/2021 |
| JP | 2021043251 | A | 3/2021 |
| JP | 2021163724 | A | 10/2021 |

\* cited by examiner

| | | REFERENCE EXAMPLE | EXAMPLE 1 | COMPARATIVE EXAMPLE 1 | COMPARATIVE EXAMPLE 2 | COMPARATIVE EXAMPLE 3 |
|---|---|---|---|---|---|---|
| SECOND LIGHT GUIDE PLATE | FOURTH LIGHT GUIDE PLATE LENS | NONE | YES | YES | NONE | NONE |
| | FIFTH LIGHT GUIDE PLATE LENS | NONE | YES | YES | YES | NONE |
| | SIXTH LIGHT GUIDE PLATE LENS | NONE | YES | NONE | YES | YES |
| RATIO | −25° | 3.2% | 6.4% | 4.1% | 8.3% | 16.9% |
| | −35° | 1.8% | 4.1% | 2.6% | 5.0% | 11.9% |
| | −45° | 1.4% | 1.4% | 2.2% | 2.3% | 5.0% |
| PEAK BRIGHTNESS (%) | | 100 | 47 | 53 | 39 | 51 |

FIG. 15

ILLUMINATION DEVICE AND DISPLAY DEVICE

CROSS-REFERENCE TO RELATED APPLICATIONS

This application claims the benefit of priority to Japanese Patent Application Number 2022-029143 filed on Feb. 28, 2022. The entire contents of the above-identified application are hereby incorporated by reference.

BACKGROUND

The techniques disclosed in the present specification relate to illumination devices and display devices.

TECHNICAL FIELD

An illumination device described in US 2017/0069236 A is known as an example of an illumination device in the related art. The illumination device described in US 2017/0069236 A operates in at least two operation modes, that is, a free viewing mode and a restricted viewing mode. The illumination device includes a backlight system. A light guide plate is disposed in front of the backlight system, and a light source is disposed along a side surface of the light guide plate. The light guide plate includes diffusion particles formed of a polymer in a dispersed and mixed manner in a resin base material, and has a light transmittance of at least 80%. In the free viewing mode, the backlight system is turned on, and the light source is turned off. In the restricted viewing mode, the light source is turned on, and the backlight system is turned off.

Since the light guide plate provided in the illumination device described in US 2017/0069236 A described above contains diffusion particles, light emitted from the light source and incident on the light guide plate is diffused by the diffusion particles in the restricted viewing mode. Thus, there is a problem that emission of light outside of an angle range restricted in the restricted viewing mode is likely to occur, making it difficult to emit light only in the restricted angle range. In addition, since the light guide plate has a high light transmittance of at least 80%, light from the backlight system is not sufficiently diffused in a process of transmitting through the light guide plate in the free viewing mode. Thus, there is a problem that brightness of emission light in a direction inclined with respect to a front direction is insufficient in the free viewing mode.

The techniques described in the present specification have been made based on the circumstances described above, and an object thereof is to suppress emission of light outside of a restricted angle range, and to improve brightness of emission light in a direction inclined with respect to a front direction.

SUMMARY (1) An illumination device according to the techniques described in the present specification includes: a first light source; a first light guide plate including at least a part of an outer circumferential end face as a first end face configured to face the first light source and receive incident light, including one main surface as a first main surface configured to emit light, and including an other main surface as a second main surface; a first sheet including one main surface as a third main surface configured to face the first main surface and receive incident light, and including an other main surface as a fourth main surface configured to emit light; a second light source; and a second light guide plate including at least a part of an outer circumferential end face as a second end face configured to face the second light source and receive incident light, including one main surface as a fifth main surface configured to emit light, and including an other main surface as a sixth main surface configured to face the fourth main surface, wherein the first sheet includes at least two first light blocking portions and a first light-transmitting portion, the two first light blocking portions being disposed at an interval in a first direction including a direction from the first light source toward the first light guide plate and being configured to block light, and the first light-transmitting portion being disposed between the two first light blocking portions and being configured to transmit light, and the sixth main surface of the second light guide plate is provided with a first lens including a first inclined surface having an inclination rising from a side opposite to the second light source in the first direction toward the second light source side.

(2) Further, in addition to (1) described above, in the illumination device, the first inclined surface may have an angle formed with respect to the first direction in a range from 27° to 40°.

(3) Further, in addition to (1) or (2) described above, in the illumination device, the first lens may include a second inclined surface having an inclination rising from the second light source in the first direction toward the side opposite to the second light source.

(4) Further, in addition to (3) described above, in the illumination device, the second inclined surface may have an angle formed with respect to the first direction in a range from 3° to 10°.

(5) Further, in addition to (3) or (4) described above, in the illumination device, the first lens may include a first plane located between the first inclined surface and the second inclined surface in the first direction and disposed along the first direction.

(6) In addition to any of (3) to (5) described above, in the illumination device, a plurality of the first lenses may be disposed side by side in the first direction, and the sixth main surface of the second light guide plate may be provided with a second plane located between two of the first lenses adjacent to each other in the first direction and disposed along the first direction.

(7) Further, in addition to (1) or (2) described above, in the illumination device, the first lens may include a first plane adjacent to the first inclined surface in the first direction and disposed along the first direction, and a plurality of the first lenses may be disposed side by side in the first direction, and, among three of the first lenses included in a plurality of the first lenses and aligned continuously in the first direction, the first inclined surface provided in the first lens located at the center in the first direction may be connected to the first plane provided in the adjacent first lens on the side opposite to the second light source in the first direction, and the first plane provided in the first lens located at the center in the first direction may be connected to the first inclined surface provided in the adjacent first lens on the second light source side in the first direction.

(8) Further, in addition to any of (1) to (7) described above, in the illumination device, the fifth main surface of the second light guide plate may be provided with a plurality of second lenses disposed side by side along a second direction orthogonal to both of the first direction and a normal direction of the main surface of the first light guide plate, the plurality of second lenses extending along the first direction.

(9) Further in addition to any of (1) to (8) described above, in the illumination device, the sixth main surface of the second light guide plate may be provided with a plurality of third lenses disposed side by side at an interval along a second direction orthogonal to both of the first direction and a normal direction of the main surface of the first light guide plate, the plurality of third lenses extending along the first direction, and a plurality of the first lenses may be disposed in an alternating manner with the plurality of third lenses in the second direction.

(10) Further, in addition to (9) described above, in the illumination device, the plurality of third lenses may include a central side third lens, and an end side third lens located closer to an end side in the second direction in the sixth main surface than the central side third lens, the plurality of the first lenses may include a central side first lens, and an end side first lens located closer to the end side in the second direction in the sixth main surface than the central side first lens, a dimension of the end side third lens in the second direction may be smaller than a dimension of the central side third lens in the second direction, and a dimension of the end side first lens in the second direction may be greater than a dimension of the central side first lens in the second direction.

(11) Further, in addition to any of (1) to (10) described above, in the illumination device, a plurality of the first lenses may be disposed side by side in the first direction, and the plurality of the first lenses may include one first lens including a gentle inclined surface as the first inclined surface, and may include an other first lens including, as the first inclined surface, a steep inclined surface having an angle with respect to the first direction greater than an angle of the gentle inclined surface.

(12) Further, in addition to any of (1) to (11) described above, the illumination device may further include: a first prism sheet including one main surface facing the first main surface, the first prism sheet including a plurality of first prisms disposed side by side along the first direction and configured to extend along a second direction orthogonal to both of the first direction and a normal direction of the main surface of the first light guide plate; and a second prism sheet located on a side opposite to the first light guide plate with respect to the first prism sheet, the second prism sheet including a plurality of second prisms disposed side by side along the first direction and configured to extend along the second direction, wherein the first prism may include a third inclined surface having an inclination rising from the first light source side in the first direction in the first prism sheet toward a side opposite to the first light source, and may include a fourth inclined surface having an inclination rising from the side opposite to the first light source in the first direction in the first prism sheet toward the first light source side, the second prism may include a fifth inclined surface having an inclination rising from the first light source side in the first direction in the second prism sheet toward the side opposite to the first light source, and may include a sixth inclined surface having an inclination rising from the side opposite to the first light source in the first direction in the second prism sheet toward the first light source side, and an angle formed by the fifth inclined surface in the second prism with respect to the first direction may be smaller than an angle formed by the third inclined surface in the first prism with respect to the first direction.

(13) Further, in addition to any of (1) to (12) described above, the illumination device may further include: a second sheet including one main surface as a seventh main surface configured to face the fourth main surface and receive incident light, and including an other main surface as an eighth main surface configured to emit light; and a third sheet including one main surface as a ninth main surface configured to face the eighth main surface and receive incident light, and including an other main surface as a tenth main surface configured to face the sixth main surface and emit light, wherein the second sheet may include a fourth lens disposed on the seventh main surface or the eighth main surface, the third sheet may include at least two second light blocking portions and a second light-transmitting portion, the two second light blocking portions being disposed at an interval in the first direction and being configured to block light, and the second light-transmitting portion being disposed between the two second light blocking portions and being configured to transmit light, the fourth lens may include a seventh inclined surface having an inclination rising from an end side in the first direction in the second sheet toward a central side, and the third sheet may have a ratio acquired by dividing a width of the second light-transmitting portion by a height of the second light-transmitting portion being greater than a ratio acquired by dividing a width of the first light-transmitting portion by a height of the first light-transmitting portion.

(14) Further, in addition to any of (1) to (13) described above, in the illumination device, the first light source may be disposed on one side in the first direction with respect to the first light guide plate, and the second light source may be disposed on the other side in the first direction with respect to the second light guide plate.

(15) A display device according to the techniques described in the present specification includes the illumination device according to any of (1) to (14) described above, and a display panel configured to perform display by using light from the illumination device.

The techniques described herein can suppress emission of light outside of a restricted angle range, and can improve brightness of emission light in a direction inclined with respect to a front direction.

BRIEF DESCRIPTION OF DRAWINGS

FIG. 15 is a table showing an experimental result of Comparative Experiment 1.

DESCRIPTION OF EMBODIMENTS

The disclosure will be described with reference to the accompanying drawings, wherein like numbers reference like elements.

First Embodiment

A first embodiment will be described with reference to FIGS. 1 to 23. In the present embodiment, a liquid crystal display device 10 (a display device) is exemplified. Note that an X axis, a Y axis, and a Z axis are illustrated in part of each drawing, and each axial direction is illustrated to represent a direction in each drawing. Furthermore, a vertical direction is based on the vertical direction of FIG. 2 and FIG. 3, an upper side of the same drawing is referred to as a front side, and a lower side of the same drawing is referred to as a back side.

Figure 1:
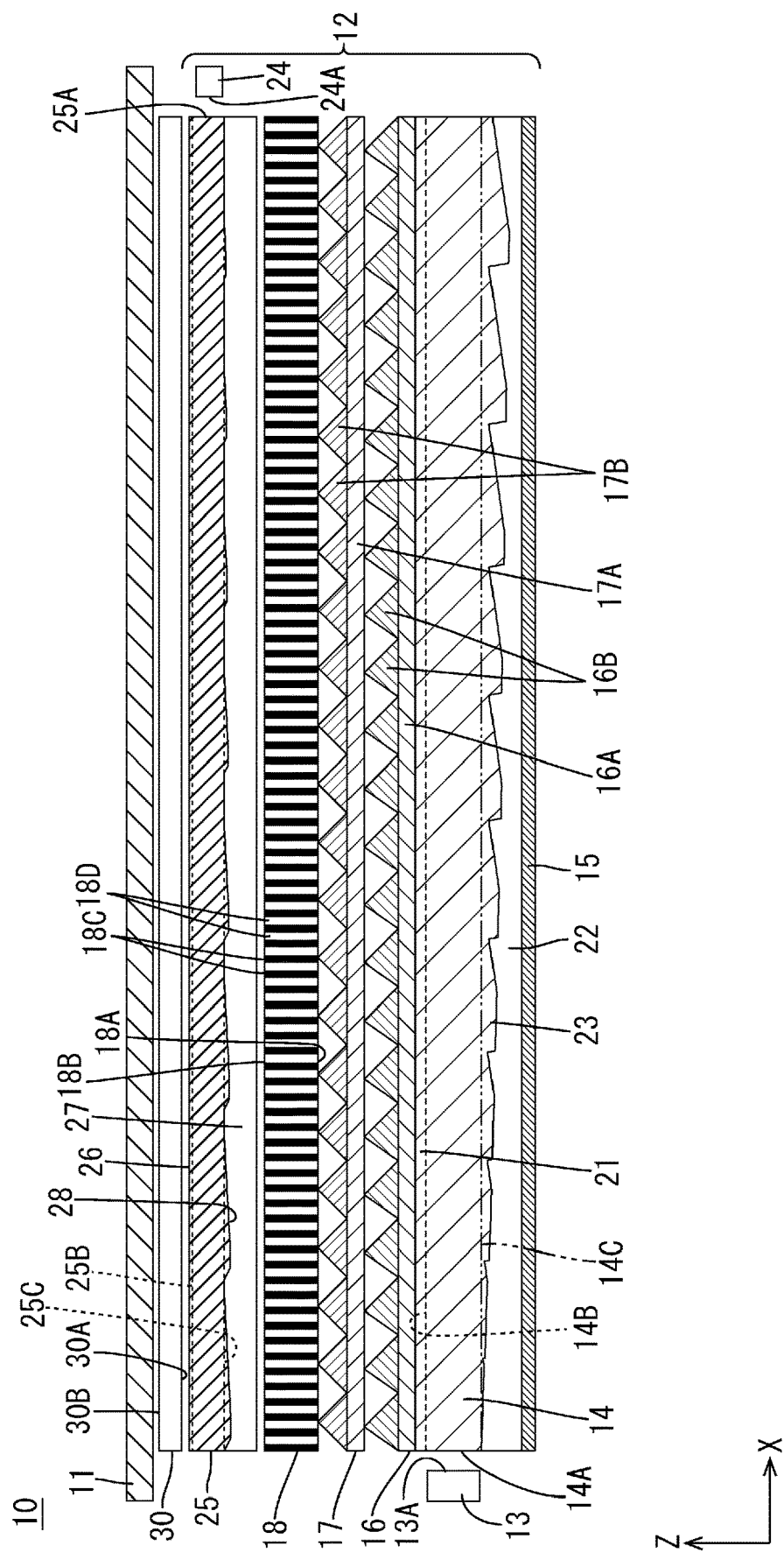
FIG. 1 is a side cross-sectional view of a liquid crystal display device according to a first embodiment.

As illustrated in FIG. 1, the liquid crystal display device 10 includes a liquid crystal panel (display panel) 11 configured to display an image, and a backlight device (illumination device) 12 disposed at a back side of the liquid crystal panel 11 and configured to irradiate the liquid crystal panel 11 with light to be used for display. In the present embodiment, the liquid crystal display device 10 being for vehicle application is exemplified. For example, the liquid crystal display device 10 for vehicle application is mounted on a car navigation system for displaying a map and the like as an image, a multi-function display that displays an operation situation and the like of equipment such as an air conditioner, in addition to a map and the like, as an image, an instrument panel that displays gauges, alerts, and the like as an image, an infotainment system for displaying a television image, audio information, and the like, in addition to a map and the like, as an image, and the like.

The liquid crystal panel 11 has a plate shape in which a main surface is parallel to the X-axis direction and the Y-axis direction, and a normal direction (thickness direction) of the main surface coincides with the Z-axis direction. In the liquid crystal panel 11, a central side portion of the main surface is a display region that can display an image, and an outer circumferential end side portion surrounding the display region and having a frame shape is a non-display region. The liquid crystal panel 11 includes a pair of substrates and a liquid crystal layer sealed between the pair of substrates. Of the pair of substrates constituting the liquid crystal panel 11, a CF substrate (counter substrate) is disposed on the front side, and an array substrate (TFT substrate) is disposed on the back side. Color filters that exhibit red (R), green (G), blue (B), and the like, a light blocking portion (black matrix) that partitions adjacent color filters, and the like are provided on the CF substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Note that an alignment film is provided on each inner face of the array substrate and the CF substrate constituting the liquid crystal panel 11. Further, a polarizer is attached to each outer face of the array substrate and the CF substrate constituting the liquid crystal panel 11.

Next, the backlight device 12 will be described. As illustrated in FIG. 1, the backlight device 12 includes at least a first LED (first light source) 13, a first light guide plate 14 that guides light from the first LED 13, a reflective sheet 15 disposed on a back side (opposite light emission side) of the first light guide plate 14, a first prism sheet 16 disposed on a front side (light emission side) of the first light guide plate 14, and a second prism sheet 17 disposed on a front side of the first prism sheet 16.

As illustrated in FIG. 1, the first LED 13 has a substantially block shape, and one face of a pair of faces along the Y-axis direction and the Z-axis direction is a first light-emitting face 13A that emits light. A plurality of the first LEDs 13 are disposed side by side at an interval along the Y-axis direction. The first LED 13 is mounted on an LED substrate. The first LED 13 has a configuration in which an LED chip is sealed with a sealing material on a substrate portion mounted on the LED substrate. The LED chip provided in the first LED 13 emits light of a single color, for example, blue light. A phosphor is dispersed and mixed in the sealing material provided in the first LED 13. The phosphor contained in the sealing material includes a yellow phosphor, a green phosphor, a red phosphor, and the like. The first LED 13 including such an LED chip and such a sealing material emits white light as a whole.

The first light guide plate 14 is formed of a synthetic resin material (for example, acrylic resin such as PMMA or the like) that has a sufficiently higher refractive index than that of the air and that is substantially transparent. As illustrated in FIG. 1, the first light guide plate 14 has a plate shape, and a main surface of the first light guide plate 14 is parallel to the main surface of the liquid crystal panel 11. Note that the main surface of the first light guide plate 14 is parallel to the X-axis direction and the Y-axis direction, and a normal direction (thickness direction) of the main surface coincides with the Z-axis direction. The first light guide plate 14 is aligned along the X-axis direction (first direction) with respect to the first LED 13, and is also disposed side by side along the Z-axis direction with respect to the liquid crystal panel 11 and each of the prism sheets 16 and 17. The first light guide plate 14 is disposed on one side (right side in FIG. 1) of the first LED 13 in the X-axis direction. One end face of an outer circumferential end face of the first light guide plate 14 is a first light entering end face (first end face) 14A facing the first light-emitting face 13A of the first LED 13. The first light entering end face 14A is a face parallel to the first light-emitting face 13A of the first LED 13, and light emitted from the first light-emitting face 13A is incident on the first light entering end face 14A. Therefore, it can be said that the first LED 13 is disposed only on one side of the first light guide plate 14 in the X-axis direction, and the first light guide plate 14, together with the first LED 13, constitute a backlight unit of a one-side light entering type. A main surface on the front side facing the first prism sheet 16 of a pair of the main surfaces in the first light guide plate 14 is a first light guide plate-light emission main surface (first main surface) 14B that emits light guided through the inside of the first light guide plate 14. A main surface on a back side facing the reflective sheet 15 of the pair of main surfaces in the first light guide plate 14 is a first opposite main surface (second main surface) 14C located on a side opposite to the first light guide plate-light emission main surface 14B. Then, the first light guide plate 14 has a function of introducing, from the first light entering end face 14A, light emitted from the first LED 13 toward the first light guide plate 14, propagating the light therein, then, allowing the light to rise along the Z-axis direction such that the light is directed toward the front side (light emission side), and emitting the light. A detailed structure of the first light guide plate 14 will be described later. Note that the normal direction of the first light entering end face 14A coincides with the X-axis direction (an alignment direction of the first LED 13 and the first light guide plate 14).

As illustrated in FIG. 1, the reflective sheet 15 has a main surface parallel to each of the main surfaces of the liquid crystal panel 11 and the first light guide plate 14, and is also disposed so as to cover the first opposite main surface 14C of the first light guide plate 14. The reflective sheet 15 has excellent light reflectivity, and can efficiently cause light leaked from the first opposite main surface 14C of the first light guide plate 14 to rise toward the front side, that is, toward the first light guide plate-light emission main surface 14B. The reflective sheet 15 has an outer shape slightly larger than that of the first light guide plate 14, and is disposed so as to overlap substantially all over the first opposite main surface 14C.

As illustrated in FIG. 1, the first prism sheet 16 and the second prism sheet 17 have a sheet shape, and each main surface is parallel to each of the main surfaces of the liquid crystal panel 11 and the first light guide plate 14. Note that the main surfaces of the first prism sheet 16 and the second prism sheet 17 are parallel to the X-axis direction and the Y-axis direction, and a normal direction (thickness direction) of the main surface coincides with the Z-axis direction. The first prism sheet 16 and the second prism sheet 17 are layered on the front side of the first light guide plate 14, and have a function of providing a predetermined optical action to light emitted from the first light guide plate-light emission main surface 14B of the first light guide plate 14 to emit the light, and the like.

As illustrated in FIG. 1, the first prism sheet 16 includes a first base material 16A having a sheet shape, and a first prism 16B provided on a main surface (light emission main surface) on a front side (light emission side) of the first base material 16A. The first base material 16A is formed of a substantially transparent synthetic resin, and specifically, is formed of, for example, a crystalline transparent resin material such as polyethylene terephthalate (PET). The first base material 16A is formed into a sheet shape by stretching the crystalline transparent resin material serving as a raw material in a biaxially stretching process in manufacturing, which is suitable for reducing manufacturing costs. The first prism 16B is formed of an ultraviolet-curing resin material being substantially transparent and being a type of photo-curable resin material. In manufacturing the first prism sheet 16, for example, an uncured ultraviolet-curing resin material is filled into a mold for molding, and the first base material 16A is also applied to an opening end of the mold to dispose the uncured ultraviolet-curing resin material so as to contact the main surface on the front side, and in this state, when the ultraviolet-curing resin material is irradiated with ultraviolet rays through the first base material 16A, the ultraviolet-curing resin material is cured, and the first prism 16B is integrally provided with the first base material 16A. The ultraviolet-curing resin material constituting the first prism 16B is, for example, an acrylic resin such as PMMA. A refractive index of the ultraviolet-curing resin material constituting the first prism 16B is preferably set within a range from 1.49 to 1.52, and is most preferably set to 1.49.

Figure 2:
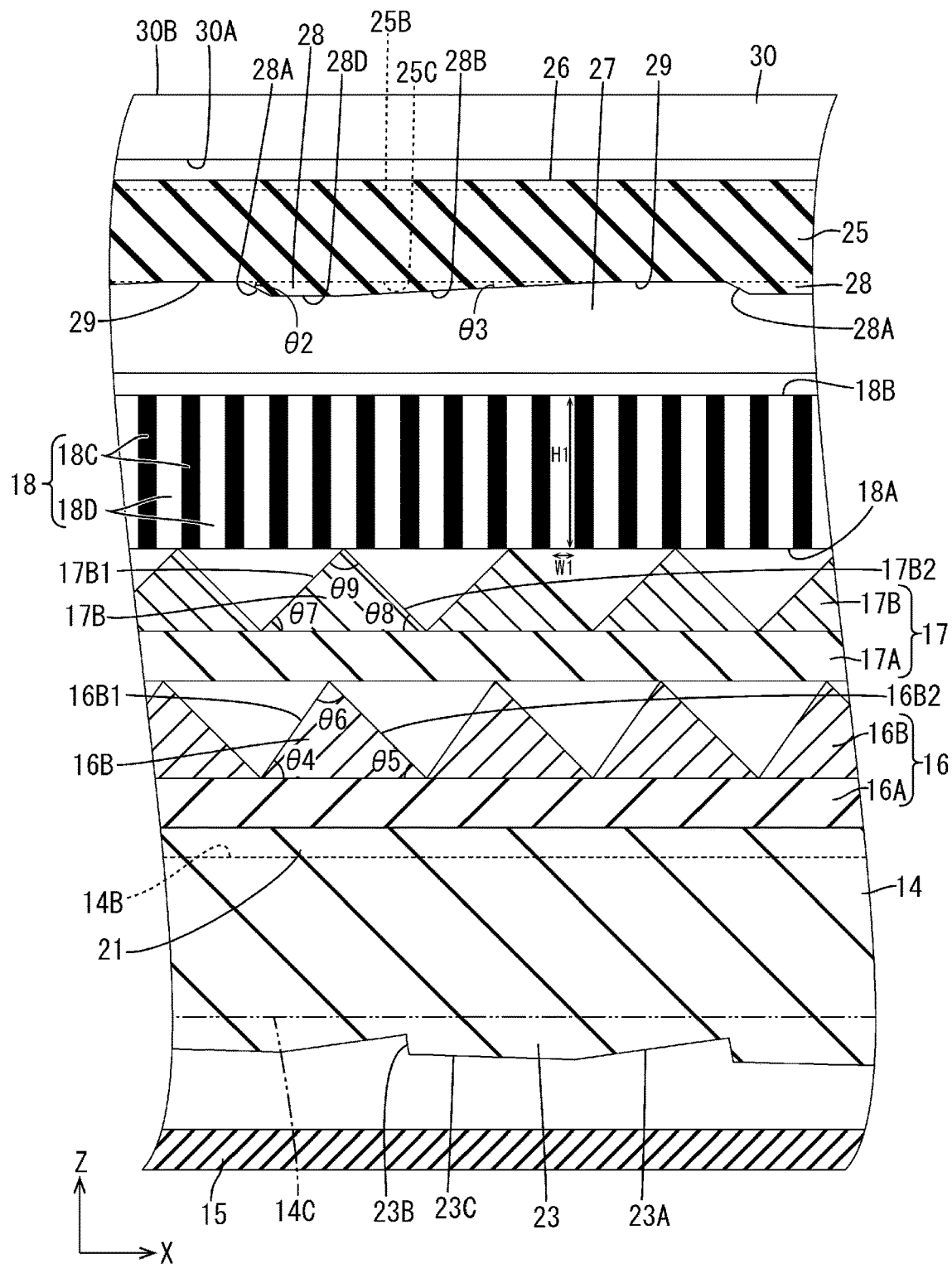
FIG. 2 is a side cross-sectional view of a backlight device provided in the liquid crystal display device.

As illustrated in FIG. 2, the first prism 16B is provided so as to protrude from the main surface of the first base material 16A toward the front side (side opposite to the first light guide plate 14 side) along the Z-axis direction. The first prism 16B has a substantially triangular shape (is substantially mountain shaped) in a cross section taken along the X-axis direction and also extends linearly along the Y-axis direction (second direction), and a plurality of the first prisms 16B are continuously disposed side by side with substantially no interval along the X-axis direction (first direction) on the main surface of the first base material 16A. The first prism 16B includes a pair of inclined surfaces 16B1 and 16B2. Of the pair of inclined surfaces 16B1 and 16B2 in the first prism 16B, the inclined surface on the first LED 13 side in the X-axis direction is a first prism inclined surface (third inclined surface) 16B1, and the inclined surface on a side opposite to the first prism inclined surface 16B1 is a second prism inclined surface (fourth inclined surface) 16B2. The first prism inclined surface 16B1 has an inclination rising from the first LED 13 side (left side in FIG. 2) in the first prism sheet 16 toward a side opposite (right side in FIG. 2) to the first LED 13 side in the X-axis direction. The first prism inclined surface 16B1 is exposed mainly to light traveling toward the first LED 13 in the X-axis direction, of light incident on the first prism 16B, to refract the light. The second prism inclined surface 16B2 has an inclination rising from the side opposite (right side in FIG. 2) to the first LED 13 side in the first prism sheet 16 toward the first LED 13 side (left side in FIG. 2) in the X-axis direction. The second prism inclined surface 16B2 is exposed mainly to light traveling away from the first LED 13 in the X-axis direction, of light incident on the first prism 16B, to refract the light. Most of the light refracted by the pair of inclined surfaces 16B1 and 16B2 in the first prism 16B is selectively raised and condensed in the X-axis direction.

Then, as illustrated in FIG. 2, in the first prism 16B, when comparing an inclination angle (third base angle) θ4 formed by the first prism inclined surface 16B1 with respect to the X-axis direction, and an inclination angle (fourth base angle) θ5 formed by the second prism inclined surface 16B2 with respect to the X-axis direction, the former is greater than the latter. In other words, the first prism 16B has an asymmetrical cross-sectional shape, which is a scalene triangle. Specifically, the inclination angle θ4 of the first prism inclined surface 16B1 with respect to the X-axis direction is preferably set within a range from 50° to 60°, and is most preferably set to 55°. In contrast, the inclination angle θ5 of the second prism inclined surface 16B2 with respect to the X-axis direction is preferably set within a range from 35° to 50°, and is most preferably set to 45°. Further, an angle (second apex angle) θ6 formed by the pair of inclined surfaces 16B1 and 16B2 in the first prism 16B is preferably set within a range from 70° to 95°, and is most preferably set to 80°. Note that all the plurality of first prisms 16B aligned along the Y-axis direction have substantially the same height dimension, substantially the same width dimension, substantially the same inclination angle of each of the inclined surfaces 16B1 and 16B2 with respect to the X-axis direction, and the like, and are also arranged such that arrangement intervals between the adjacent first prisms 16B are substantially constant and equal.

As illustrated in FIG. 1, the second prism sheet 17 includes a second base material 17A having a sheet shape, and a second prism 17B provided on a main surface (light emission main surface) on a front side (light emission side) of the second base material 17A. The second base material 17A is formed of a substantially transparent synthetic resin, and specifically, is formed of, for example, a crystalline transparent resin material such as PET being the same as that of the first base material 16A. The second prism 17B is formed of an ultraviolet-curing resin material being substantially transparent and being a type of photo-curable resin material. A manufacturing method of the second prism sheet 17 is similar to the manufacturing method of the first prism sheet 16 described above. The ultraviolet-curing resin material constituting the second prism 17B is, for example, an acrylic resin such as PMMA, and a refractive index of the ultraviolet-curing resin material is set higher than the refractive index of the material of the first prism 16B, and is set to, for example, approximately 1.61.

As illustrated in FIG. 2, the second prism 17B is provided so as to protrude from the main surface of the second base material 17A toward the front side (side opposite to the first prism sheet 16 side) along the Z-axis direction. The second prism 17B has a substantially triangular shape (is substantially mountain shaped) in a cross section taken along the X-axis direction and also extends linearly along the Y-axis direction, and a plurality of the second prisms 17B are continuously disposed side by side with substantially no interval along the X-axis direction on the main surface of the second base material 17A. The second prism 17B includes a pair of inclined surfaces 17B1 and 17B2. Of the pair of inclined surfaces 17B1 and 17B2 in the second prism 17B, the inclined surface on the first LED 13 side in the X-axis direction is a third prism inclined surface (fifth inclined surface) 17B1, and the inclined surface on a side opposite to the third prism inclined surface 17B1 is a fourth prism inclined surface (sixth inclined surface) 17B2. The third prism inclined surface 17B1 has an inclination rising from the first LED 13 side (left side in FIG. 2) in the second prism sheet 17 toward a side opposite (right side in FIG. 2) to the first LED 13 side in the X-axis direction. The third prism inclined surface 17B1 is exposed mainly to light traveling toward the first LED 13 in the X-axis direction, of light incident on the second prism 17B, to refract the light. The fourth prism inclined surface 17B2 has an inclination rising from the side opposite (right side in FIG. 2) to the first LED 13 side in the second prism sheet 17 toward the first LED 13 side (left side in FIG. 2) in the X-axis direction. The fourth prism inclined surface 17B2 is exposed mainly to light traveling away from the first LED 13 in the X-axis direction, of light incident on the second prism 17B, to refract the light. Most of the light refracted by the pair of inclined surfaces 17B1 and 17B2 in the second prism 17B is selectively raised and condensed in the X-axis direction.

Then, as illustrated in FIG. 2, in the second prism 17B, an inclination angle (fifth base angle) θ7 formed by the third prism inclined surface 17B1 with respect to the X-axis direction, and an inclination angle (sixth base angle) θ8 formed by the fourth prism inclined surface 17B2 with respect to the X-axis direction are the same. In other words, the second prism 17B has a symmetric cross-sectional shape, which is an isosceles triangle. Moreover, each of the inclination angles θ7 and θ8 of the third prism inclined surface 17B1 and the fourth prism inclined surface 17B2 with respect to the X-axis direction is smaller than the inclination angle θ4 of the first prism inclined surface 16B1 with respect to the X-axis direction. Specifically, each of the inclination angles θ7 and θ8 of the third prism inclined surface 17B1 and the fourth prism inclined surface 17B2 with respect to the X-axis direction is preferably set within a range from 40° to 50°, and is most preferably set to 45°. In contrast, an angle (third apex angle) θ9 formed by the pair of inclined surfaces 17B1 and 17B2 in the second prism 17B is preferably set within a range from 80° to 100°, and is most preferably set to 90°, that is, a right angle. Note that all the plurality of second prisms 17B aligned along the Y-axis direction have substantially the same height dimension, substantially the same width dimension, substantially the same inclination angle of each of the surfaces 17B1 and 17B2 with respect to the X-axis direction, and the like, and are also arranged such that arrangement intervals between the adjacent second prisms 17B are substantially constant and equal. In addition, it is preferable that the height dimension and the arrangement interval in the second prism 17B differ from the height dimension and the arrangement interval in the first prism 16B, respectively, in terms of suppressing an occurrence of interference fringes called moire.

The first prism sheet 16 and the second prism sheet 17 having the configuration described above can obtain the following actions and effects. In other words, most of the light emitted from the first light guide plate-light emission main surface 14B of the first light guide plate 14 and incident on the first prism sheet 16 is incident on the second prism inclined surface 16B2 of the first prism 16B and refracted, and then, is raised and emitted, or is directed to the first prism inclined surface 16B1. Here, the first prism 16B has the inclination angle θ4 formed with respect to the X-axis direction greater than the inclination angle θ7 of the second prism 17B formed with respect to the X-axis direction. Thus, as compared to when the angles are the same or a magnitude relationship between the angles is reversed, light incident on the first prism sheet 16 is less likely and incident on the first prism inclined surface 16B1. When the incident light on the first prism sheet 16 is incident on the first prism inclined surface 16B1 of the first prism 16B, the light is not raised when the light is emitted from the first prism 16B, and tends to be more likely to be emitted as side lobe light (stray light). Therefore, when the incident light on the first prism sheet 16 becomes difficult to be directly incident on the first prism inclined surface 16B1 of the first prism 16B, an occurrence of side lobe light is suppressed, and, as a result, usage efficiency of light is improved.

Most of the light emitted from the first prism sheet 16 and incident on the second prism sheet 17 is incident on the fourth prism inclined surface 17B2 of the second prism 17B and refracted, and then, is raised and emitted, or is directed to the third prism inclined surface 17B1. Here, the second prism 17B has the inclination angle θ7 formed with respect to the X-axis direction smaller than the inclination angle θ4 of the first prism 16B formed with respect to the X-axis direction. Thus, as compared to when the angles are the same or a magnitude relationship between the angles is reversed, light refracted by the fourth prism inclined surface 17B2 and directed to the third prism inclined surface 17B1 is more likely to be returned to the first prism sheet 16 side by the third prism inclined surface 17B1. As a result, the amount of the light (hereinafter referred to as recursive light) returned from the second prism sheet 17 to the first prism sheet 16 side is increased. This recursive light reaches the second prism sheet 17 again by being reflected or the like inside the backlight device 12, and is raised and emitted by either of the pair of inclined surfaces 17B1 and 17B2 in the second prism 17B, and thus usage efficiency of light is improved. Since an optical path until the recursive light is emitted from the second prism sheet 17 is complicated, a rise angle provided by the second prism 17B is also diversified, thereby improving viewing angle characteristics. As described above, viewing angle characteristics and brightness can be improved.

Figure 3:
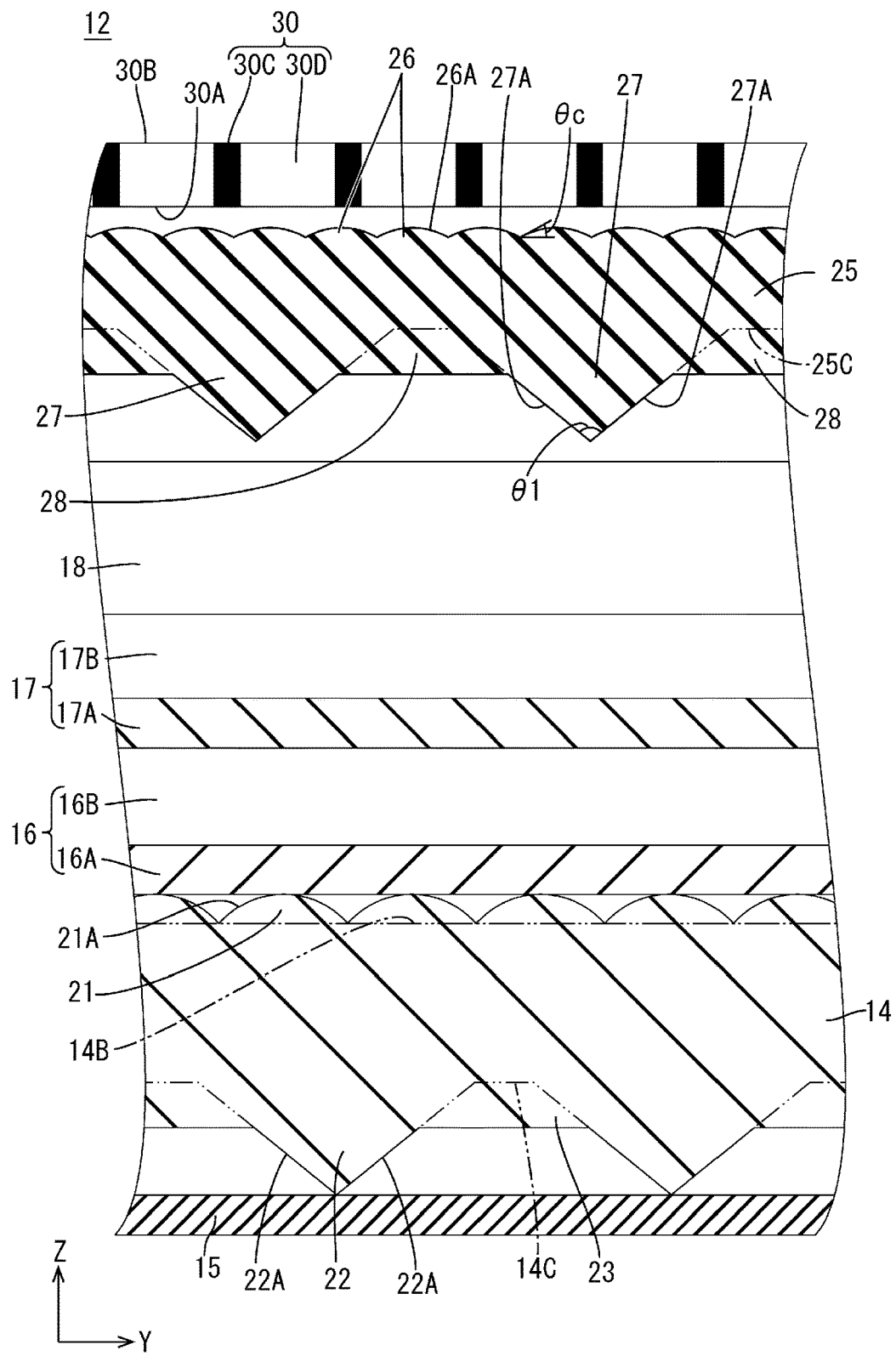
FIG. 3 is a front cross-sectional view of the backlight device.

Next, a detailed structure of the first light guide plate 14 will be described. As illustrated in FIGS. 2 and 3, a first light guide plate lens 21, a second light guide plate lens 22, and a third light guide plate lens 23 are provided on the first light guide plate 14. As illustrated in FIG. 3, the first light guide plate lens 21 is provided on the first light guide plate-light emission main surface 14B of the first light guide plate 14. The first light guide plate lens 21 extends along the X-axis direction, and a plurality of the first light guide plate lenses 21 are disposed side by side along the Y-axis direction. In the present embodiment, the first light guide plate lens 21 is a so-called lenticular lens. The first light guide plate lens 21 has a convex shape protruding from the first light guide plate-light emission main surface 14B to the front side. Specifically, the first light guide plate lens 21 has a semi-circular shape in a cross section taken along the Y-axis direction and a semi-cylindrical shape linearly extending along the X-axis direction, and a surface of the first light guide plate lens 21 is a first circular arc-shaped face 21A. When an angle formed by a tangent line at a base end portion of the first circular arc-shaped face 21A with respect to the Y-axis direction is defined as a "contact angle", a contact angle of the first light guide plate lens 21 is, for example, approximately 62°. All the plurality of first light guide plate lenses 21 aligned along the Y-axis direction have substantially the same contact angle, substantially the same width dimension (arrangement interval), and substantially the same height dimension. In order to provide the first light guide plate lens 21 having such a configuration integrally with the first light guide plate 14, for example, the first light guide plate 14 may be manufactured by injection molding, and a transfer shape for transferring the first light guide plate lens 21 may be formed in advance on a molding face of a forming mold of the first light guide plate 14 for molding the first light guide plate-light emission main surface 14B.

As illustrated in FIG. 3, the second light guide plate lens 22 is provided on the first opposite main surface 14C of the first light guide plate 14. The second light guide plate lens 22 extends along the X-axis direction, and a plurality of the second light guide plate lenses 22 are disposed side by side along the Y-axis direction. In the present embodiment, the second light guide plate lens 22 is a convex-shaped prism protruding from the first opposite main surface 14C to the back side. Specifically, the second light guide plate lens 22 has a substantially triangular shape (is substantially mountain shaped) in a cross section taken along the Y-axis direction, and also extends linearly along the X-axis direction. A width dimension (dimension in the Y-axis direction) of the second light guide plate lens 22 is set constant throughout the entire length in the X-axis direction. The second light guide plate lens 22 has an approximately isosceles triangle shape in the cross section, and includes a pair of first light guide plate inclined surfaces 22A. An apex angle of the second light guide plate lens 22 is preferably set to an obtuse angle (angle greater than 90°), specifically, within a range from 100° to 150°, and is most preferably set to 140°. All the plurality of second light guide plate lenses 22 aligned along the Y-axis direction have substantially the same apex angle, substantially the same width dimension (arrangement interval), and substantially the same height dimension. In the present embodiment, the arrangement interval of the second light guide plate lenses 22 is greater than the arrangement interval of the first light guide plate lenses 21. In order to provide the second light guide plate lens 22 having such a configuration integrally with the first light guide plate 14, for example, the first light guide plate 14 may be manufactured by injection molding, and a transfer shape for transferring the second light guide plate lens 22 may be formed in advance on a molding face of a forming mold of the first light guide plate 14 for molding the first opposite main surface 14C.

According to the first light guide plate 14 having such a configuration, as illustrated in FIG. 3, light propagating inside the first light guide plate 14 is repeatedly reflected by being incident on the first circular arc-shaped face 21A of each of the first light guide plate lenses 21 on the first light guide plate-light emission main surface 14B side in the Z-axis direction, and travels in a zigzag manner substantially along the X-axis direction. On the other hand, light propagating inside the first light guide plate 14 is repeatedly reflected by being incident on the pair of first light guide plate inclined surfaces 22A of each of the second light guide plate lenses 22 on the first opposite main surface 14C side in the Z-axis direction, and travels in a zigzag manner substantially along the X-axis direction. In this way, light propagating inside the first light guide plate 14 is restricted from spreading in the Y-axis direction, and thus unevenness of darkness and brightness is less likely to occur between a vicinity of the first LED 13 and surroundings thereof in the Y-axis direction.

As illustrated in FIG. 2, the third light guide plate lens 23 is provided on the first opposite main surface 14C of the first light guide plate 14. A plurality of the third light guide plate lenses 23 are disposed side by side at an interval along the X-axis direction. The third light guide plate lens 23 protrudes from the first opposite main surface 14C toward the back side along the Z-axis direction. The third light guide plate lens 23 includes a second light guide plate inclined surface 23A disposed on a side opposite (right side in FIG. 2) to the first LED 13 side in the X-axis direction, a third light guide plate inclined surface 23B disposed on the first LED 13 side (left side in FIG. 2) in the X-axis direction, and a fourth light guide plate inclined surface 23C located between the second light guide plate inclined surface 23A and the third light guide plate inclined surface 23B. The second light guide plate inclined surface 23A has an inclination rising from the first LED 13 side (left side in FIG. 2) of the first light guide plate 14 in the X-axis direction toward a side opposite (right side in FIG. 2) to the first LED 13 side. The third light guide plate inclined surface 23B has an inclination rising from the side opposite (right side in FIG. 2) to the first LED 13 side of the first light guide plate 14 in the X-axis direction toward the first LED 13 side (left side in FIG. 2). The fourth light guide plate inclined surface 23C has an inclination rising from the first LED 13 side (left side in FIG. 2) in the X-axis direction in the first light guide plate 14 toward the side opposite (right side in FIG. 2) to the first LED 13 side.

As illustrated in FIG. 2, the second light guide plate inclined surface 23A and the third light guide plate inclined surface 23B reflect light propagating inside the first light guide plate 14, raise the light toward the front side so as to be at an angle close to the Z-axis direction, and can thus promote emission from the first light guide plate-light emission main surface 14B. Specifically, the second light guide plate inclined surface 23A mainly functions to reflect and raise light traveling away from the first LED 13 in the X-axis direction. On the other hand, the third light guide plate inclined surface 23B mainly functions to reflect and raise light traveling toward the first LED 13 in the X-axis direction. The second light guide plate inclined surface 23A has a gradient in which a distance from the first light guide plate-light emission main surface 14B (a portion in which the third light guide plate lens 23 is not installed) becomes smaller while going away from the first LED 13 in the X-axis direction. The second light guide plate inclined surface 23A has an inclination angle of, for example, approximately 8° with respect to the X-axis direction. The third light guide plate inclined surface 23B has a gradient in which a distance from the first light guide plate-light emission main surface 14B becomes larger while going away from the first LED 13 in the X-axis direction, that is, a gradient opposite to that of the second light guide plate inclined surface 23A. The third light guide plate inclined surface 23B has a steep, near-vertical gradient with an inclination angle of, for example, approximately 80° with respect to the X-axis direction, and the inclination angle is greater than the inclination angle of the second light guide plate inclined surface 23A.

Figure 4:
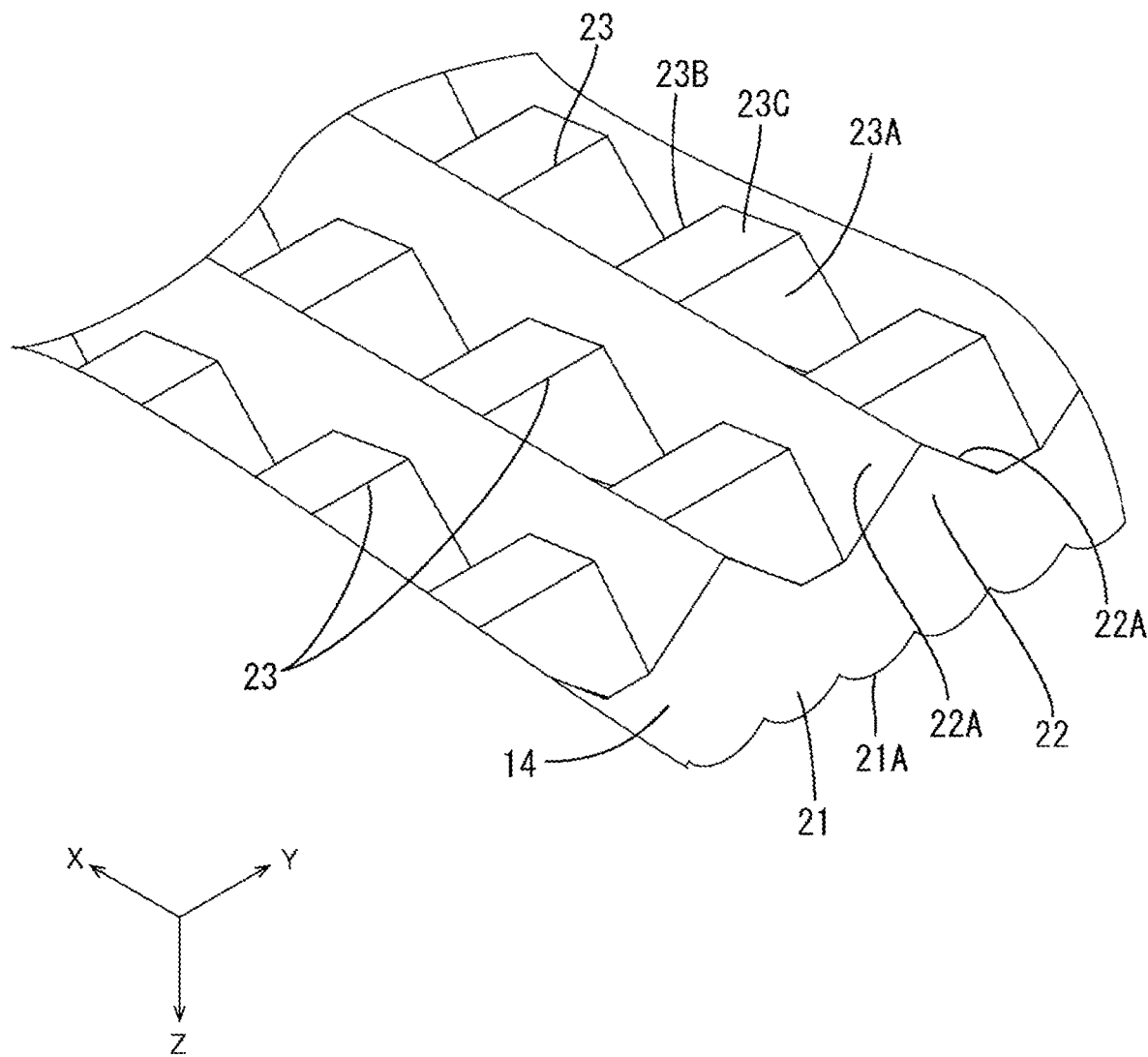
FIG. 4 is a perspective view when a first light guide plate constituting the backlight device is viewed from a first opposite main surface side.
Figure 5:
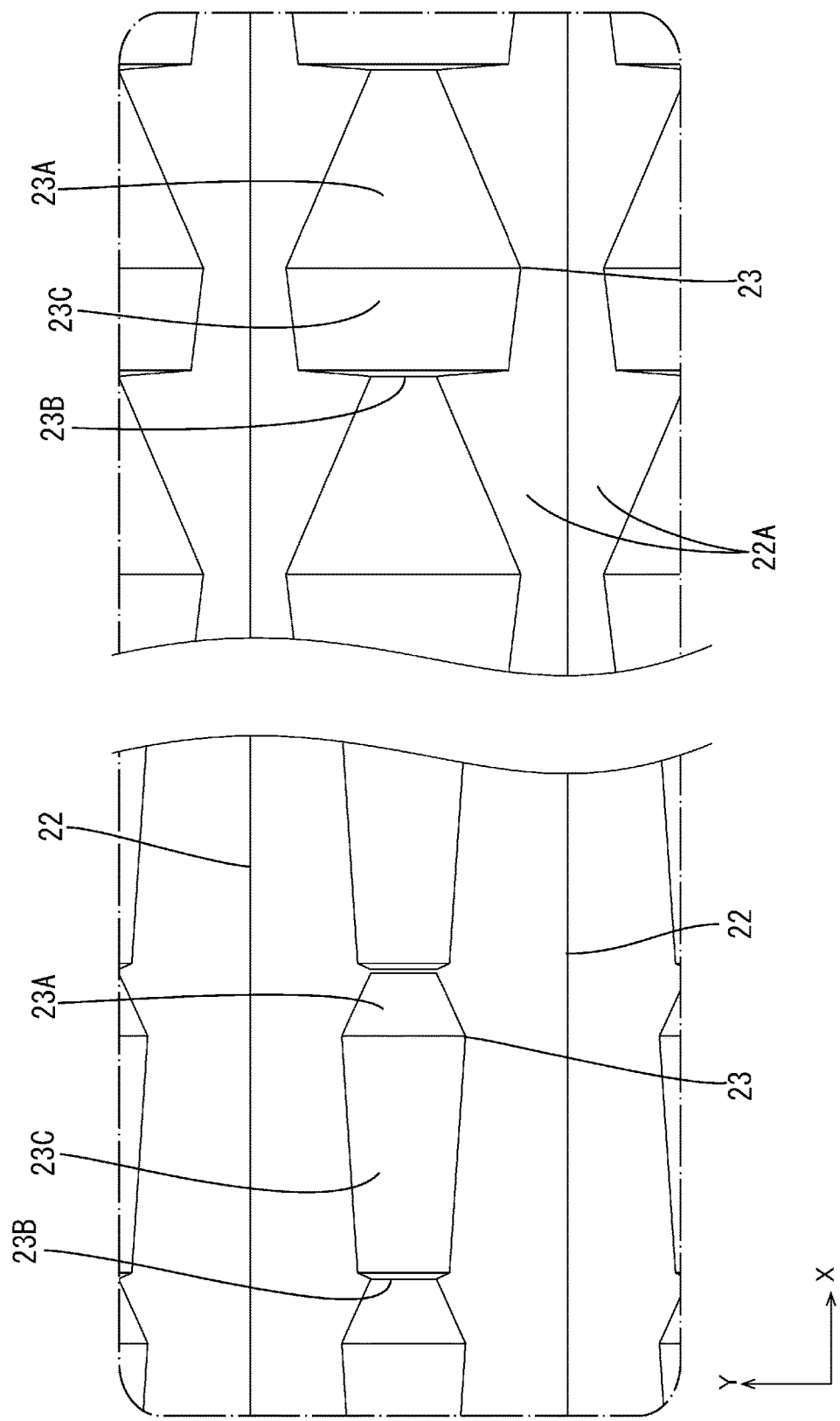
FIG. 5 is a bottom view illustrating a configuration on the first opposite main surface of the first light guide plate.

Further, as illustrated in FIGS. 2, 4, and 5, the plurality of third light guide plate lenses 23 aligned along the X-axis direction are designed such that a height dimension (dimension in the Z-axis direction) and a length dimension (dimension in the X-axis direction) each increase while going away from the first LED 13 in the X-axis direction. More specifically, when comparing the third light guide plate lens 23 closer to the first LED 13 in the X-axis direction and the third light guide plate lens 23 farther from the first LED 13 in the X-axis direction, each area of the second light guide plate inclined surface 23A and the third light guide plate inclined surface 23B of the latter is larger than that of the former. In this way, on a side closer to the first LED 13 in the X-axis direction, light is less likely and incident on the second light guide plate inclined surface 23A and the third light guide plate inclined surface 23B of the third light guide plate lens 23, and light emission is suppressed, but on a side farther from the first LED 13 in the X-axis direction, light is more likely and incident on the second light guide plate inclined surface 23A and the third light guide plate inclined surface 23B of the third light guide plate lens 23, and light emission is promoted. As a result, the amount of light emitted from the first light guide plate-light emission main surface 14B is made uniform between the first LED 13 side and the side opposite to the first LED 13 side in the X-axis direction.

As illustrated in FIG. 2, in the fourth light guide plate inclined surface 23C, an end portion on the side opposite (right side in FIG. 2) to the first LED 13 side in the X-axis direction is connected to the second light guide plate inclined surface 23A, and an end portion on the first LED 13 side (left side in FIG. 2) in the X-axis direction is connected to the third light guide plate inclined surface 23B. The fourth light guide plate inclined surface 23C has a gradient in which a distance from the first light guide plate-light emission main surface 14B (a portion in which the third light guide plate lens 23 is not installed) becomes larger while going away from the first LED 13 in the X-axis direction. In other words, the fourth light guide plate inclined surface 23C has the gradient similar to that of the third light guide plate inclined surface 23B. The fourth light guide plate inclined surface 23C has an inclination angle of, for example, approximately 1.4° with respect to the X-axis direction, and the inclination angle is smaller than both of the inclination angles of the second light guide plate inclined surface 23A and the third light guide plate inclined surface 23B. The fourth light guide plate inclined surface 23C having such a configuration reflects light traveling away from the first LED 13 inside the first light guide plate 14, and thus the light is directed to the first light guide plate-light emission main surface 14B side, but an angle of incidence of the light with respect to the first light guide plate-light emission main surface 14B does not exceed a critical angle. Therefore, the light is totally reflected by the first light guide plate-light emission main surface 14B, and is guided so as to go farther away from the first LED 13. In this way, emission light from the first light guide plate-light emission main surface 14B is less likely to be biased toward the first LED 13 side in the X-axis direction. As described above, the first light guide plate 14 is configured such that the inclination angle with respect to the X-axis direction increases in the order of the fourth light guide plate inclined surface 23C, the second light guide plate inclined surface 23A, and the third light guide plate inclined surface 23B. Further, a plurality of the fourth light guide plate inclined surfaces 23C aligned along the X-axis direction are designed such that the length dimension decreases while going away from the first LED 13 in the X-axis direction. The reason is that the length dimension of the third light guide plate lens 23 increases while going away from the first LED 13 in the X-axis direction, and an occupied range of the third light guide plate lens 23 increases.

As illustrated in FIGS. 3 to 5, the third light guide plate lens 23 having the configuration described above is sandwiched and disposed between two second light guide plate lenses 22 that are adjacent to each other in the Y-axis direction. Therefore, the third light guide plate lens 23 is repeatedly disposed in an alternating manner with the second light guide plate lens 22A in the Y-axis direction. In the third light guide plate lens 23, a maximum value of a protrusion dimension (height dimension) from the first opposite main surface 14C is set smaller than a protrusion dimension of the second light guide plate lens 22 from the first opposite main surface 14C. Therefore, even the third light guide plate lens 23 located on a farthest side from the first LED 13 in the X-axis direction does not protrude farther toward the back side than the second light guide plate lens 22.

Herein, the liquid crystal display device 10 for vehicle application may be located and installed in front of a passenger seat of a passenger vehicle, for example. In that case, for example, while a passenger vehicle is traveling, it may be required to restrict a viewing angle such that while a display image of the liquid crystal display device 10 can be visually recognized from a passenger seat, the display image of the liquid crystal display device 10 cannot be visually recognized from a driver seat. Furthermore, for example, while a passenger vehicle is stopped, it may be required not to restrict a viewing angle such that a display image of the liquid crystal display device 10 can be visually recognized from both a passenger seat and a driver seat. Note that the liquid crystal display device 10 for vehicle application is installed in a position in which the X-axis direction substantially coincides with a horizontal direction and the Y-axis direction is parallel to a vertical direction. As illustrated in FIG. 1, in order to respond to such a request, the backlight device 12 according to the present embodiment includes at least a first louver (first sheet) 18 disposed on a front side of the second prism sheet 17, a second LED (second light source) 24, and a second light guide plate 25 disposed on a front side of the first louver 18 in addition to each of the configurations described above. Further, the backlight device 12 according to the present embodiment includes a second louver 30 disposed on a front side of the second light guide plate 25 in order to prevent reflection on a windshield of a passenger vehicle. The second louver 30 will be described later.

A configuration of the first louver 18 will be described by using FIGS. 1 and 2. As illustrated in FIG. 1, the first louver 18 includes a main surface having a sheet shape parallel to each of the main surfaces of the liquid crystal panel 11, the first light guide plate 14, and the like. Note that the main surface of the first louver 18 is parallel to the X-axis direction and the Y-axis direction, and a normal direction (thickness direction) of the main surface coincides with the Z-axis direction. The first louver 18 has a function of restricting an emission angle range of light in the X-axis direction. The first louver 18 includes a first light entering main surface (third main surface) 18A on the back side, and a first light emission main surface (fourth main surface) 18B on the front side. The first light entering main surface 18A faces a main surface of the second prism sheet 17 on the front side (light emission side). The first light emission main surface 18B faces a second opposite main surface 25C of the second light guide plate 25 described below.

As illustrated in FIG. 2, the first louver 18 includes a first light blocking portion 18C that blocks light, and a first light-transmitting portion 18D that transmits light. The first light blocking portion 18C is formed of, for example, a light blocking resin material (light blocking material) that exhibits a black color and blocks light. The first light blocking portion 18C has a layer shape extending along the Y-axis direction and the Z-axis direction, and a plurality of the first light blocking portions 18C are disposed side by side at an interval in the X-axis direction. The first light-transmitting portion 18D is formed of a light-transmissive resin material (light-transmissive material) that is substantially transparent and transmits light. The first light-transmitting portion 18D has a layer shape extending along the Y-axis direction and the Z-axis direction, and a plurality of the first light-transmitting portions 18D are disposed side by side at an interval in the X-axis direction. The plurality of first light blocking portions 18C and the plurality of first light-transmitting portions 18D are repeatedly and alternately disposed side by side in the X-axis direction. Therefore, the first light-transmitting portion 18D is interposed between two first light blocking portions 18C that are adjacent to each other at an interval in the X-axis direction, and the first light blocking portion 18C is interposed between two first light-transmitting portions 18D that are adjacent to each other at an interval in the X-axis direction. Light incident on the first light entering main surface 18A of the first louver 18 is transmitted through the first light-transmitting portion 18D disposed between the two first light blocking portions 18C that are adjacent to each other in the X-axis direction, and is emitted from the first light emission main surface 18B. An emission angle of emission light from the first light emission main surface 18B in the X-axis direction is restricted by the two first light blocking portions 18C that are adjacent to each other in the X-axis direction. Note that emission light from the first light emission main surface 18B has an emission angle that is not restricted by the first louver 18 in the Y-axis direction. An emission angle range of emission light from the first light emission main surface 18B in the X-axis direction is defined by two straight lines that diagonally connect each end portion in the Z-axis direction of the two first light blocking portions 18C that sandwich the first light-transmitting portion 18D. An emission angle range of transmitted light of the first light-transmitting portion 18D in the X-axis direction changes according to a ratio between a width W1 and a height H1 of the first light-transmitting portion 18D. Further, the first louver 18 includes a pair of sheet carriers that sandwich and carry the plurality of first light blocking portions 18C and the plurality of first light-transmitting portions 18D from the front side and the back side. The sheet carrier is formed of a light-transmissive resin material that is substantially transparent and transmits light. The sheet carrier extends all over the first louver 18, and collectively holds the plurality of first light blocking portions 18C and the plurality of first light-transmitting portions 18D.

Specifically, as illustrated in FIG. 2, the first louver 18 has a ratio acquired by dividing the width W1 of the first light-transmitting portion 18D by the height H1, which is equal to "tan 10°". In this way, a maximum absolute value of an angle formed by light transmitted through the first light-transmitting portion 18D with respect to the Z-axis direction is 10°. As compared to when a ratio acquired by dividing a width of the first light-transmitting portion 18D by a height is greater than "tan 10°", an emission angle range of emission light of the backlight device 12 is sufficiently narrowed. In this way, a viewing angle is suitably restricted such that while a display image of the liquid crystal display device 10 can be visually recognized from a passenger seat, the display image of the liquid crystal display device 10 cannot be visually recognized from a driver seat. Further, as compared to when a ratio acquired by dividing a width of the first light-transmitting portion 18D by a height is smaller than "tan 10°", the amount of light blocked by the first light blocking portion 18C decreases, and usage efficiency of light is improved.

Figure 6:
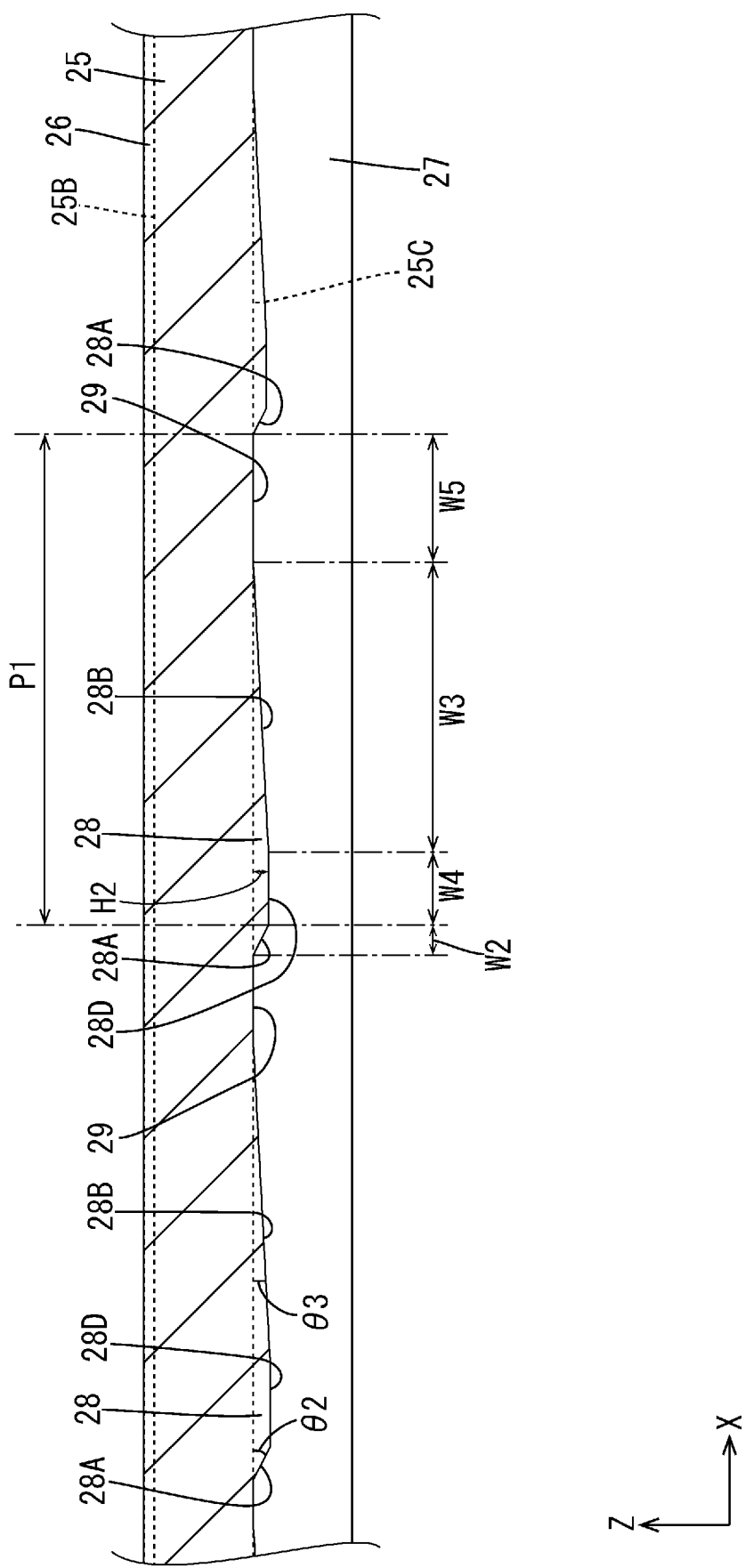
FIG. 6 is a side cross-sectional view of a second light guide plate constituting the backlight device.
Figure 7:
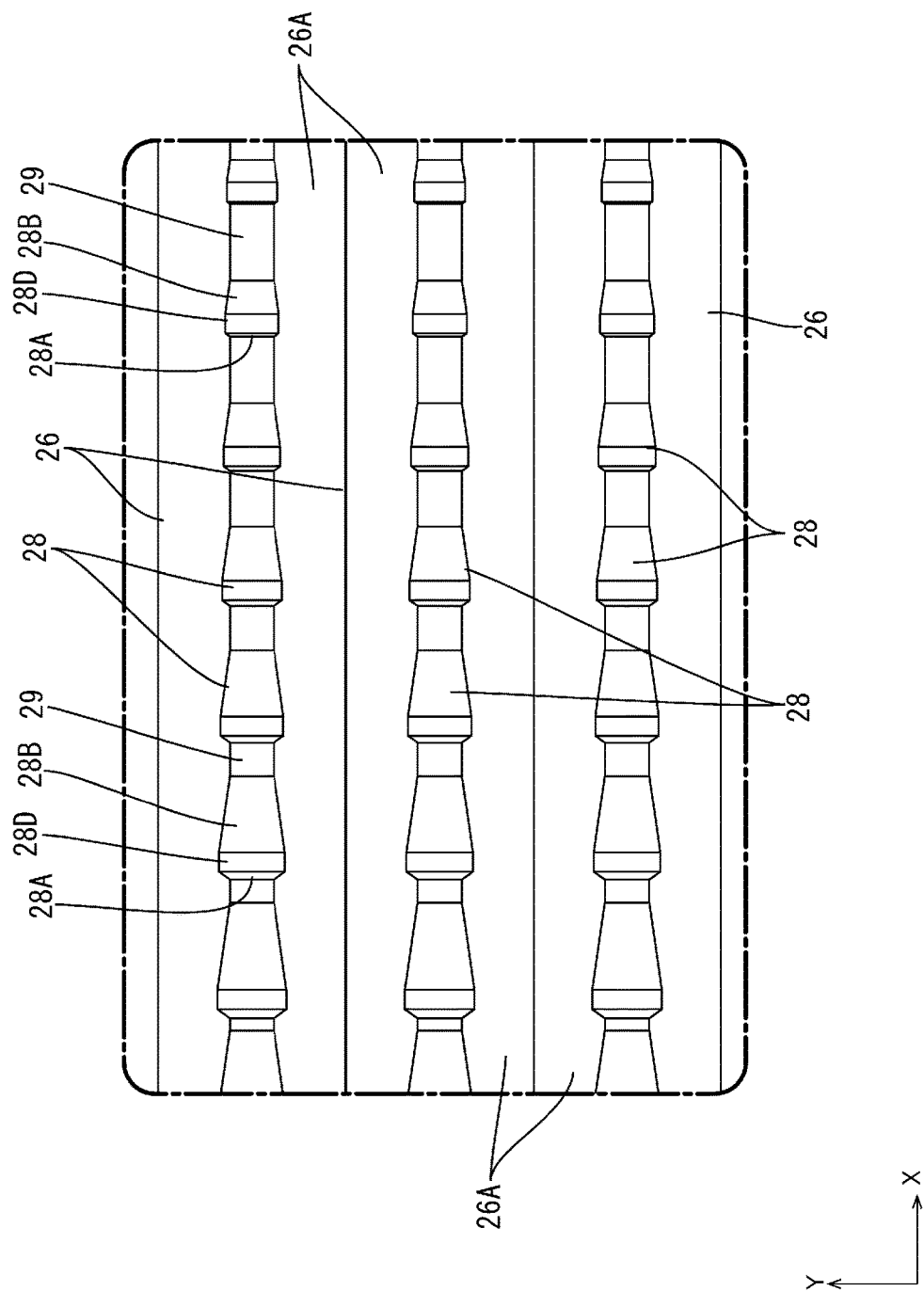
FIG. 7 is a bottom view illustrating a configuration on a second opposite main surface of the second light guide plate.

A configuration of the second LED 24 and the second light guide plate 25 will be described by appropriately using FIGS. 1 to 3, 6, and 7. FIG. 6 is an enlarged cross-sectional view of the second light guide plate 25 of component parts of the backlight device 12. FIG. 7 is a bottom view illustrating a main surface of the second light guide plate 25 on the back side. As illustrated in FIG. 1, the second LED 24 has a substantially block shape, and one face of a pair of faces along the Y-axis direction and the Z-axis direction is a second light-emitting face 24A that emits light. A plurality of the second LEDs 24 are disposed side by side at an interval along the Y-axis direction. The second LED 24 is mounted on an LED substrate. The second LED 24 has a configuration in which an LED chip is sealed with a sealing material on a substrate portion mounted on the LED substrate. The LED chip provided in the second LED 24 emits light of a single color, for example, blue light. A phosphor is dispersed and mixed in the sealing material provided in the second LED 24. The phosphor contained in the sealing material includes a yellow phosphor, a green phosphor, a red phosphor, and the like. The second LED 24 including such an LED chip and such a sealing material emits white light as a whole.

The second light guide plate 25 is formed of a synthetic resin material (for example, acrylic resin such as PMMA or the like) that has a sufficiently higher refractive index than that of the air and that is substantially transparent. As illustrated in FIG. 1, the second light guide plate 25 has a plate shape, and a main surface of the second light guide plate 25 is parallel to the main surface of the liquid crystal panel 11 and the like. Note that the main surface of the second light guide plate 25 is parallel to the X-axis direction and the Y-axis direction, and a normal direction (thickness direction) of the main surface coincides with the Z-axis direction. The second light guide plate 25 is aligned along the X-axis direction (first direction) with respect to the second LED 24, and is also disposed side by side along the Z-axis direction with respect to the liquid crystal panel 11, the first louver 18, and the like. The second light guide plate 25 is disposed on the other side (left side in FIG. 1) of the second LED 24 in the X-axis direction. In other words, a positional relationship between the second light guide plate 25 and the second LED 24 in the X-axis direction is reverse to a positional relationship between the first light guide plate 14 and the first LED 13 in the X-axis direction. In this way, the first LED 13 and the second LED 24 are separated and disposed in the X-axis direction, and thus, even when both of the first LED 13 and the second LED 24 are turned on, heat is less likely to persist.

As illustrated in FIG. 1, one end face of an outer circumferential end face of the second light guide plate 25 is a second light entering end face (second end face) 25A facing the second light-emitting face 24A of the second LED 24. The second light entering end face 25A is a face parallel to the second light-emitting face 24A of the second LED 24, and light emitted from the second light-emitting face 24A is incident on the second light entering end face 25A. Therefore, it can be said that the second LED 24 is disposed only on one side of the second light guide plate 25 in the X-axis direction, and the second light guide plate 25, together with the second LED 24, constitute a backlight unit of a one-side light entering type. A main surface on a front side facing the second louver 30 described below of a pair of the main surfaces in the second light guide plate 25 is a second light guide plate-light emission main surface (fifth main surface) 25B that emits light guided through the inside of the second light guide plate 25. A main surface on the back side facing a third louver 20 of the pair of main surfaces in the second light guide plate 25 is the second opposite main surface (sixth main surface) 25C located on a side opposite to the second light guide plate-light emission main surface 25B. In the second light guide plate 25, the second opposite main surface 25C is disposed so as to face the first light emission main surface 18B of the first louver 18 in the Z-axis direction. Then, the second light guide plate 25 can introduce, from the second light entering end face 25A, light emitted from the second LED 24 toward the second light guide plate 25, can propagate the light therein, then, can allow the light to rise along the Z-axis direction such that the light is directed toward the liquid crystal panel 11 on the front side (light emission side), and can emit the light from the second light guide plate-light emission main surface 25B. In addition, the second light guide plate 25 can introduce, from the second opposite main surface 25C, emission light from the first louver 18, and can also emit the light from the second light guide plate-light emission main surface 25B toward the second louver 30 on the front side (liquid crystal panel 11). Note that a normal direction of the second light entering end face 25A coincides with the X-axis direction (an alignment direction of the second LED 24 and the second light guide plate 25).

As illustrated in FIGS. 2 and 3, a fourth light guide plate lens (second lens) 26, a fifth light guide plate lens (third lens) 27, and a sixth light guide plate lens (first lens) 28 are provided on the second light guide plate 25. As illustrated in FIG. 3, the fourth light guide plate lens 26 is provided on the second light guide plate-light emission main surface 25B of the second light guide plate 25. The fourth light guide plate lens 26 extends along the X-axis direction, and a plurality of the fourth light guide plate lenses 26 are disposed side by side along the Y-axis direction. In the present embodiment, the fourth light guide plate lens 26 is a so-called lenticular lens. The fourth light guide plate lens 26 has a convex shape protruding from the second light guide plate-light emission main surface 25B to the front side. Specifically, the fourth light guide plate lens 26 has a semi-circular shape in a cross section taken along the Y-axis direction and a semi-cylindrical shape linearly extending along the X-axis direction, and a surface of the fourth light guide plate lens 26 is a second circular arc-shaped face 26A. When an angle formed by a tangent line at a base end portion of the second circular arc-shaped face 26A with respect to the Y-axis direction is defined as a "contact angle", a contact angle θc of the fourth light guide plate lens 26 is, for example, approximately 30°. All the plurality of fourth light guide plate lenses 26 aligned along the Y-axis direction have substantially the same contact angle θc, substantially the same width dimension (arrangement interval), and substantially the same height dimension. In order to provide the fourth light guide plate lens 26 having such a configuration integrally with the second light guide plate 25, for example, the second light guide plate 25 may be manufactured by injection molding, and a transfer shape for transferring the fourth light guide plate lens 26 may be formed in advance on a molding face of a forming mold of the second light guide plate 25 for molding the second light guide plate-light emission main surface 25B.

As illustrated in FIG. 3, the fifth light guide plate lens 27 is provided on the second opposite main surface 25C of the second light guide plate 25. The fifth light guide plate lens 27 extends along the X-axis direction, and a plurality of the fifth light guide plate lenses 27 are disposed side by side along the Y-axis direction. In the present embodiment, the fifth light guide plate lens 27 is a convex-shaped prism protruding from the second opposite main surface 25C to the back side. Specifically, the fifth light guide plate lens 27 has a substantially triangular shape (is substantially mountain shaped) in a cross section taken along the Y-axis direction, and also extends linearly along the X-axis direction. A width dimension (dimension in the Y-axis direction) of the fifth light guide plate lens 27 is set constant throughout the entire length in the X-axis direction. The fifth light guide plate lens 27 has an approximately isosceles triangle shape in the cross section, and includes a pair of fifth light guide plate inclined surfaces 27A. An apex angle θ1 of the fifth light guide plate lens 27 is preferably set to an obtuse angle (angle greater than 90°), specifically, within a range from 100° to 150°, and is most preferably set to 140°. All the plurality of fifth light guide plate lenses 27 aligned along the Y-axis direction have substantially the same apex angle θ1, substantially the same width dimension (arrangement interval), and substantially the same height dimension. In the present embodiment, the arrangement interval of the fifth light guide plate lenses 27 is greater than the arrangement interval of the fourth light guide plate lenses 26. In order to provide the fifth light guide plate lens 27 having such a configuration integrally with the second light guide plate 25, for example, the second light guide plate 25 may be manufactured by injection molding, and a transfer shape for transferring the fifth light guide plate lens 27 may be formed in advance on a molding face of a forming mold of the second light guide plate 25 for molding the second opposite main surface 25C.

As illustrated in FIG. 2, the sixth light guide plate lens 28 is provided on the second opposite main surface 25C of the second light guide plate 25. A plurality of the sixth light guide plate lenses 28 are disposed side by side at an interval along the X-axis direction. The sixth light guide plate lens 28 protrudes from the second opposite main surface 25C toward the back side along the Z-axis direction. The sixth light guide plate lens 28 includes a sixth light guide plate inclined surface (first inclined surface) 28A disposed on a side opposite (left side in FIG. 2) to the second LED 24 side in the X-axis direction, a seventh light guide plate inclined surface (second inclined surface) 28B disposed on the second LED 24 side (right side in FIG. 2) in the X-axis direction, and a first plane 28D located between the sixth light guide plate inclined surface 28A and the seventh light guide plate inclined surface 28B. The sixth light guide plate inclined surface 28A has an inclination rising from the second LED 24 side (right side in FIG. 2) of the second light guide plate 25 in the X-axis direction toward a side opposite (left side in FIG. 2) to the second LED 24 side. The seventh light guide plate inclined surface 28B has an inclination rising from the side opposite (left side in FIG. 2) to the second LED 24 side of the second light guide plate 25 in the X-axis direction toward the second LED 24 side (right side in FIG. 2). The first plane 28D is a face parallel to the X-axis direction and the Y-axis direction. Further, a second plane 29 is provided between two sixth light guide plate lenses 28 that are adjacent to each other in the X-axis direction. Therefore, the sixth light guide plate lens 28 and the second plane 29 are repeatedly and alternately arranged side by side along the X-axis direction.

As illustrated in FIG. 2, the sixth light guide plate inclined surface 28A reflects light propagating inside the second light guide plate 25, raises the light toward the front side, and can thus promote emission from the second light guide plate-light emission main surface 25B. Specifically, the sixth light guide plate inclined surface 28A mainly functions to reflect and raise light traveling away from the second LED 24 in the X-axis direction inside the second light guide plate 25. Specifically, as illustrated in FIG. 6, the sixth light guide plate inclined surface 28A has an inclination angle (angle) θ2 with respect to the X-axis direction set to be, for example, equal to or less than 40°, and preferably set to approximately 27°. When the inclination angle θ2 of the sixth light guide plate inclined surface 28A with respect to the X-axis direction is set to be equal to or less than 40°, light can be raised in a direction inclined to the side opposite to the second LED 24 side in the X-axis direction with respect to a front direction. Therefore, emission light from the second light guide plate-light emission main surface 25B includes light toward the side opposite to the second LED 24 side in the X-axis direction with respect to the Z-axis direction (normal direction of the second light guide plate-light emission main surface 25B) more than light toward the second LED 24 side in the X-axis direction. Therefore, when the second LED 24 is turned on, emission light having a brightness angle distribution in which peak brightness according to the emission light is biased toward the side opposite to the second LED 24 side in the X-axis direction can be supplied. In the liquid crystal display device 10 for vehicle application installed in front of a passenger seat of a passenger vehicle, the second LED 24 is preferably disposed on a side opposite to a driver seat side in the X-axis direction.

According to such a configuration, as illustrated in FIG. 1, for example, while a passenger vehicle travels, the first LED 13 is turned on and the second LED 24 is turned off. Then, light emitted from the second light guide plate-light emission main surface 25B of the second light guide plate 25 has an angle range restricted by the first light blocking portion 18D of the first louver 18, and thus is less likely to be emitted outside of the restricted angle range. Therefore, when the first LED 13 is turned on and the second LED 24 is turned off, light is selectively emitted from the backlight device 12 in the restricted angle range. Thus, while a display image of the liquid crystal display device 10 can be visually recognized from a passenger seat, the display image of the liquid crystal display device 10 cannot be visually recognized from a driver seat. In contrast, for example, while a passenger vehicle is stopped, both of the first LED 13 and the second LED 24 are turned on. Then, light emitted from the second light guide plate-light emission main surface 25B of the second light guide plate 25 includes light of the first LED 13 having an angle range restricted by the first louver 18, and light of the second LED 24 having a brightness angle distribution in which peak brightness is biased toward the side opposite to the second LED 24 side in the X-axis direction. Therefore, when both of the first LED 13 and the second LED 24 are turned on, in addition to the light in the restricted angle range, the light having the brightness angle distribution in which the peak brightness is biased toward the side opposite to the second LED 24 side in the X-axis direction is emitted from the backlight device 12. Thus, a display image of the liquid crystal display device 10 can be visually recognized from both of a driver seat and a passenger seat. In this way, whether a display image can be visually recognized from a driver seat can be adjusted by controlling driving of the second LED 24 according to a traveling situation of a passenger vehicle.

On the other hand, as illustrated in FIG. 2, the seventh light guide plate inclined surface 28B can reflect and raise light traveling toward the second LED 24 in the X-axis direction, and can reflect light traveling away from the second LED 24 in the X-axis direction inside the second light guide plate 25 and guide the light so as to go farther away from the second LED 24. Specifically, as illustrated in FIG. 6, the seventh light guide plate inclined surface 28B has an inclination angle (angle) θ3 with respect to the X-axis direction set within, for example, a range from 3° to 10°, and preferably set to approximately 3°. The inclination angle θ3 of the seventh light guide plate inclined surface 28B is smaller than the inclination angle θ2 of the sixth light guide plate inclined surface 28A. According to the seventh light guide plate inclined surface 28B having such a configuration, when light traveling toward the second LED 24 in the X-axis direction inside the second light guide plate 25 is incident on the seventh light guide plate inclined surface 28B and refracted, the light travels toward the side opposite to the second LED 24 side in the X-axis direction with respect to the front direction. In this way, brightness of emission light in a direction inclined with respect to the front direction can be further improved. Further, when light traveling away from the second LED 24 in the X-axis direction inside the second light guide plate 25 is incident on the seventh light guide plate inclined surface 28B and refracted, the light is guided so as to go farther away from the second LED 24. In this way, emission light from the second light guide plate-light emission main surface 25B is less likely to be biased toward the second LED 24 side in the X-axis direction.

As illustrated in FIG. 2, the first plane 28D and the second plane 29 are parallel to the X-axis direction and the Y-axis direction, and a normal direction of the first plane 28D and the second plane 29 coincides with the Z-axis direction. Light emitted from the first light guide plate-light emission main surface 14B of the first light guide plate 14 and incident on the second opposite main surface 25C of the second light guide plate 25 travels hardly refracted even when the light is incident on any of the first plane 28D and the second plane 29. Therefore, as compared to a case of a configuration in which the sixth light guide plate inclined surface 28A and the seventh light guide plate inclined surface 28B are directly connected without the first plane 28D interposed therebetween, and a case of a configuration in which two sixth light guide plate lenses 28 that are adjacent to each other in the X-axis direction are directly connected without the second plane 29 interposed therebetween, an occurrence of side lobe light traveling in a direction inclined to the side opposite to the second LED 24 side in the X-axis direction with respect to the front direction can be suppressed.

As illustrated in FIGS. 6 and 7, the plurality of sixth light guide plate lenses 28 aligned along the X-axis direction are designed such that a height dimension (dimension in the Z-axis direction) H2 increases while going away from the second LED 24 in the X-axis direction, but an arrangement pitch (arrangement interval) P1 in the X-axis direction is constant. A width dimension (dimension in the X-axis direction) W2 of the sixth light guide plate inclined surface 28A slightly increases while going away from the second LED 24 in the X-axis direction. A width dimension (dimension in the X-axis direction) W3 of the seventh light guide plate inclined surface 28B increases while going away from the second LED 24 in the X-axis direction, and an increasing rate of the width dimension W3 is higher than an increasing rate of the width dimension W2 of the sixth light guide plate inclined surface 28A. A width dimension (dimension in the X-axis direction) W4 of the first plane 28D is set constant regardless of a position in the X-axis direction. A width dimension (dimension in the X-axis direction) W5 of the second plane 29 decreases while going away from the second LED 24 in the X-axis direction. The arrangement pitch P1 of the sixth light guide plate lenses 28 in the X-axis direction is a sum of the width dimension W2 of the sixth light guide plate inclined surface 28A, the width dimension W3 of the seventh light guide plate inclined surface 28B, the width dimension W4 of the first plane 28D, and the width dimension W5 of the second plane 29.

Figure 8:
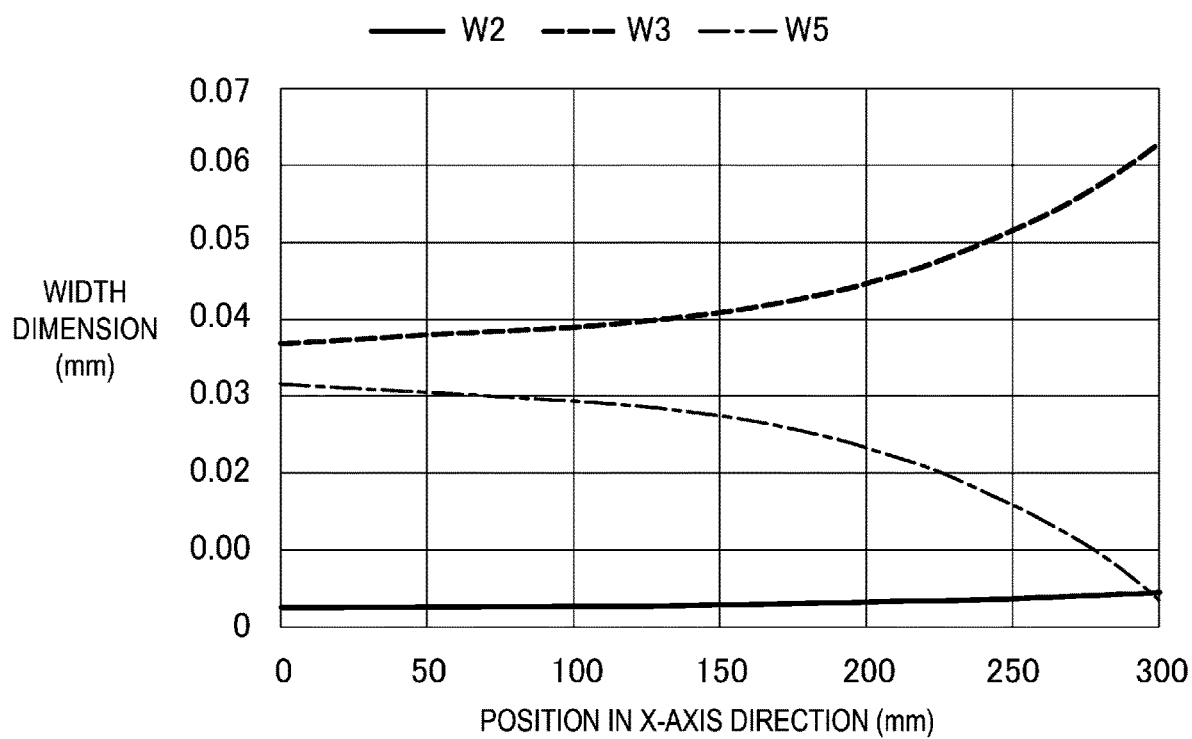
FIG. 8 is a graph showing a relationship among a position of the second light guide plate in an X-axis direction, a width dimension W2 of a sixth light guide plate inclined surface, a width dimension W3 of a seventh light guide plate inclined surface, and a width dimension W5 of a second plane.
Figure 9:
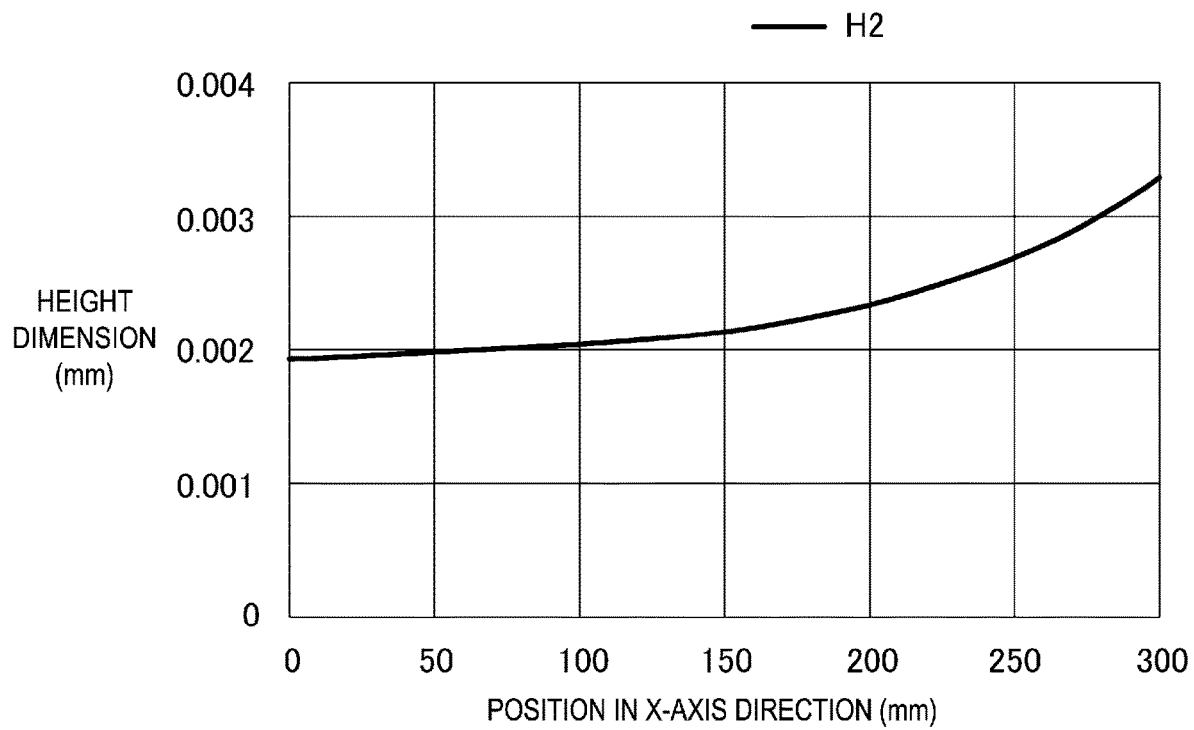
FIG. 9 is a graph showing a relationship between the position of the second light guide plate in the X-axis direction and a height dimension of a sixth light guide plate lens.

When a length dimension (dimension in the X-axis direction) of the second light guide plate 25 is set to, for example, 300 mm, the arrangement pitch P1 of the sixth light guide plate lenses 28 in the X-axis direction is set constant at, for example, approximately 0.114 mm, and the width dimension W4 of the first plane 28D is set constant at, for example, approximately 0.017 mm. As shown in FIG. 8, when the length dimension (dimension in the X-axis direction) of the second light guide plate 25 is set to, for example, 300 mm, a specific numerical value of the width dimension W2 of the sixth light guide plate inclined surface 28A, the width dimension W3 of the seventh light guide plate inclined surface 28B, and the width dimension W5 of the second plane 29 changes according to a position of the sixth light guide plate lens 28 in the second light guide plate 25 in the X-axis direction. FIG. 8 is a graph in which a horizontal axis is a position (in units of "mm") of the second light guide plate 25 in the X-axis direction, and a vertical axis is the width dimensions W2, W3, and W5 (in units of "mm") of the sixth light guide plate inclined surface 28A, the seventh light guide plate inclined surface 28B, and the second plane 29. A reference position (0 mm) in the horizontal axis in FIG. 8 is a position of the second light entering end face 25A of the second light guide plate 25, and a position of 300 mm is a position of an end face opposite to the second light entering end face 25A of the second light guide plate 25. A solid line shown in FIG. 8 is a graph of the width dimension W2 of the sixth light guide plate inclined surface 28A, a broken line is a graph of the width dimension W3 of the seventh light guide plate inclined surface 28B, and a dot-dash line is a graph of the width dimension W5 of the second plane 29. As shown in FIG. 9, when the length dimension of the second light guide plate 25 is set to, for example, 300 mm, a specific numerical value of the height dimension H2 of the sixth light guide plate lens 28 changes according to a position of the sixth light guide plate lens 28 in the second light guide plate 25 in the X-axis direction. FIG. 9 is a graph in which a horizontal axis is a position (in units of "mm") of the second light guide plate 25 in the X-axis direction, and a vertical axis is the height dimension H2 (in units of "mm") of the sixth light guide plate lens 28. According to FIG. 9, a minimum value of the height dimension H2 of the sixth light guide plate lens 28 is ensured at approximately 0.002 mm (2 μm). In this way, ease when the second light guide plate 25 is manufactured by resin-molding can be sufficiently ensured. In order to ensure, at approximately 0.002 mm, the minimum value of the height dimension H2 of the sixth light guide plate lens 28, the inclination angle θ3 formed by the seventh light guide plate inclined surface 28B with respect to the X-axis direction is preferably set to be equal to or greater than 3°. Note that each of the inclination angle θ2 of the sixth light guide plate inclined surface 28A with respect to the X-axis direction and the inclination angle θ3 of the seventh light guide plate inclined surface 28B with respect to the X-axis direction is set constant regardless of a position of the second light guide plate 25 in the X-axis direction.

As illustrated in FIGS. 3 and 7, the sixth light guide plate lens 28 having the configuration described above is sandwiched and disposed between two fifth light guide plate lenses 27 that are adjacent to each other in the Y-axis direction. Therefore, the sixth light guide plate lens 28 is repeatedly disposed in an alternating manner with the fifth light guide plate lens 27 in the Y-axis direction. In the sixth light guide plate lens 28, a maximum value of the height dimension (protrusion dimension from the second opposite main surface 25C) H2 is set smaller than a height dimension of the fifth light guide plate lens 27. Therefore, even the sixth light guide plate lens 28 located on a farthest side from the second LED 24 in the X-axis direction does not protrude farther toward the back side than the fifth light guide plate lens 27.

Next, a configuration of the second louver 30 will be described by using FIGS. 1 and 3. As illustrated in FIG. 1, the second louver 30 includes a main surface having a sheet shape parallel to each of the main surfaces of the liquid crystal panel 11, the second light guide plate 25, and the like. Note that the main surface of the second louver 30 is parallel to the X-axis direction and the Y-axis direction, and a normal direction (thickness direction) of the main surface coincides with the Z-axis direction. The second louver 30 has a function of restricting an emission angle range of light in the Y-axis direction. The second louver 30 includes a second light entering main surface 30A on the back side, and a second light emission main surface 30B on the front side. The second light entering main surface 30A faces the second light guide plate-light emission main surface 25B of the second light guide plate 25. The second light emission main surface 30B faces the main surface of the liquid crystal panel 11 on the back side. In other words, the second louver 30 is located on the front side of the second light guide plate 25, and is located and disposed on the back side of the liquid crystal panel 11.

As illustrated in FIG. 3, the second louver 30 includes a second light blocking portion 30C that blocks light, and a second light-transmitting portion 30D that transmits light. The second light blocking portion 30C is formed of, for example, a light blocking resin material (light blocking material) that exhibits a black color and blocks light. The second light blocking portion 30C has a layer shape extending along the X-axis direction and the Z-axis direction, and a plurality of the second light blocking portions 30C are disposed side by side at an interval in the Y-axis direction. The second light-transmitting portion 30D is formed of a light-transmissive resin material (light-transmissive material) that is substantially transparent and transmits light. The second light-transmitting portion 30D has a layer shape extending along the X-axis direction and the Z-axis direction, and a plurality of the second light-transmitting portions 30D are disposed side by side at an interval in the Y-axis direction. The plurality of second light blocking portions 30C and the plurality of second light-transmitting portions 30D are repeatedly and alternately disposed side by side in the Y-axis direction. Therefore, the second light-transmitting portion 30D is interposed between two second light blocking portions 30C that are adjacent to each other at an interval in the Y-axis direction, and the second light blocking portion 30C is interposed between two second light-transmitting portions 30D that are adjacent to each other at an interval in the Y-axis direction. Light incident on the second light entering main surface 30A of the second louver 30 is transmitted through the second light-transmitting portion 30D disposed between the two second light blocking portions 30C that are adjacent to each other in the Y-axis direction, and is emitted from the second light emission main surface 30B. An emission angle of emission light from the second light emission main surface 30B in the Y-axis direction is restricted by the two second light blocking portions 30C that are adjacent to each other in the Y-axis direction. Note that emission light from the second light emission main surface 30B has an emission angle that is not restricted by the second louver 30 in the X-axis direction. An emission angle range of emission light from the second light emission main surface 30B in the Y-axis direction is defined by two straight lines that diagonally connect each end portion in the Z-axis direction of the two second light blocking portions 30C that sandwich the second light-transmitting portion 30D. An emission angle range of transmitted light of the second light-transmitting portion 30D in the Y-axis direction changes according to a ratio between a width and a height of the second light-transmitting portion 30D. The second louver 30 has a ratio acquired by dividing a width of the second light-transmitting portion 30D by a height greater than the ratio acquired by dividing the width W1 of the first light-transmitting portion 18D by the height H1 in the first louver 18. Specifically, the second louver 30 has a ratio acquired by dividing a width W of the second light-transmitting portion 30D by a height equal to or greater than, for example, "tan 55°". Further, the second louver 30 includes a pair of sheet carriers that sandwich and carry the plurality of second light blocking portions 30C and the plurality of second light-transmitting portions 30D from the front side and the back side. The sheet carrier is formed of a light-transmissive resin material that is substantially transparent and transmits light. The sheet carrier extends all over the second louver 30, and collectively holds the plurality of second light blocking portions 30C and the plurality of second light-transmitting portions 30D.

When the liquid crystal display device 10 is mounted on a passenger vehicle, an emission angle range of light emitted from the liquid crystal panel 11 can be restricted to the vertical direction by using such a second louver 30. In this way, reflection of a display image on a windshield can be less likely to occur.

Here, Demonstration Experiment 1 was performed in order to acquire knowledge related to how light distribution changes when the inclination angle θ2 formed by the sixth light guide plate inclined surface 28A of the sixth light guide plate lens 28 of the second light guide plate 25 with respect to the X-axis direction is changed. In Demonstration Experiment 1, the backlight device 12 having the same configuration as that described before the present paragraph is used except for a configuration of the sixth light guide plate lens 28. In Demonstration Experiment 1, the inclination angle θ2 formed by the sixth light guide plate inclined surface 28A of the sixth light guide plate lens 28 with respect to the X-axis direction was changed in a range from 27° to 40°. Specifically, in Demonstration Experiment 1, the inclination angle θ2 was set to 27°, 30°, 32°, 34°, 36°, 38°, and 40°. In the backlight device 12 having the inclination angle θ2 changed in such a manner, brightness according to emission light in a state where the second LED 24 was turned on and the first LED 13 was turned off was measured, and a graph according to light distribution (brightness angle distribution) in the X-axis direction was produced.

Figure 10:
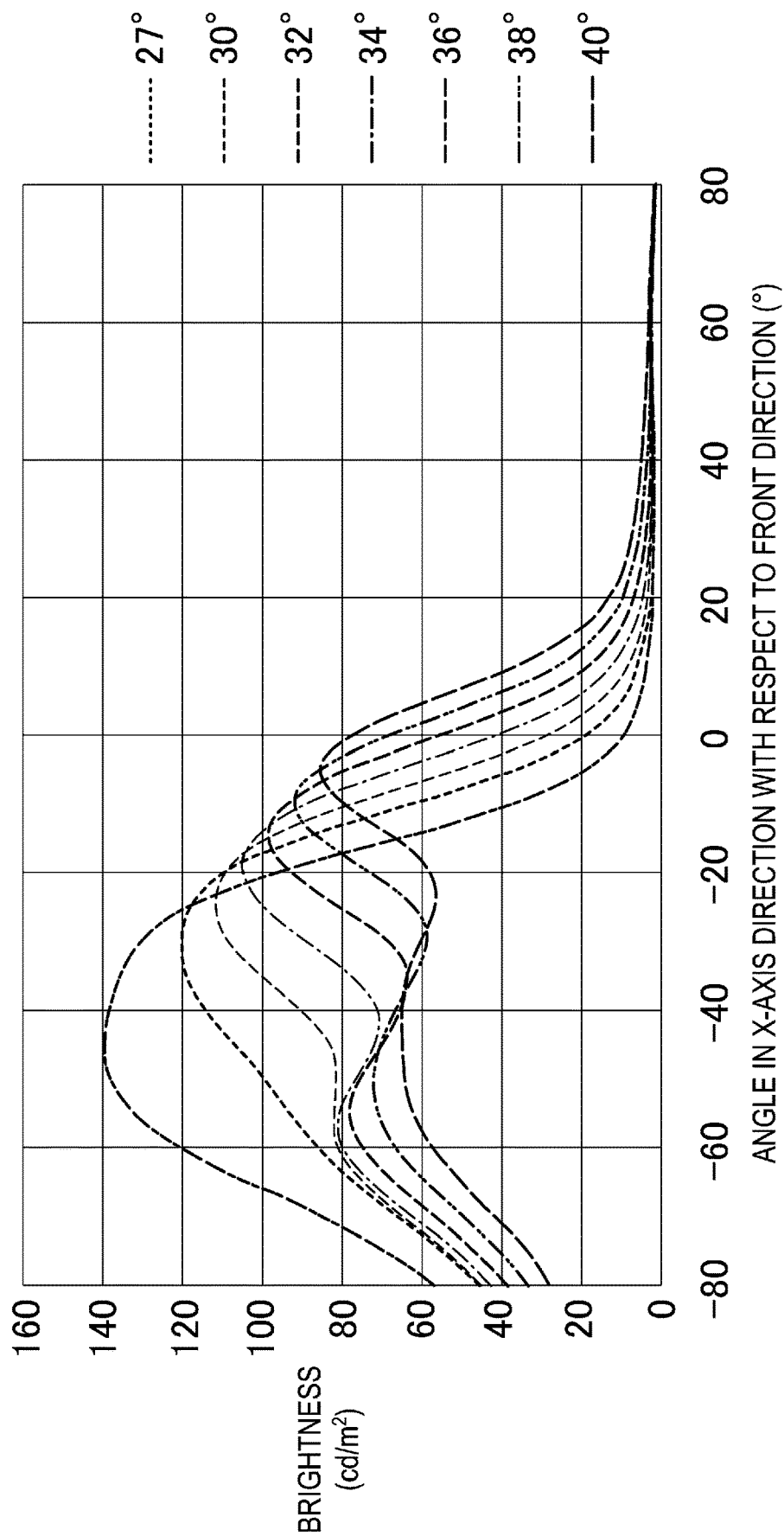
FIG. 10 is a graph according to light distribution when the sixth light guide plate inclined surface is changed in Demonstration Experiment 1.

An experimental result according to the light distribution in Demonstration Experiment 1 is as shown in FIG. 10. In a graph according to the light distribution shown in FIG. 10, a horizontal axis is an angle (in units of "°") in the X-axis direction with respect to the front direction (Z-axis direction), and a vertical axis is brightness (in units of "cd/m$^2$"). Among the positive and negative symbols provided to the angles in the horizontal axis in FIG. 10, "−(negative)" refers to the left side in the X-axis direction with respect to 0° (front direction) as reference when the backlight device 12 is viewed from the front, and "+(positive)" refers to the right side in the X-axis direction with respect to 0° (front direction) as reference when the backlight device 12 is viewed from the front.

The experimental result of Demonstration Experiment 1 will be described. According to FIG. 10, in a range of the inclination angle θ2 from 27° to 40°, an angle of peak brightness is "−". In other words, when the second LED 24 is turned on, light emitted from the second light guide plate 25 has light distribution biased toward the left side in the X-axis direction, that is, the side opposite to the second LED 24 side. Then, as the inclination angle θ2 increases, the angle of peak brightness approaches 0°. Conversely, as the inclination angle θ2 decreases, the angle of peak brightness diverges from 0°, with an absolute value of the "−" increasing. Further, as the inclination angle θ2 decreases, a rate of change of the angle tends to increase. Specifically, when the inclination angle θ2 is 40°, the peak brightness is around −5°, when the inclination angle θ2 is 30°, the peak brightness is around −30°, and, when the inclination angle θ2 is 27°, the peak brightness is around −45°.

According to the experimental result of Demonstration Experiment 1, the inclination angle θ2 can be appropriately determined from within the range from 27° to 40° according to a relative positional relationship between the liquid crystal display device 10 and a person who visually recognizes the liquid crystal display device 10. For example, when the liquid crystal display device 10 is installed in front of a passenger seat in a passenger vehicle with a driver seat located on the left side to the passenger seat, a visual recognition range in which the liquid crystal display device 10 is visually recognized from the driver seat is a range from approximately −20° to −50°. In this case, when the inclination angle θ2 is approximately 27°, light in which peak brightness is around −45° can be efficiently applied toward the driver seat.

Next, in the backlight device 12 including the second light guide plate 25 having the inclination angle θ2 of 27° formed by the sixth light guide plate inclined surface 28A with respect to the X-axis direction, Demonstration Experiment 2 was performed in order to acquire knowledge related to how light distribution changes when only the first LED 13 is turned on, when only the second LED 24 is turned on, and when both of the first LED 13 and the second LED 24 are turned on. In Demonstration Experiment 2, the backlight device 12 including the second light guide plate 25 having the inclination angle θ2 of 27° of the sixth light guide plate inclined surface 28A was used to measure brightness according to emission light in each of a case where the first LED 13 was turned on and the second LED 24 was turned off, a case where the second LED 24 is turned on and the first LED 13 is turned off, and a case where both of the first LED 13 and the second LED 24 are turned on, and a graph according to light distribution (brightness angle distribution) in the X-axis direction was produced.

Figure 11:
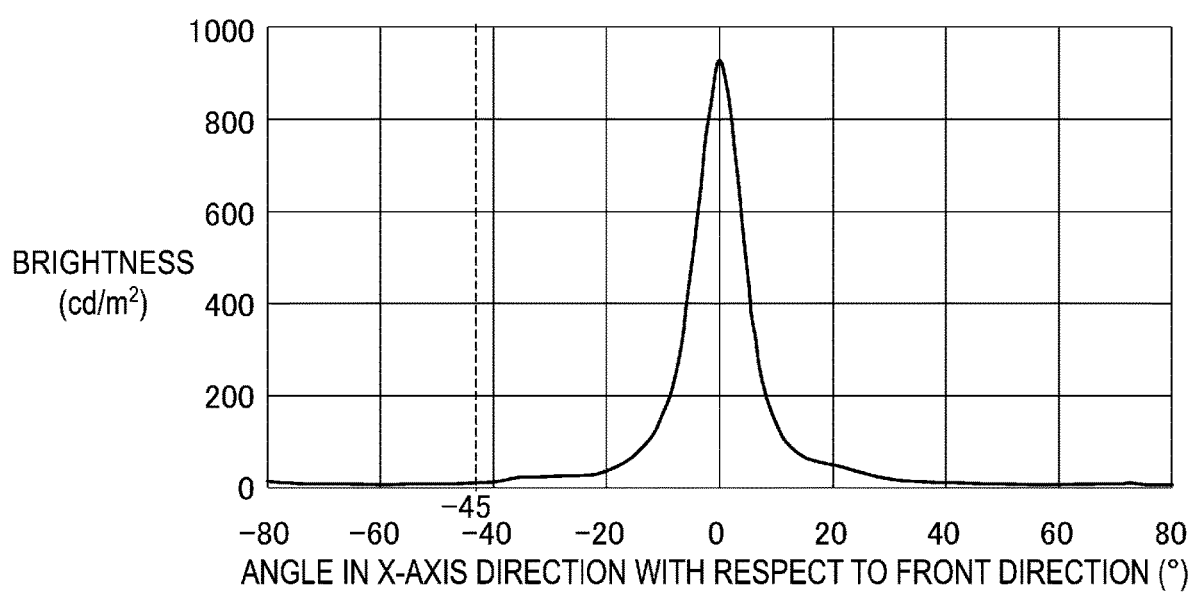
FIG. 11 is a graph according to light distribution when a first LED is turned on and a second LED is turned off in Demonstration Experiment 2.
Figure 12:
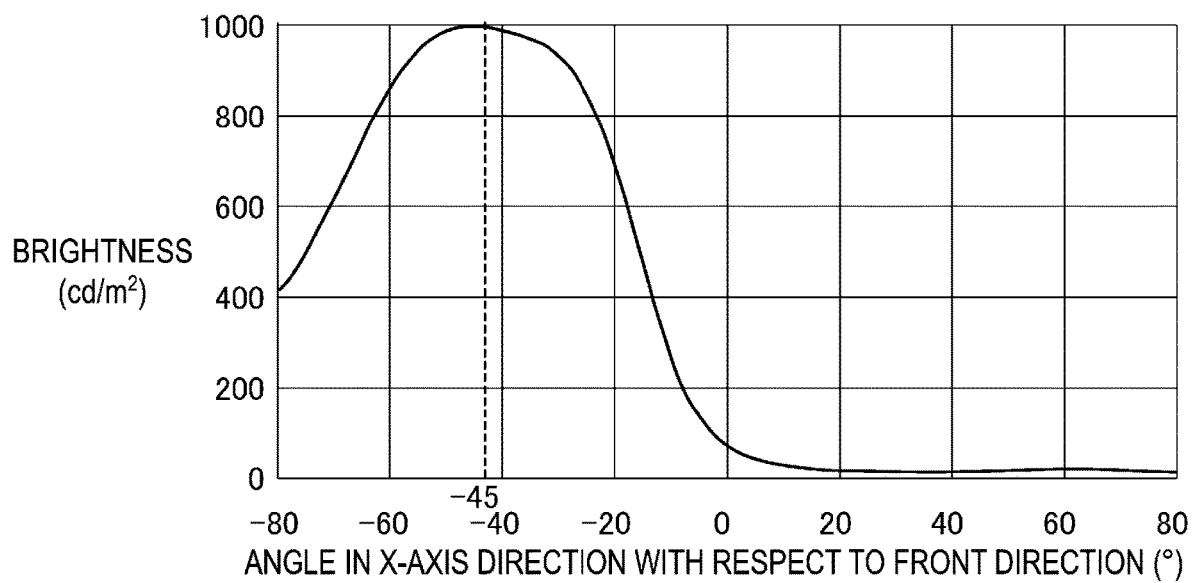
FIG. 12 is a graph according to light distribution when the second LED is turned on and the first LED is turned off in Demonstration Experiment 2.
Figure 13:
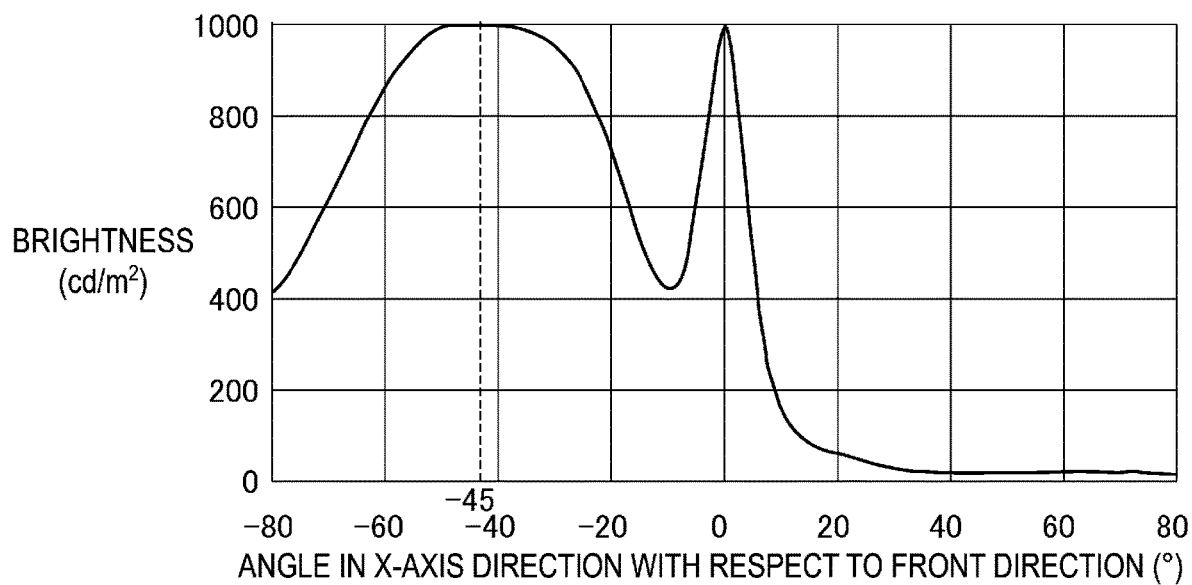
FIG. 13 is a graph according to light distribution when both of the first LED and the second LED are turned on in Demonstration Experiment 2.

An experimental result according to the light distribution in Demonstration Experiment 2 is as shown in FIGS. 11 to 13. In a graph according to the light distribution shown in FIGS. 11 to 13, a horizontal axis is an angle (in units of "°") in the X-axis direction with respect to the front direction (Z-axis direction), and a vertical axis is brightness (in units of "cd/m$^2$"). Positive and negative symbols provided to the angles in the horizontal axis in FIGS. 11 to 13 have the same meaning as the symbols provided to the horizontal axis in the graph in FIG. 10. FIG. 11 shows the light distribution when the first LED 13 is turned on and the second LED 24 is turned off. FIG. 12 shows the light distribution when the second LED 24 is turned on and the first LED 13 is turned off. FIG. 13 shows the light distribution when both of the first LED 13 and the second LED 24 are turned on. Note that FIGS. 11 to 13 indicate, by a broken line, an angle)(−45° of peak brightness when the second LED 24 is turned on in the second light guide plate 25 having the inclination angle θ2 of 27° of the sixth light guide plate inclined surface 28A.

The experimental result of Demonstration Experiment 2 will be described. According to the light distribution in FIG. 11, the peak brightness was at substantially 0°, and an emission angle range was approximately +10°. It can be said that the result reflects the fact that the emission angle range of light emitted from the first light guide plate 14 by turning on the first LED 13 is restricted to approximately +10° by the first louver 18. In FIG. 11, it is clear that the light is hardly emitted around −45°. The light distribution in FIG. 12 matches the light distribution when the inclination angle θ2 is set to 27° in Demonstration Experiment 1. In other words, the light distribution in FIG. 12 is biased toward the left side in the X-axis direction, that is, the side opposite to the second LED 24 side such that the peak brightness is around −45°, and an emission angle range is approximately −80° to 0°. The light distribution in FIG. 13 is a combination of the light distribution in FIG. 11 and the light distribution in FIG. 12. In other words, in the light distribution in FIG. 13, the peak brightness is present at substantially 0° and around −45°.

Figure 14:
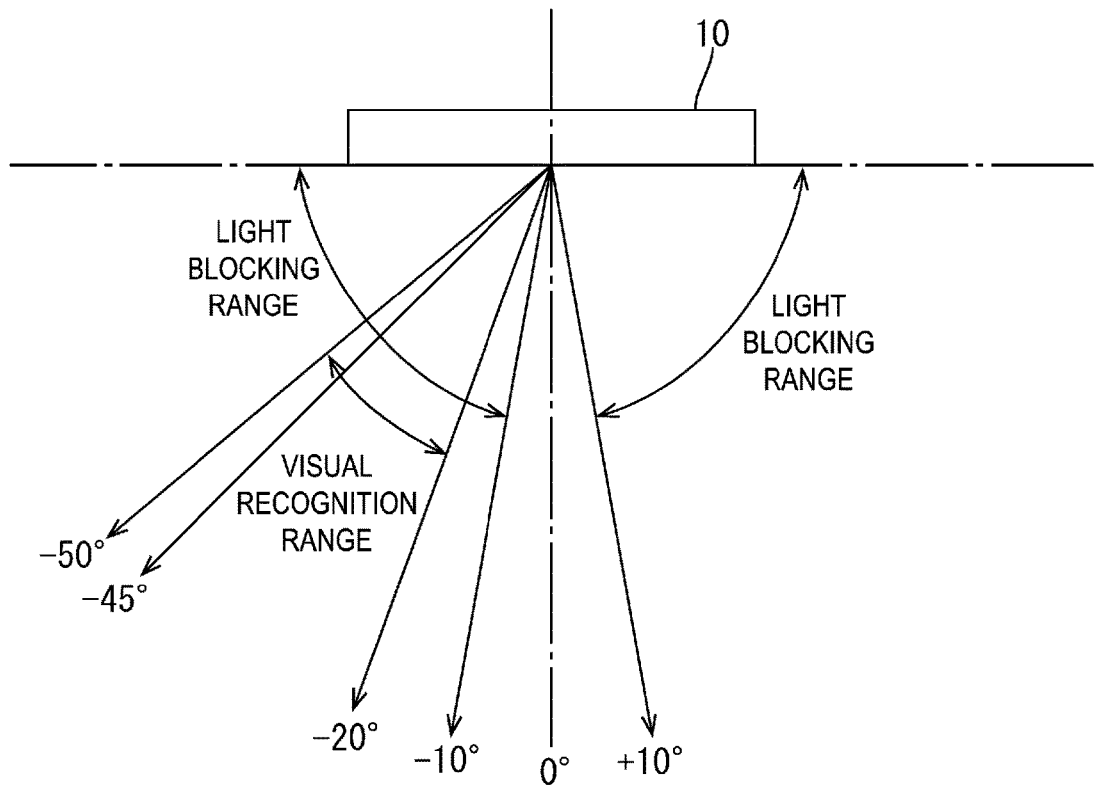
FIG. 14 is a diagram for describing an angle in the X-axis direction with respect to a front direction in the liquid crystal display device installed in front of a passenger seat of a passenger vehicle.

FIG. 14 is illustrated for a supplementary description of the graphs shown in FIGS. 11 to 13. FIG. 14 is a diagram for describing an angle in the X-axis direction with respect to the front direction in the liquid crystal display device 10 installed in front of a passenger seat of a passenger vehicle. FIG. 14 illustrates a light blocking range (+10° to +90°, −10° to)−90° in which light is blocked by the first louver 18, a visual recognition range (−20° to)−50° when the liquid crystal display device 10 is visually recognized from a driver seat located on the left side with respect to the passenger seat, and peak brightness)(−45° when the inclination angle θ2 is set to 27°. According to FIGS. 11 and 14, when the first LED 13 is turned on and the second LED 24 is turned off, the peak brightness is at substantially 0°, and an emission angle range is approximately +10°. Thus, it can be said that a display image of the liquid crystal display device 10 can be visually recognized from the passenger seat located at 0° in an excellent manner while most of the display image of the liquid crystal display device 10 cannot be visually recognized from the driver seat. According to FIGS. 12 and 14, when the second LED 24 is turned on and the first LED 13 is turned off, the peak brightness is around −45°, and an emission angle range is approximately −80° to 0°. Thus, it can be said that a display image of the liquid crystal display device 10 can be visually recognized from the driver seat in an excellent manner while most of the display image of the liquid crystal display device 10 cannot be visually recognized from the passenger seat located at 0°. According to FIGS. 13 and 14, when both of the first LED 13 and the second LED 24 are turned on, the peak brightness is present at substantially 0° and around −45°. Thus, it can be said that a display image of the liquid crystal display device 10 can be visually recognized from both the driver seat and the passenger seat in an excellent manner.

Subsequently, in order to validate an advantage of the backlight device 12 and the liquid crystal display device 10 according to the present embodiment, the following Comparative Experiment 1 was performed. In Comparative Experiment 1, the backlight device 12 having a configuration in which the contact angle θc of the fourth light guide plate lens 26 provided in the second light guide plate 25 was set to 49°, the apex angle θ1 of the fifth light guide plate lens 27 was set to 110°, the inclination angle θ2 of the sixth light guide plate inclined surface 28A of the sixth light guide plate lens 28 was set to 27°, and the inclination angle θ3 of the seventh light guide plate inclined surface 28B was set to 40° was set as Example 1. In the second light guide plate 25 in Example 1, each numerical value of the contact angle θc of the fourth light guide plate lens 26, the apex angle θ1 of the fifth light guide plate lens 27, and the inclination angle θ3 of the seventh light guide plate inclined surface 28B is intentionally changed from that of the second light guide plate 25 provided in the backlight device 12 described before the present paragraph, and more side lobe light is intentionally set to be emitted. The reason is that a difference from Comparative Examples 1 to 3 described below is easily understood. In Comparative Experiment 1, a backlight device having a configuration in which the sixth light guide plate lens 28 was removed from the second light guide plate 25 according to Example 1 was set as Comparative Example 1. In Comparative Experiment 1, a backlight device having a configuration in which the fourth light guide plate lens 26 was removed from the second light guide plate 25 according to Example 1 was set as Comparative Example 2. In Comparative Experiment 1, a backlight device having a configuration in which the fourth light guide plate lens 26 and the fifth light guide plate lens 27 were removed from the second light guide plate 25 according to Example 1 was set as Comparative Example 3. In Comparative Experiment 1, a backlight device having a configuration in which the fourth light guide plate lens 26, the fifth light guide plate lens 27, and the sixth light guide plate lens 28 were removed from the second light guide plate 25 according to Example 1 was set as a reference example. A second light guide plate according to the reference example is a flat plate in which both main surfaces are planes. In Comparative Experiment 1, brightness according to emission light in a state where the first LED 13 was turned on and the second LED 24 was turned off in each of the backlight devices according to the reference example, Comparative Examples 1 to 3, and Example 1 was measured, peak brightness was calculated, and a graph according to light distribution (brightness angle distribution) in the X-axis direction was also produced. Peak brightness is a relative value in which the peak brightness according to the reference example is set as a reference (100%). Moreover, ratios of light at each angle of −25°, −35°, and −45° of the light distribution in the X-axis direction according to the reference example, Comparative Examples 1 to 3, and Example 1 were each calculated. In the calculation, peak brightness at each angle of −25°, −35°, and −45° is divided by overall peak brightness (relative brightness "1").

Figure 16:
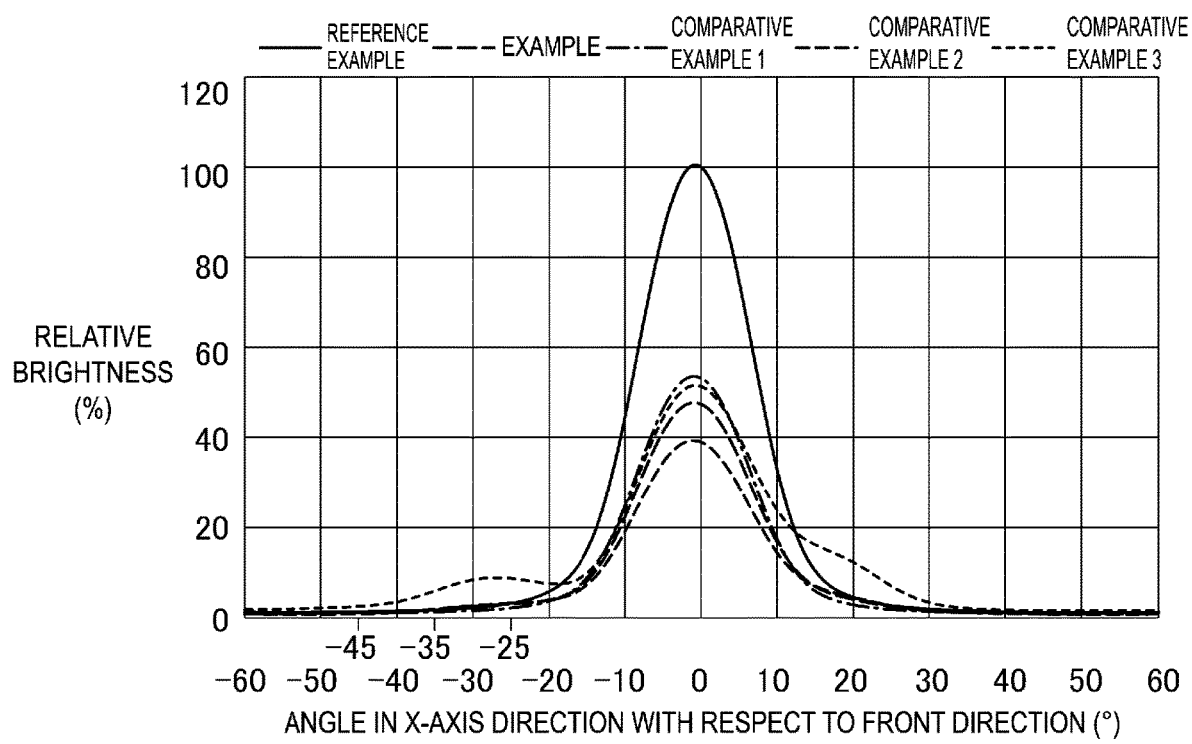
FIG. 16 is a graph showing light distribution according to a reference example, Comparative Examples 1 to 3, and Example 1 in Comparative Experiment 1.

An experimental result of Comparative Experiment 1 is as illustrated in FIGS. 15 and 16. FIG. 15 is a table showing the experimental result of Comparative Experiment 1. FIG. 15 shows, in order from the top, a configuration of the second light guide plate (presence or absence of each of the light guide plate lenses 26 to 28), a ratio (in units of "%") of the light at each angle of −25°, −35°, and −45° of the light distribution in the X-axis direction, and a percentage (in units of "%") of peak brightness. FIG. 16 is a graph showing the light distribution according to the reference example, Comparative Examples 1 to 3, and Example 1. In the graph according to the light distribution shown in FIG. 16, a horizontal axis is an angle (in units of "°") in the X-axis direction with respect to the front direction (Z-axis direction), and a vertical axis is relative brightness (in units of "%"). Positive and negative symbols provided to the angles in the horizontal axis in FIG. 16 have the same meaning as the symbols provided to the horizontal axis in the graph in FIG. 10.

The experimental result of Comparative Experiment 1 will be described. According to FIGS. 15 and 16, the reference example has the lowest ratio of light at each angle of −25°, −35°, and −45° of the light distribution in the X-axis direction, and has the highest peak brightness. The reason is inferred to be that the second light guide plate according to the reference example is the flat plate in which both main surfaces are the planes, and thus light emitted from the first light guide plate 14 side is hardly refracted. Comparative Example 3 has the highest ratio of light at each angle of −25°, −35°, and −45° of the light distribution in the X-axis direction, and Comparative Example 2 has the second highest ratio of light at each angle of −25°, −35°, and −45°. Both Comparative Examples 2 and 3 include the sixth light guide plate lens 28, but do not include the fourth light guide plate lens 26. When light emitted from the first LED 13 is incident on the second opposite main surface 25C of the second light guide plate 25, and is refracted by the sixth light guide plate inclined surface 28A and the seventh light guide plate inclined surface 28B of the sixth light guide plate lens 28, the light is more likely to become side lobe light greatly inclined to the front direction, and it is inferred that the tendency reflects experimental results of Comparative Examples 2 and 3. A difference between Comparative Examples 2 and 3 is presence or absence of the fifth light guide plate lens 27. In Comparative Example 2 including the fifth light guide plate lens 27, the second opposite main surface 25C is provided with the fifth light guide plate lens 27, and thus an occupied ratio of the sixth light guide plate lens 28 in the second opposite main surface 25C is lower than that of Comparative Example 3. Thus, it is inferred that an occurrence of side lobe light caused by the sixth light guide plate inclined surface 28A and the seventh light guide plate inclined surface 28B of the sixth light guide plate lens 28 is suppressed in Comparative Example 2. In contrast, Comparative Example 2 has the lowest peak brightness of 39%. The reason is inferred to be that a condensing function by the fourth light guide plate lens 26 is impaired, and thus light cannot be sufficiently raised in the front direction.

According to FIGS. 15 and 16, Comparative Example 1 has the next lowest ratio of light at each angle of −25°, −35°, and −45° of the light distribution in the X-axis direction after that of the reference example. The reason is inferred to be that Comparative Example 1 does not include the sixth light guide plate lens 28, and side lobe light caused by the sixth light guide plate inclined surface 28A and the seventh light guide plate inclined surface 28B of the sixth light guide plate lens 28 does not occur. According to FIGS. 15 and 16, Example 1 has the next lowest ratio of light at each angle of 20°, −35°, −45° after that of Comparative Example 1. In other words, Example 1 has more side lobe light than that of Comparative Example 1, but has less side lobe light than that of Comparative Examples 2 and 3. It is inferred that Example 1 includes the fifth light guide plate lens 27 similarly to Comparative Example 2, and thus an occupied ratio of the sixth light guide plate lens 28 in the second opposite main surface 25C decreases, and Example 1 has less side lobe light than that of Comparative Example 3. Since Example 1 includes the fourth light guide plate lens 26, light can be sufficiently raised in the front direction, and a part of the light is also totally reflected and returned to the first light guide plate 14 side. Thus, it is inferred that recursive light is generated and includes light at an angle close to the front direction, and thus Example 1 improves peak brightness further than that of Comparative Example 2, and also has less side lobe light than that of Comparative Example 2. Note that, in Comparative Example 1, the next best experimental result after that of the reference example can be acquired in the Comparative Experiment 1, but Comparative Example 1 does not include the sixth light guide plate lens 28, and thus light emitted from the second LED 24 can be hardly emitted.

Next, Demonstration Experiment 3 was performed in order to acquire knowledge related to how light distribution changes when the inclination angle θ3 formed by the seventh light guide plate inclined surface 28B of the sixth light guide plate lens 28 of the second light guide plate 25 with respect to the X-axis direction is changed. In Demonstration Experiment 3, the backlight device 12 having the same configuration as that described before the present paragraph is used except for a configuration of the sixth light guide plate lens 28. In Demonstration Experiment 3, the inclination angle θ3 formed by the seventh light guide plate inclined surface 28B of the sixth light guide plate lens 28 with respect to the X-axis direction was changed in a range from 1° to 60°. Specifically, in Demonstration Experiment 3, the inclination angle θ3 was set to 1°, 3°, 5°, 10°, 20°, 30°, 40°, 50°, and 60°. Note that the inclination angle θ2 formed by the sixth light guide plate inclined surface 28A with respect to the X-axis direction is set constant at 27°. In the backlight device 12 in which the inclination angle θ3 was changed in such a manner, brightness according to emission light in a state where the first LED 13 was turned on and the second LED 24 was turned off was measured, and a graph according to light distribution (brightness angle distribution) in the X-axis direction was produced. Moreover, ratios of light at each angle of −25°, −35°, and −45° of the light distribution in the X-axis direction at all of the inclination angles θ3 described above were each calculated. In the calculation, peak brightness at each angle of −25°, −35°, and −45° is divided by overall peak brightness (relative brightness "1").

Figure 17:
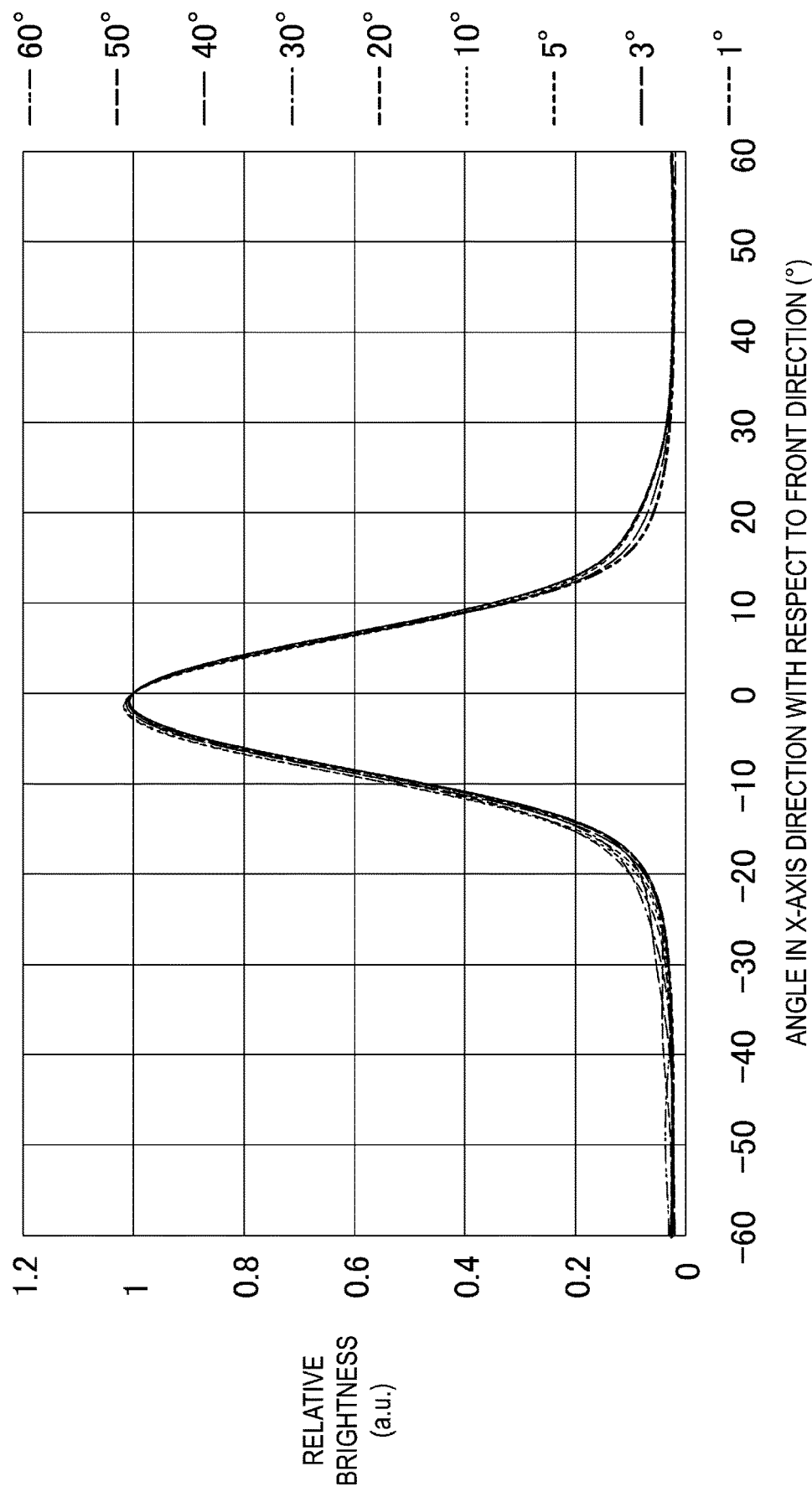
FIG. 17 is a graph showing light distribution when an inclination angle θ3 of the seventh light guide plate inclined surface is changed in Demonstration Experiment 3.
Figure 18:
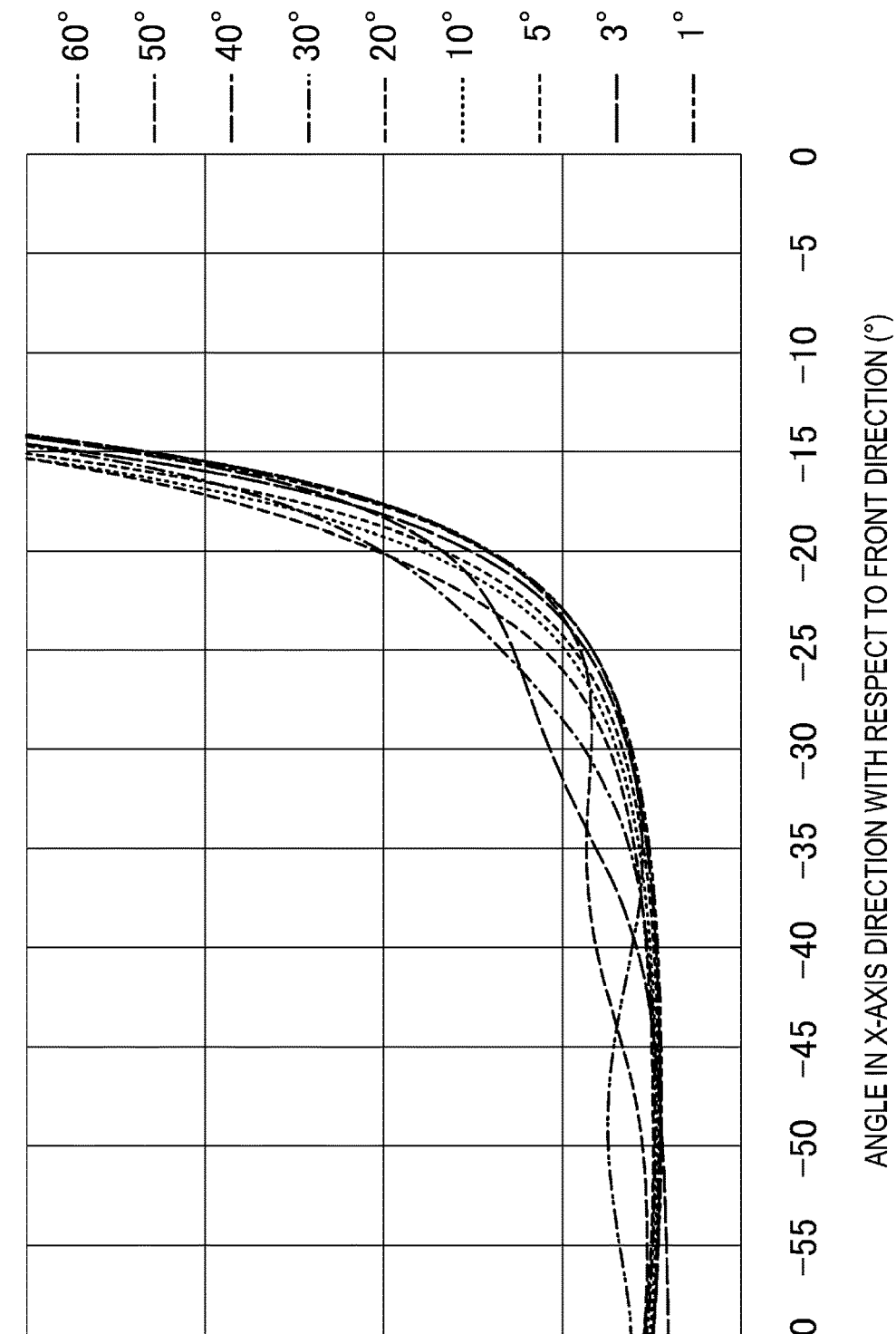
FIG. 18 is an enlarged graph of a part of FIG. 17.
Figure 19:
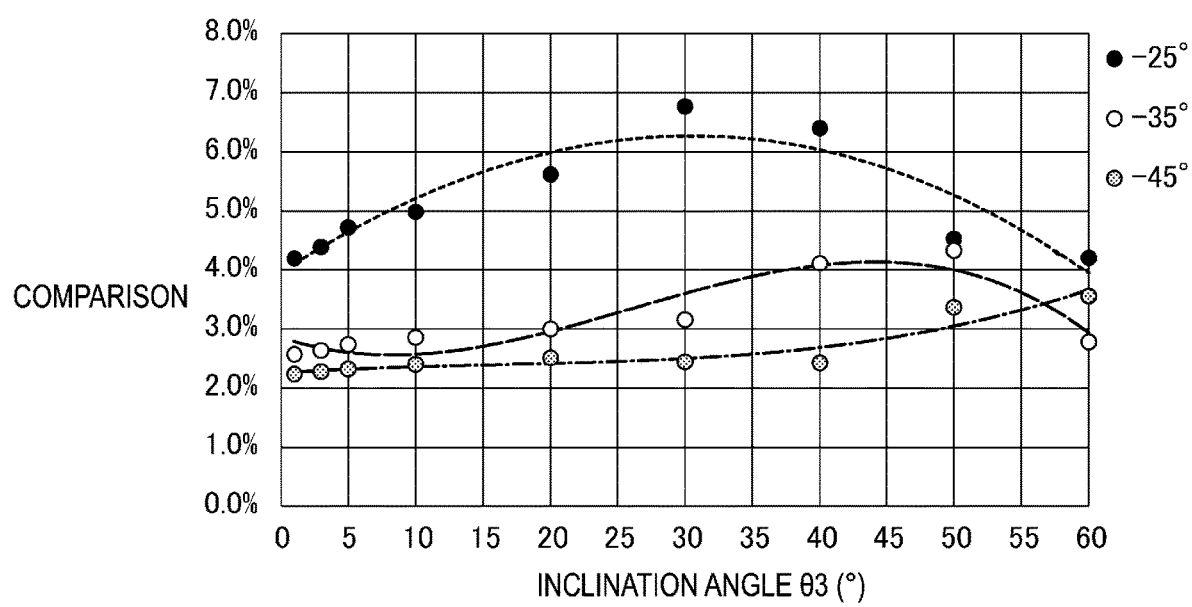
FIG. 19 is a graph showing a relationship between the inclination angle θ3 of the seventh light guide plate inclined surface and a ratio of light at each angle of −25°, −35°, and −45° of light distribution in the X-axis direction in Demonstration Experiment 3.

An experimental result of Demonstration Experiment 3 is as shown in FIGS. 17 to 19. FIG. 17 is a graph showing the light distribution when the inclination angle θ3 is set to 1°, 3°, 5°, 10°, 20°, 30°, 40°, 50°, and 60°. In the graph according to the light distribution shown in FIG. 17, a horizontal axis is an angle (in units of "°") in the X-axis direction with respect to the front direction (Z-axis direction), and a vertical axis is relative brightness (no unit). FIG. 18 is an enlarged graph of a range from 0° to −60° in the horizontal axis and a range from 0 to 0.2 in the vertical axis in FIG. 17. FIG. 19 is a graph showing a relationship between the inclination angle θ3 and a ratio of light at each angle of −25°, −35°, and −45° of the light distribution in the X-axis direction. In FIG. 19, a horizontal axis is the inclination angle θ3 (in units of "°"), and a vertical axis is a ratio (in units of "%") of the light at each angle of −25°, −35°, and −45° of the light distribution in the X-axis direction. In order for side lobe light to be less likely to be visually recognized, it is preferable that a ratio of light at −25° is equal to or less than 5%, a ratio of light at −35° is equal to or less than 3%, and a ratio of light at −45° is equal to or less than 2.5%. In this way, a reference value at which side lobe light is less likely to be visually recognized tends to be lower as an angle in the light distribution in the X-axis direction increases.

The experimental result of Demonstration Experiment 3 will be described. According to FIGS. 17 to 19, when the inclination angle θ3 is 20°, 30°, and 40°, a ratio of light at −25° of the light distribution in the X-axis direction exceeds 5%. When the inclination angle θ3 is 30°, 40°, 50°, and 60°, a ratio of light at −35° of the light distribution in the X-axis direction exceeds 3%. When the inclination angle θ3 is 50° and 60°, a ratio of light at −45° of the light distribution in the X-axis direction exceeds 2.5%. Then, it is clear that a reference value of a ratio of light at each angle of −25°, −35°, and −45° of the light distribution in the X-axis direction is satisfied when the inclination angle θ3 is 1°, 3°, 5°, and 10°. Therefore, it can be said that, when the inclination angle θ3 is within a range from 1° to 10°, side lobe light can be sufficiently less likely to be visually recognized. When the inclination angle θ3 is within the range from 1° to 10°, a ratio of light at each angle of −25°, −35°, and −45° of the light distribution in the X-axis direction tends to be lower with a smaller numerical value. Therefore, it is most preferable that the inclination angle θ3 is set to 1° or 3° in order for side lobe light to be less likely to be visually recognized. Since it is difficult to form the sixth light guide plate lens 28 having the inclination angle θ3 of 1° in manufacturing, it can be said that the inclination angle θ3 is most preferably set to 3° in consideration of ease of manufacturing.

Next, Demonstration Experiment 4 was performed in order to acquire knowledge related to how light distribution changes when the apex angle θ1 of the fifth light guide plate lens 27 of the second light guide plate 25 is changed. In Demonstration Experiment 4, the backlight device 12 having the same configuration as that described before Demonstration Experiment 1 is used except for a configuration of the fifth light guide plate lens 27. In Demonstration Experiment 1, the apex angle θ1 formed by the pair of fifth light guide plate inclined surfaces 27A of the fifth light guide plate lens 27 was changed in a range from 90° to 150°. Specifically, in Demonstration Experiment 4, the apex angle θ1 was set to 90°, 100°, 110°, 120°, 130°, 140°, and 150°. In the backlight device 12 in which the apex angle θ1 was changed in such a manner, brightness according to emission light in a state where the first LED 13 was turned on was measured. Ratios of light at each angle of −25°, −35°, and −45° of the light distribution in the X-axis direction at all of the apex angles θ1 were each calculated based on data of the brightness according to the measured emission light. In the calculation, peak brightness at each angle of −25°, −35°, and −45° is divided by overall peak brightness (relative brightness "1").

Figure 20:
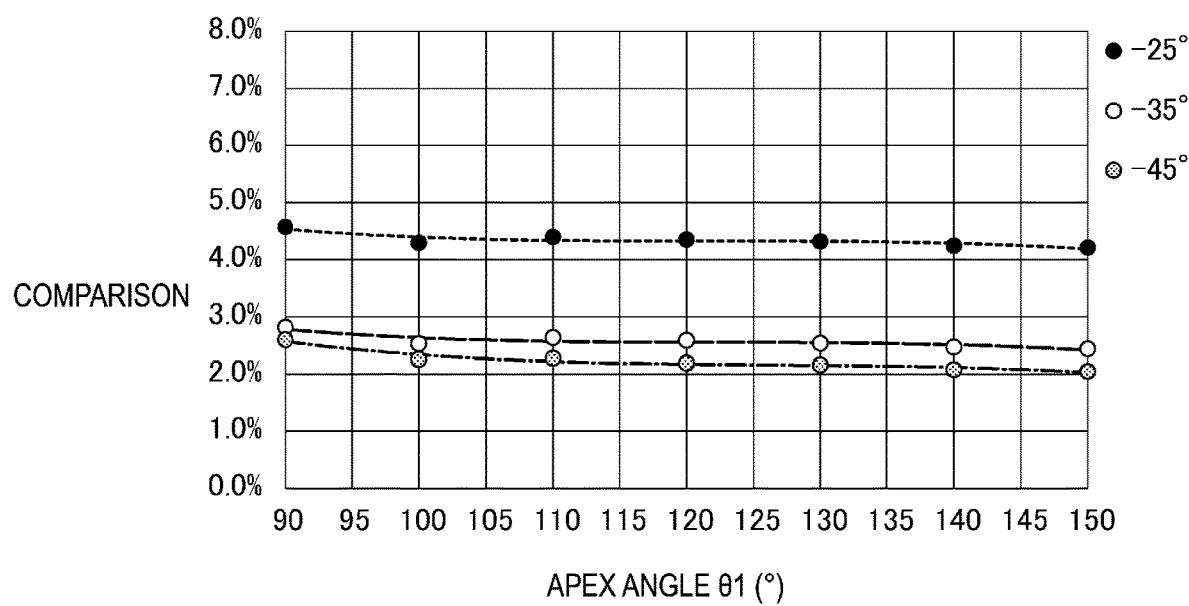
FIG. 20 is a graph showing a relationship between an apex angle θ1 of a fifth light guide plate lens and a ratio of light at each angle of −25°, −35°, and −45° of light distribution in the X-axis direction in Demonstration Experiment 4.
Figure 21:
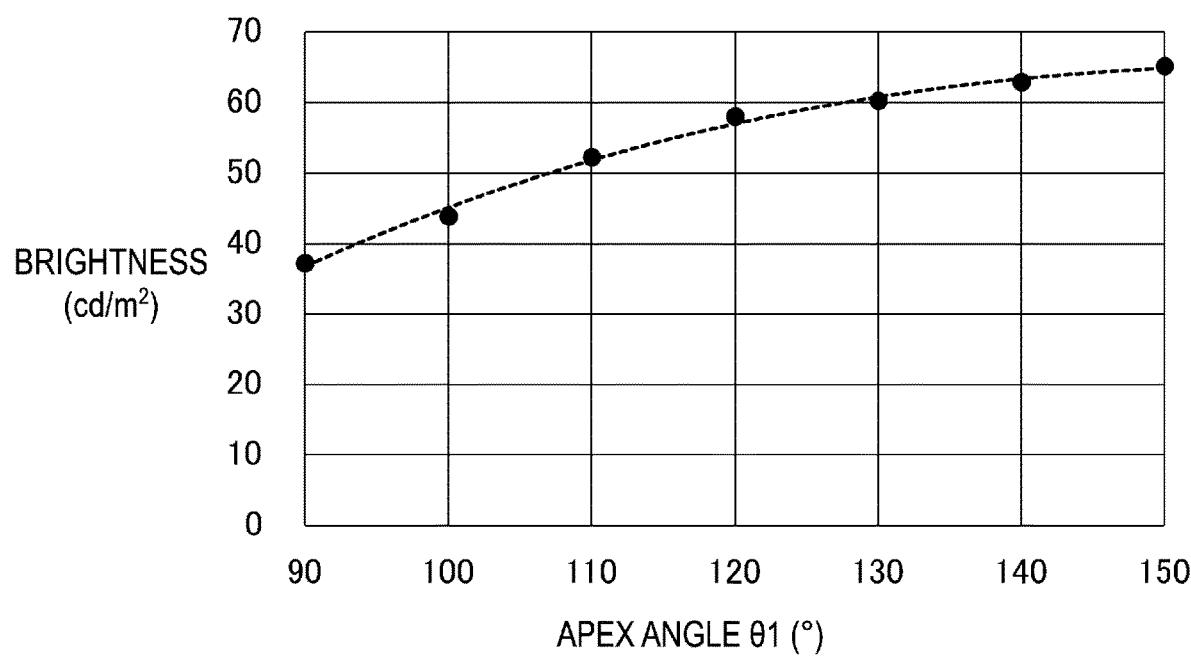
FIG. 21 is a graph showing a relationship between the apex angle θ1 and brightness at 0° of the light distribution in the X-axis direction in Demonstration Experiment 4.

An experimental result according to the light distribution in Demonstration Experiment 4 is as shown in FIGS. 20 and 21. FIG. 20 is a graph showing a relationship between the apex angle θ1 and a ratio of light at each angle of −25°, −35°, and −45° of the light distribution in the X-axis direction. In FIG. 20, a horizontal axis is the apex angle θ1 (in units of "°"), and a vertical axis is a ratio (in units of "°") of the light at each angle of −25°, −35°, and −45° of the light distribution in the X-axis direction. FIG. 21 is a graph showing a relationship between the apex angle θ1 and brightness (front brightness) at 0° of the light distribution in the X-axis direction. In FIG. 21, a horizontal axis is the apex angle θ1 (in units of "°"), and a vertical axis is the brightness (in units of "cd/m$^2$").

The experimental result of Demonstration Experiment 4 will be described. In comparison with FIG. 19 of Demonstration Experiment 3, in FIG. 20 of Demonstration Experiment 4, it is clear that a ratio of light at each angle of −25°, −35°, and −45° of the light distribution in the X-axis direction is hardly changed even when the apex angle θ1 is changed. In other words, it can be said that, even when the apex angle θ1 of the fifth light guide plate lens 27 has any numerical value, an influence on emission light from the first light guide plate 14 side is hardly changed. On the other hand, according to FIG. 21, it is clear that the front brightness is improved with a greater apex angle θ1, and the front brightness decreases with a smaller apex angle θ1. The reason is inferred to be that, with a smaller apex angle θ1, emission light from the first light guide plate 14 side is greatly refracted by the fifth light guide plate inclined surface 27A and is angled so as to be greatly inclined to the front direction.

Next, Demonstration Experiment 5 was performed in order to acquire knowledge related to how light distribution changes when the contact angle θc of the fourth light guide plate lens 26 of the second light guide plate 25 is changed. In Demonstration Experiment 5, the backlight device 12 having the same configuration as that described before Demonstration Experiment 1 is used except for a configuration of the fourth light guide plate lens 26. In Demonstration Experiment 1, the contact angle θc of the fourth light guide plate lens 26 was changed in a range from 15° to 58°. Specifically, in Demonstration Experiment 5, the contact angle θc was set to 15°, 20°, 30°, 40°, 48°, and 58°. In the backlight device 12 in which the contact angle θc was changed in such a manner, brightness according to emission light in a state where the first LED 13 was turned on was measured. Ratios of light at each angle of −25°, −35°, and −45° of the light distribution in the X-axis direction at all of the contact angles θc were each calculated based on data of the brightness according to the measured emission light. In the calculation, peak brightness at each angle of −25°, −35°, and −45° is divided by overall peak brightness (relative brightness "1").

Figure 22:
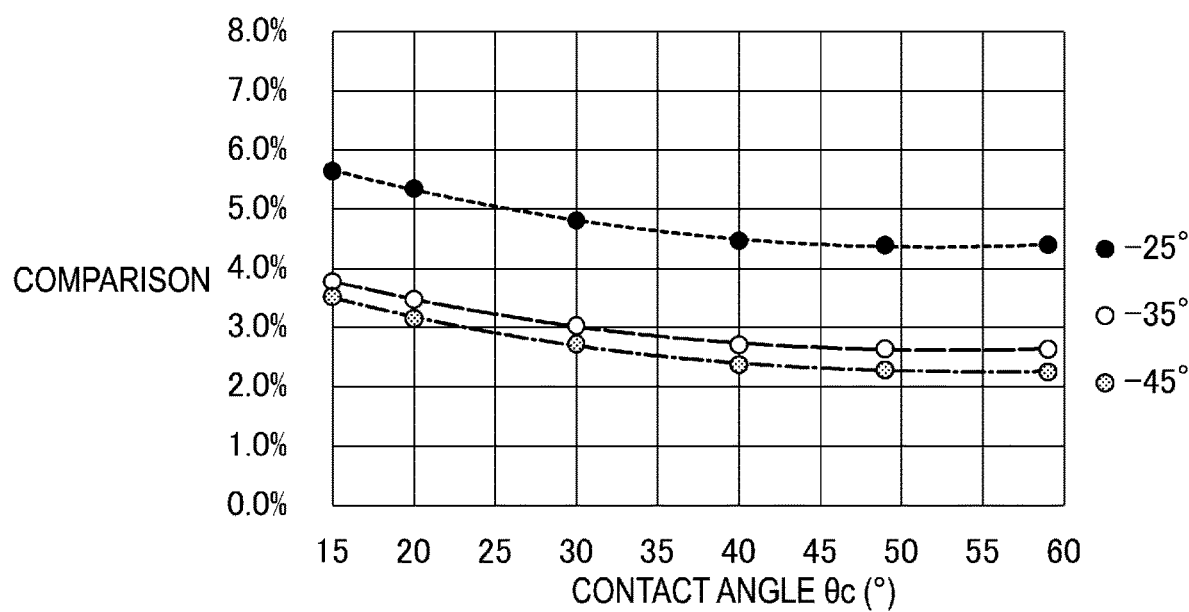
FIG. 22 is a graph showing a relationship between a contact angle θc of a fourth light guide plate lens and a ratio of light at each angle of −25°, −35°, and −45° of light distribution in the X-axis direction in Demonstration Experiment 5.
Figure 23:
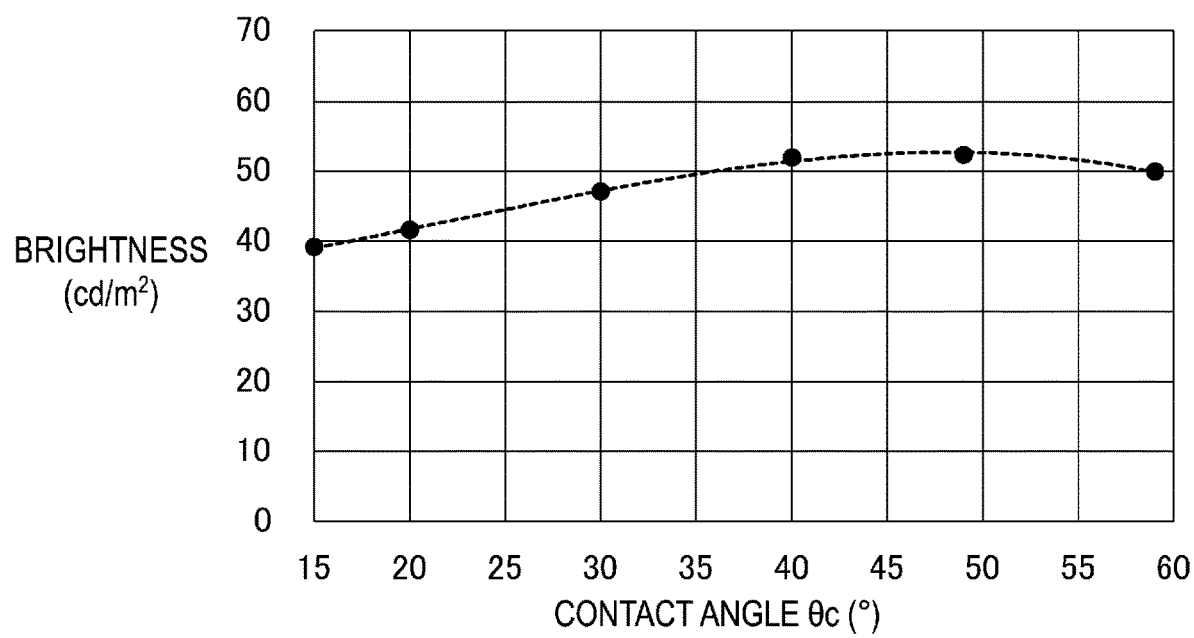
FIG. 23 is a graph showing a relationship between the contact angle θc of the fourth light guide plate lens and brightness at 0° of the light distribution in the X-axis direction in Demonstration Experiment 5.

An experimental result according to the light distribution in Demonstration Experiment 5 is as shown in FIGS. 22 and 23. FIG. 22 is a graph showing a relationship between the contact angle θc and a ratio of light at each angle of −25°, −35°, and −45° of the light distribution in the X-axis direction. In FIG. 22, a horizontal axis is the contact angle θc (in units of "°"), and a vertical axis is a ratio (in units of "%") of the light at each angle of −25°, −35°, and −45° of the light distribution in the X-axis direction. FIG. 23 is a graph showing a relationship between the contact angle θc and brightness (front brightness) at 0° of the light distribution in the X-axis direction. In FIG. 23, a horizontal axis is the contact angle θc (in units of "°"), and a vertical axis is the brightness (in units of "cd/m$^2$").

The experimental result of Demonstration Experiment 5 will be described. According to FIG. 22, it is clear that a ratio of light at each angle of −25°, −35°, and −45° of the light distribution in the X-axis direction tends to decrease with a greater contact angle θc. The reason is inferred to be that, with a greater contact angle θc, most emission light from the first light guide plate 14 side is totally reflected and returned to the first light guide plate 14 side, and thus a lot of recursive light is generated, and, as a result, a lot of light at an angle close to the front direction (0°) can be emitted. Note that, when FIG. 22 is compared with FIG. 19 of Demonstration Experiment 3, it can be said that a rate of change of the ratio of light at each angle of −25°, −35°, and −45° in Demonstration Experiment 5 is relatively low. According to FIG. 23, it is clear that the front brightness is improved with a greater contact angle θc, and the front brightness decreases with a smaller contact angle θc. The reason is the same as that described in FIG. 22, and the reason is inferred to be that more recursive light can be generated with a greater contact angle θc.

As described above, the backlight device (illumination device) 12 according to the present embodiment includes: the first LED (first light source) 13; the first light guide plate 14 including at least a part of an outer circumferential end face as the first light entering end face (first end face) 14A configured to face the first LED 13 and receive incident light, including one main surface as the first light guide plate-light emission main surface (first main surface) 14B configured to emit light, and including an other main surface as the first opposite main surface (second main surface) 14C; the first louver (first sheet) 18 including one main surface as the first light entering main surface (third main surface) 18A configured to face the first light guide plate-light emission main surface 14B and receive incident light, and including an other main surface as the first light emission main surface (fourth main surface) 18B configured to emit light; the second LED (second light source) 24; and the second light guide plate 25 including at least a part of an outer circumferential end face as the second light entering end face (second end face) 25A configured to face the second LED 24 and receive incident light, including one main surface as the second light guide plate-light emission main surface (fifth main surface) 25B configured to emit light, and including an other main surface as the second opposite main surface (sixth main surface) 25C configured to face the first light emission main surface 18B, wherein the first louver 18 includes at least the two first light blocking portions 18C disposed at an interval in a first direction including a direction from the first LED 13 toward the first light guide plate 14 and configured to block light, and the first light-transmitting portion 18D disposed between the two first light blocking portions 18C and configured to transmit light, and the second opposite main surface 25C of the second light guide plate 25 is provided with the sixth light guide plate lens (first lens) 28 including the sixth light guide plate inclined surface (first inclined surface) 28A having an inclination rising from a side opposite to the second LED 24 in the first direction toward the second LED 24 side.

In this way, light emitted from the first LED 13 and incident on the first light entering end face 14A of the first light guide plate 14 propagates inside the first light guide plate 14, and is also emitted from the first light guide plate-light emission main surface 14B and incident on the first light entering main surface 18A of the first louver 18. The light incident on the first light entering main surface 18A of the first louver 18 is transmitted through the first light-transmitting portion 18D disposed between the two first light blocking portions 18C, and is emitted from the first light emission main surface 18B. An emission angle of the emission light from the first light emission main surface 18B is restricted by the two first light blocking portions 18C. When the emission light from the first light emission main surface 18B is incident on the second opposite main surface 25C of the second light guide plate 25, the emission light is emitted from the second light guide plate-light emission main surface 25B. The light emitted from the second light guide plate-light emission main surface 25B has an angle range restricted by the first light blocking portion 18C of the first louver 18, and thus is less likely to be emitted outside of the restricted angle range. In this way, when the first LED 13 is turned on and the second LED 24 is turned off, the light can be selectively emitted in the restricted angle range.

Light emitted from the second LED 24 and incident on the second light entering end face 25A of the second light guide plate 25 is incident on the sixth light guide plate inclined surface 28A of the sixth light guide plate lens 28 provided on the second opposite main surface 25C in a process of propagating inside the second light guide plate 25. The light incident on the sixth light guide plate inclined surface 28A having an inclination rising from the side opposite to the second LED 24 in the first direction in the second light guide plate 25 toward the second LED 24 side is reflected and emitted from the second light guide plate-light emission main surface 25B. The emission light from the second light guide plate-light emission main surface 25B includes light toward the side opposite to the second LED 24 side in the first direction with respect to a normal direction of the second light guide plate-light emission main surface 25B, that is, the front direction more than light toward the second LED 24 side in the first direction. Therefore, when the second LED 24 is turned on, emission light having a brightness angle distribution in which peak brightness according to the emission light is biased toward the side opposite to the second LED 24 side in the first direction can be supplied. In this way, brightness of emission light in a direction inclined with respect to the front direction can be sufficiently ensured.

Further, the sixth light guide plate inclined surface 28A has the angle θ2 formed with respect to the first direction in a range from 27° to 40°. When an angle formed by the sixth light guide plate inclined surface 28A with respect to the first direction is greater than 40°, there is a risk that light refracted by the sixth light guide plate inclined surface 28A is more likely to be emitted at an angle close to the front direction, and is more likely to be emitted at an angle toward the second LED 24 side in the first direction. When an angle formed by the sixth light guide plate inclined surface 28A with respect to the first direction is smaller than 27°, there is a risk that light refracted by the sixth light guide plate inclined surface 28A is emitted at an angle excessively inclined to the front direction. In this regard, as described above, the angle θ2 formed by the sixth light guide plate inclined surface 28A with respect to the first direction is set within the range from 27° to 40°, and thus a lot of light can be emitted at an angle appropriately inclined to the side opposite to the second LED 24 side in the first direction with respect to the front direction. In this way, brightness of emission light in a direction inclined with respect to the front direction can be further improved.

Further, the sixth light guide plate lens 28 includes the seventh light guide plate inclined surface (second inclined surface) 28B having an inclination rising from the second LED 24 in the first direction toward the side opposite to the second LED 24. When light traveling toward the second LED 24 in the first direction inside the second light guide plate 25 is incident on the seventh light guide plate inclined surface 28B and refracted, the light travels toward the side opposite to the second LED 24 side in the first direction with respect to the front direction. In this way, brightness of emission light in a direction inclined with respect to the front direction can be further improved. Further, when light traveling away from the second LED 24 in the first direction inside the second light guide plate 25 is incident on the seventh light guide plate inclined surface 28B and refracted, the light is guided so as to go farther away from the second LED 24. In this way, emission light from the second light guide plate-light emission main surface 25B is less likely to be biased toward the second LED 24 side in the first direction.

Further, the seventh light guide plate inclined surface 28B has the angle θ3 formed with respect to the first direction in a range from 3° to 10°. First, when light emitted from the first light guide plate-light emission main surface 14B of the first light guide plate 14 and incident on the second opposite main surface 25C of the second light guide plate 25 is incident on the seventh light guide plate inclined surface 28B and refracted, there is a risk that the light is emitted as side lobe light traveling in a direction inclined to the side opposite to the second LED 24 side in the first direction with respect to the front direction. When an angle formed by the seventh light guide plate inclined surface 28B with respect to the first direction is greater than 10°, the side lobe light described above becomes excessive. When an angle formed by the seventh light guide plate inclined surface 28B with respect to the first direction is smaller than 3°, it is difficult to form the sixth light guide plate lens 28 including the seventh light guide plate inclined surface 28B having such an angle. In this regard, as described above, the angle θ3 formed by the seventh light guide plate inclined surface 28B with respect to the first direction is set within the range from 3° to 10°, and thus the side lobe light described above can be sufficiently reduced, and ease of forming the sixth light guide plate lens 28 can also be guaranteed.

Further, the sixth light guide plate lens 28 includes the first plane 28D located between the sixth light guide plate inclined surface 28A and the seventh light guide plate inclined surface 28B in the first direction and disposed along the first direction. Light emitted from the first light guide plate-light emission main surface 14B of the first light guide plate 14 and incident on the second opposite main surface 25C of the second light guide plate 25 travels hardly refracted even when the light is incident on the first plane 28D. Therefore, as compared to a case of a configuration in which the sixth light guide plate inclined surface 28A and the seventh light guide plate inclined surface 28B are directly connected without the first plane 28D interposed therebetween, an occurrence of side lobe light traveling in a direction inclined to the side opposite to the second LED 24 side in the first direction with respect to the front direction can be suppressed.

Further, the plurality of the sixth light guide plate lenses 28 are disposed side by side in the first direction, and the second opposite main surface 25C of the second light guide plate 25 is provided with the second plane 29 located between two of the sixth light guide plate lenses 28 adjacent to each other in the first direction and disposed along the first direction. Light emitted from the first light guide plate-light emission main surface 14B of the first light guide plate 14 and incident on the second opposite main surface 25C of the second light guide plate 25 travels hardly refracted even when the light is incident on the second plane 29. Therefore, as compared to a case of a configuration in which two sixth light guide plate lenses 28 that are adjacent to each other in the first direction are directly connected without the second plane 29 interposed therebetween, an occurrence of side lobe light traveling in a direction inclined to the side opposite to the second LED 24 side in the first direction with respect to the front direction can be suppressed.

Further, the second light guide plate-light emission main surface 25B of the second light guide plate 25 is provided with the plurality of fourth light guide plate lenses (second lenses) 26 disposed side by side along a second direction orthogonal to both of the first direction and a normal direction of the main surface of the first light guide plate, the plurality of fourth light guide plate lenses 26 extending along the first direction. When an angle of incidence with respect to the fourth light guide plate lens 26 exceeds a critical angle, light that propagates inside the second light guide plate 25 and reaches the second light guide plate-light emission main surface 25B is emitted while being provided with a condensing action in the second direction by the fourth light guide plate lens 26. The light having the angle of incidence with respect to the fourth light guide plate lens 26 that does not exceed the critical angle is totally reflected by the fourth light guide plate lens 26 and returned to the second opposite main surface 25C side. When the light is also totally reflected by the second opposite main surface 25C, the light reaches the second light guide plate-light emission main surface 25B again. In this way, the light inside the second light guide plate 25 is repeatedly totally reflected between the fourth light guide plate lens 26 and the second opposite main surface 25C, travels along the first direction, and then, is emitted from the second light guide plate-light emission main surface 25B, and thus the emission light is less likely to be biased toward the second LED 24 side in the first direction.

Further, the second opposite main surface 25C of the second light guide plate 25 is provided with the plurality of fifth light guide plate lenses (third lenses) 27 disposed side by side at an interval along the second direction orthogonal to both of the first direction and the normal direction of the main surface of the first light guide plate 14, the plurality of fifth light guide plate lenses 27 extending along the first direction, and the plurality of sixth light guide plate lenses 28 are disposed in an alternating manner with the plurality of fifth light guide plate lenses 27 in the second direction. Since most of the light that propagates inside the second light guide plate 25 and reaches the second opposite main surface 25C has an angle of incidence with respect to the fifth light guide plate lens 27 that does not exceed a critical angle, the light is totally reflected by the fifth light guide plate lens 27, and is directed to the second light guide plate-light emission main surface 25B side. Then, when the light is also totally reflected by the second light guide plate-light emission main surface 25B, the light reaches the second opposite main surface 25C again. In this way, the light inside the second light guide plate 25 is repeatedly totally reflected between the fifth light guide plate lens 27 and the second light guide plate-light emission main surface 25B, travels along the first direction, and then, is emitted from the second light guide plate-light emission main surface 25B, and thus the emission light is less likely to be biased toward the second LED 24 side in the first direction. Further, the sixth light guide plate lens 28 and the fifth light guide plate lens 27 are alternately disposed side by side in the second direction in the second opposite main surface 25C. Thus, as compared to when the fifth light guide plate lens 27 is not installed, an occupied ratio of the sixth light guide plate lens 28 in the second opposite main surface 25C is reduced. Since the sixth light guide plate lens 28 refracts a part of emission light from the first light emission main surface 18B of the first light guide plate 14 and may cause side lobe light, the side lobe light can be reduced by reducing the occupied ratio of the sixth light guide plate lens 28 in the second opposite main surface 25C.

Further, the backlight device 12 further includes: the first prism sheet 16 including one main surface facing the first light guide plate-light emission main surface 14B, the first prism sheet 16 including the plurality of first prisms 16B disposed side by side along the first direction and configured to extend along a second direction orthogonal to both of the first direction and the normal direction of the main surface of the first light guide plate 14; and the second prism sheet 17 located on a side opposite to the first light guide plate 14 with respect to the first prism sheet 16, the second prism sheet 17 including the plurality of second prisms 17B disposed side by side along the first direction and configured to extend along the second direction, wherein the first prism 16B includes the first prism inclined surface (third inclined surface) 16B1 having an inclination rising from the first LED 13 side in the first direction in the first prism sheet 16 toward a side opposite to the first LED 13, and includes the second prism inclined surface (fourth inclined surface) 16B2 having an inclination rising from the side opposite to the first LED 13 in the first direction in the first prism sheet 16 toward the first LED 13 side, the second prism 17B includes the third prism inclined surface (fifth inclined surface) 17B1 having an inclination rising from the first LED 13 side in the first direction in the second prism sheet 17 toward the side opposite to the first LED 13, and includes the fourth prism inclined surface (sixth inclined surface) 17B2 having an inclination rising from the side opposite to the first LED 13 in the first direction in the second prism sheet 17 toward the first LED 13 side, and the angle $\theta7$ formed by the third prism inclined surface 17B1 in the second prism 17B with respect to the first direction is smaller than the angle $\theta4$ formed by the first prism inclined surface 16B1 in the first prism 16B with respect to the first direction.

Light emitted from the first LED 13 and incident on the first light entering end face 14A of the first light guide plate 14 propagates inside the first light guide plate 14, and is also emitted from the first light guide plate-light emission main surface 14B and incident on the first prism sheet 16. Most of the light incident on the first prism sheet 16 is incident on the second prism inclined surface 16B2 of the first prism 16B and refracted, and then, is raised and emitted, or is directed to the first prism inclined surface 16B1. Here, the first prism 16B has the angle $\theta4$ formed by the first prism inclined surface 16B1 with respect to the first direction greater than the angle $\theta7$ formed by the third prism inclined surface 17B1 of the second prism 17B with respect to the first direction. Thus, as compared to when the angles are the same or a magnitude relationship between the angles is reversed, light incident on the first prism sheet 16 is less likely and incident on the first prism inclined surface 16B1 in the first prism 16B. When the incident light on the first prism sheet 16 is incident on the first prism inclined surface 16B1 of the first prism 16B, the light tends to be more likely to be emitted as side lobe light when the light is emitted from the first prism 16B. Therefore, when the incident light on the first prism sheet 16 becomes difficult to be directly incident on the first prism inclined surface 16B1 of the first prism 16B, an occurrence of side lobe light is suppressed, and, as a result, usage efficiency of light is improved.

Most of the light emitted from the first prism sheet 16 and incident on the second prism sheet 17 is incident on the fourth prism inclined surface 17B2 of the second prism 17B and refracted, and then, is raised and emitted, or is directed to the third prism inclined surface 17B1. Here, the second prism 17B has the angle θ7 formed by the third prism inclined surface 17B1 with respect to the first direction smaller than the angle θ4 formed by the first prism inclined surface 16B1 of the first prism 16B with respect to the first direction. Thus, as compared to when the angles are the same or a magnitude relationship between the angles is reversed, light refracted by the sixth inclined surface and directed to the third prism inclined surface 17B1 is more likely to be returned to the first prism sheet 16 side by the third prism inclined surface 17B1. As a result, the amount of the light (hereinafter referred to as recursive light) returned from the second prism sheet 17 to the first prism sheet 16 side is increased. This recursive light reaches the second prism sheet 17 again by being reflected or the like inside the backlight device 12, and is raised and emitted by the third prism inclined surface 17B1 or the fourth prism inclined surface 17B2 of the second prism 17B, and thus usage efficiency of light is improved. Further, since an optical path until the recursive light is emitted from the second prism sheet 17 is complicated, a rise angle provided by the second prism 17B is also diversified, thereby improving viewing angle characteristics.

The light emitted from the second prism sheet 17 is incident on the first light entering main surface 18A of the first louver 18. The light incident on the first light entering main surface 18A has less side lobe light and also has higher usage efficiency by the recursive light, and thus the amount of transmitted light of the first light-transmitting portion 18D is sufficiently ensured, and the amount of light blocked by the first light blocking portion 18C also decreases. In this way, it is suitable to improve brightness according to emission light of the backlight device 12, and the like.

Further, the first LED 13 is disposed on one side in the first direction with respect to the first light guide plate 14, and the second LED 24 is disposed on the other side in the first direction with respect to the second light guide plate 25. In this way, the first LED 13 and the second LED 24 are separated and disposed in the first direction, and thus, even when both of the first LED 13 and the second LED 24 are turned on, heat is less likely to persist.

Further, the liquid crystal display device (display device) 10 according to the present embodiment includes the backlight device 12 described above, and the liquid crystal panel (display panel) 11 configured to perform display by using light from the backlight device 12. According to the liquid crystal display device 10 having such a configuration, in the backlight device 12, emission of light outside of a restricted angle range is suppressed, and brightness of emission light in a direction inclined with respect to the front direction is improved, and thus display can be achieved with excellent display quality.

Second Embodiment

A second embodiment will be described with reference to FIG. 24 or 25. In the second embodiment, a backlight device 112 with a modified configuration will be indicated. Further, repetitive descriptions of structures, actions, and effects similar to those of the first embodiment described above will be omitted.

Figure 24:
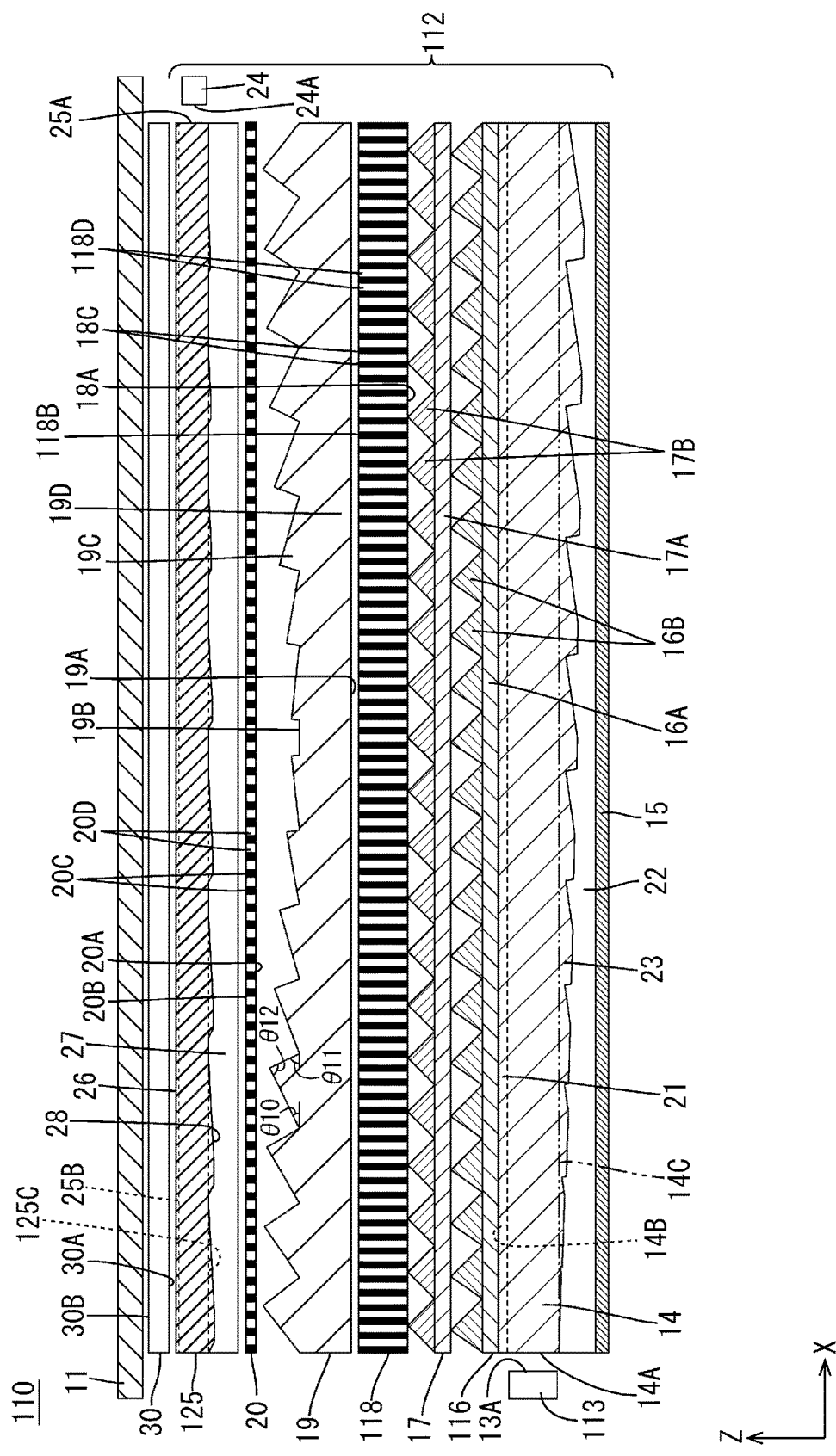
FIG. 24 is a side cross-sectional view of a liquid crystal display device according to a second embodiment.

As illustrated in FIG. 24, the backlight device 112 according to the present embodiment includes at least a linear Fresnel lens sheet (second sheet) 19 disposed on a front side of a first louver 118, and a third louver (third sheet) 20 located on a front side of the linear Fresnel lens sheet 19 and located and disposed on a back side of a second light guide plate 125. The linear Fresnel lens sheet 19 and the third louver 20 each have a main surface having a sheet shape parallel to each main surface of the first louver 118, the second light guide plate 125, and the like. Note that the main surface of the linear Fresnel lens sheet 19 and the third louver 20 is parallel to the X-axis direction and the Y-axis direction, and a normal direction (thickness direction) of the main surface coincides with the Z-axis direction. The linear Fresnel lens sheet 19 has a function of selectively condensing light in the X-axis direction. The third louver 20 has a function of restricting an emission angle range of light in the X-axis direction similarly to the first louver 118.

As illustrated in FIG. 24, the linear Fresnel lens sheet 19 includes a third light entering main surface (seventh main surface) 19A on the back side, and a third light emission main surface (eighth main surface) 19B on the front side. The third light entering main surface 19A faces a first light emission main surface 118B of the first louver 118. The third light emission main surface 19B faces a fourth light entering main surface 20A of the third louver 20 described below. The linear Fresnel lens sheet 19 includes a flat base material 19D, and a linear Fresnel lens (fourth lens) 19C provided on the main surface (third light emission main surface 19B) on a front side of the base material 19D. The linear Fresnel lens sheet 19 is formed of a substantially transparent synthetic resin. Specifically, the entire linear Fresnel lens sheet 19 can be formed of an acrylic resin material such as, for example, PMMA. Further, the base material 19D of the linear Fresnel lens sheet 19 is formed of PET, and the linear Fresnel lens 19C can be formed of an ultraviolet-curing resin material. In that case, similarly to a manufacturing method of the first prism sheet 116 and the like, an uncured ultraviolet-curing resin material is filled into a mold for molding, and the base material 19D is also applied to an opening end of the mold to dispose the uncured ultraviolet-curing resin material so as to contact the main surface on the front side, and in this state, the ultraviolet-curing resin material is irradiated with ultraviolet rays through the base material 19D, and the linear Fresnel lens 19C can be integrally provided with the base material 19D.

As illustrated in FIG. 24, the linear Fresnel lens 19C protrudes from the base material 19D toward the front side along the Z-axis direction. The linear Fresnel lens 19C has a triangular shape in a cross section taken along the X-axis direction, and extends linearly along the Y-axis direction. A width dimension (dimension in the X-axis direction) of the linear Fresnel lens 19C is set constant throughout the entire length in the Y-axis direction. A plurality of the linear Fresnel lenses 19C are disposed side by side along the X-axis direction in the base material 19D. In the plurality of linear Fresnel lenses 19C, a height and the like change according to a position in the base material 19D in the X-axis direction. Specifically, among the plurality of linear Fresnel lenses 19C, the linear Fresnel lens 19C located on an end side in the base material 19D in the X-axis direction (an end side linear Fresnel lens 19CE described below) has a protruding height from the base material 19D greater than the linear Fresnel lens 19C located on a central side (a central side linear Fresnel lens 19CC described below). As the plurality of linear Fresnel lenses 19C approach both end positions from a central position in the base material 19D in the X-axis direction, the protruding height from the base material 19D gradually increases. The plurality of linear Fresnel lenses 19C have a symmetric shape around the central position in the base material 19D in the X-axis direction. In this way, the plurality of linear Fresnel lenses 19C are a so-called "linear Fresnel lens".

As illustrated in FIG. 24, the linear Fresnel lens 19C includes a pair of inclined surfaces 19C1 and 19C2. Of the pair of inclined surfaces 19C1 and 19C2 in the linear Fresnel lens 19C, the inclined surface on the end side in the linear Fresnel lens sheet 19 in the X-axis direction is the first inclined surface (seventh inclined surface) 19C1, and the inclined surface on the central side is the second inclined surface 19C2. The first inclined surface 19C1 has an inclination rising from the end side toward the central side in the linear Fresnel lens sheet 19 in the X-axis direction. The second inclined surface 19C2 has an inclination rising from the central side toward the end side in the linear Fresnel lens sheet 19 in the X-axis direction. In the linear Fresnel lens 19C located closer to the first LED 113 side (left side in FIG. 24) than the central position in the linear Fresnel lens sheet 19 in the X-axis direction, the first inclined surface 19C1 is located on the left side in FIG. 24 with respect to a top portion, and the second inclined surface 19C2 is located on the right side in FIG. 24. In the linear Fresnel lens 19C located closer to a side opposite (right side in FIG. 24) to the first LED 113 than the central position in the linear Fresnel lens sheet 19 in the X-axis direction, the first inclined surface 19C1 is located on the right side in FIG. 24 with respect to the top portion, and the second inclined surface 19C2 is located on the left side in FIG. 24. Note that FIG. 25 illustrates the linear Fresnel lens 19C located closer to the first LED 113 than the central position in the linear Fresnel lens sheet 19 in the X-axis direction.

As illustrated in FIG. 24, when light incident on the linear Fresnel lens 19C is incident on the first inclined surface 19C1 and refracted, the light is directed and travels to the central side of the linear Fresnel lens sheet 19 in the X-axis direction. In other words, the first inclined surface 19C1 can provide an anisotropy refraction action of selectively condensing light in the X-axis direction. The linear Fresnel lens 19C includes the second inclined surface 19C2 in addition to the first inclined surface 19C1, and thus, as compared to when the second inclined surface 19C2 is a vertical surface perpendicular to the X-axis direction, processing of the plurality of linear Fresnel lenses 19C in manufacturing the linear Fresnel lens sheet 19 is facilitated. On the other hand, when light incident on the linear Fresnel lens 19C is incident on the second inclined surface 19C2 and refracted, the light is directed and travels to the end side of the linear Fresnel lens sheet 19 in the X-axis direction, and tends to be more likely to be emitted as side lobe light (stray light). In contrast, the linear Fresnel lens 19C has an inclination angle (angle, first bottom angle) θ10 of the first inclined surface 19C1 with respect to the X-axis direction smaller than an inclination angle (angle, second bottom angle) θ11 of the second inclined surface 19C2 with respect to the X-axis direction. Therefore, most of the light incident on the linear Fresnel lens 19C is incident on the first inclined surface 19C1 and provided with a condensing action, and little light is incident on the second inclined surface 19C2. In this way, the linear Fresnel lens 19C has an asymmetrical cross-sectional shape, which is a scalene triangle.

As illustrated in FIG. 24, the third louver 20 includes the fourth light entering main surface (ninth main surface) 20A on the back side, and a fourth light emission main surface (tenth main surface) 20B on the front side. The fourth light entering main surface 20A faces the third light emission main surface 19B of the linear Fresnel lens sheet 19. The third louver 20 includes a third light blocking portion (second light blocking portion) 20C that blocks light, and a third light-transmitting portion (second light-transmitting portion) 20D that transmits light. The third light blocking portion 20C is formed of, for example, a light blocking resin material (light blocking material) that exhibits a black color and blocks light. The third light blocking portion 20C has a layer shape extending along the Y-axis direction and the Z-axis direction, and a plurality of the third light blocking portions 20C are disposed side by side at an interval in the X-axis direction. The third light-transmitting portion 20D is formed of a light-transmissive resin material (light-transmissive material) that is substantially transparent and transmits light. The third light-transmitting portion 20D has a layer shape extending along the Y-axis direction and the Z-axis direction, and a plurality of the third light-transmitting portions 20D are disposed side by side at an interval in the X-axis direction. The plurality of third light blocking portions 20C and the plurality of third light-transmitting portions 20D are repeatedly and alternately disposed side by side in the X-axis direction. Therefore, the third light-transmitting portion 20D is interposed between two third light blocking portions 20C that are adjacent to each other at an interval in the X-axis direction, and the third light blocking portion 20C is interposed between two third light-transmitting portions 20D that are adjacent to each other at an interval in the X-axis direction. Light incident on the fourth light entering main surface 20A of the third louver 20 is transmitted through the third light-transmitting portion 20D disposed between the two third light blocking portions 20C that are adjacent to each other in the X-axis direction, and is emitted from the fourth light emission main surface 20B. An emission angle of emission light from the fourth light emission main surface 20B in the X-axis direction is restricted by the two third light blocking portions 20C that are adjacent to each other in the X-axis direction. Note that emission light from the fourth light emission main surface 20B has an emission angle that is not restricted by the third louver 20 in the Y-axis direction. An emission angle range of emission light from the fourth light emission main surface 20B in the X-axis direction is defined by two straight lines that diagonally connect each end portion in the Z-axis direction of the two third light blocking portions 20C that sandwich the third light-transmitting portion 20D. An emission angle range of transmitted light of the third light-transmitting portion 20D in the X-axis direction changes according to a ratio between a width W6 and a height H3 of the third light-transmitting portion 20D. Further, the third louver 20 includes a pair of sheet carriers that sandwich and carry the plurality of third light blocking portions 20C and the plurality of third light-transmitting portions 20D from the front side and the back side. The sheet carrier is formed of a light-transmissive resin material that is substantially transparent and transmits light. The sheet carrier extends all over the third louver 20, and collectively holds the plurality of third light blocking portions 20C and the plurality of third light-transmitting portions 20D.

Figure 25:
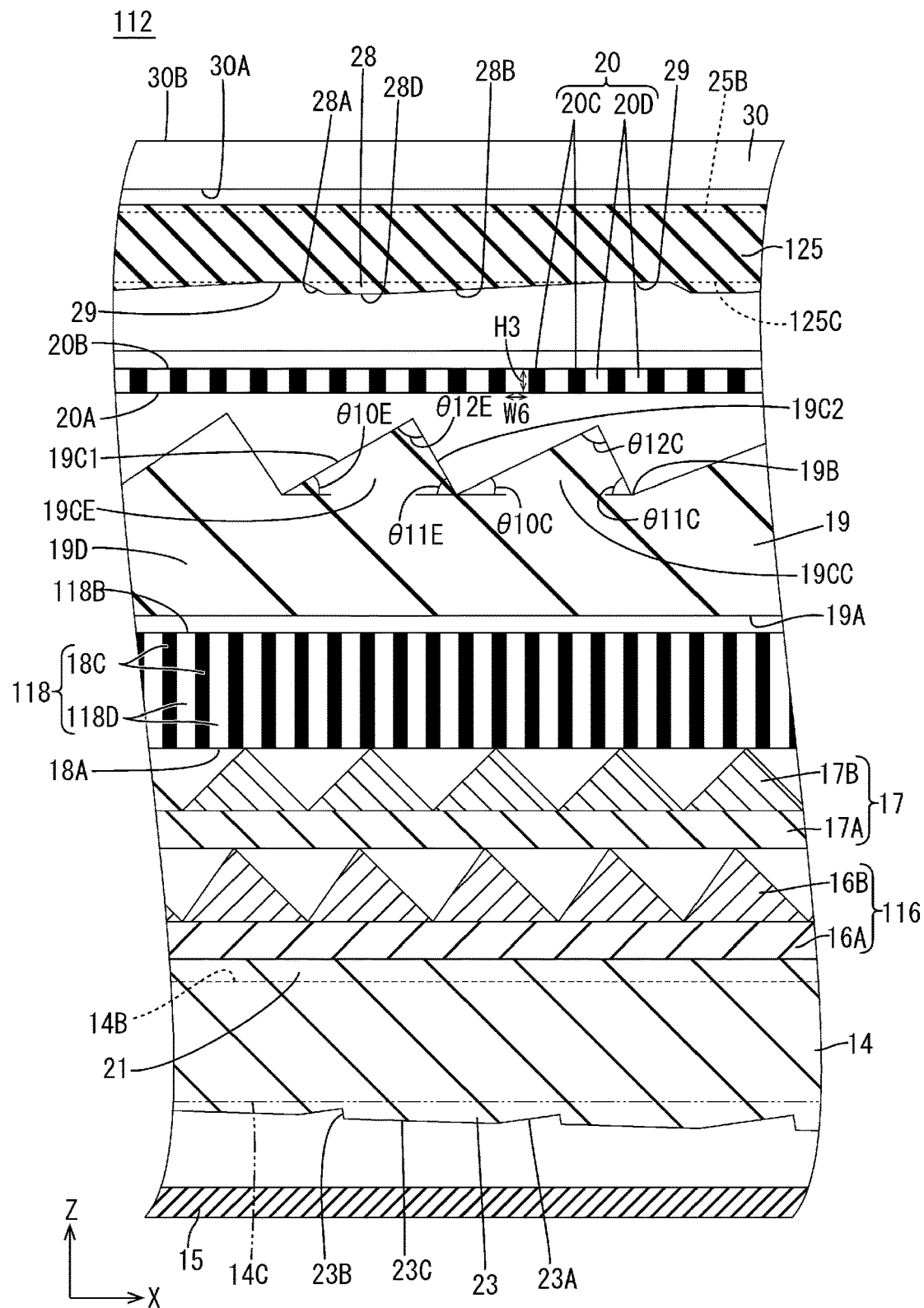
FIG. 25 is a side cross-sectional view of a backlight device.

As illustrated in FIG. 25, the third louver 20 has a ratio acquired by dividing the width W6 of the third light-transmitting portion 20D by the height H3 greater than the ratio (see FIG. 3) acquired by dividing the width W1 of the first light-transmitting portion 118D by the height H1. According to this configuration, a maximum absolute value of an angle formed by light transmitted through the third light-transmitting portion 20D with respect to the Z-axis direction (normal direction of the fourth light emission main surface 20B) is greater than a maximum absolute value of an angle formed by light transmitted through the first light-transmitting portion 118D with respect to the Z-axis direction (normal direction of the first light emission main surface 118B). In this way, a situation where light provided with the anisotropy refraction action by the linear Fresnel lens sheet 19 has an emission angle excessively restricted by the third louver 20 can be avoided. Thus, the anisotropy refraction action provided by the linear Fresnel lens sheet 19 is sufficiently reflected in emission light from the fourth light emission main surface 20B. Therefore, brightness of emission light is made uniform between a central side portion and both end side portions of the fourth light emission main surface 20B in the X-axis direction. In this way, a brightness distribution according to emission light of the backlight device 112 is made uniform. The emission light of the backlight device 112 according to the present embodiment has an emission angle range restricted by the third louver 20, and has a brightness distribution further made uniform. Therefore, when a liquid crystal display device 110 according to the present embodiment is located and installed in front of a passenger seat of a passenger vehicle, a display image of the liquid crystal display device 110 cannot be visually recognized from a driver seat, and the display image having uniform brightness regardless of a position of a screen of the liquid crystal display device 110 in the X-axis direction can be further visually recognized from the passenger seat. Further, an emission angle of emission light from the fourth light emission main surface 20B is restricted by the two third light blocking portions 20C. Therefore, even when side lobe light caused by the second inclined surface 19C2 of the linear Fresnel lens 19C occurs, the side lobe light is blocked by the third light blocking portion 20C of the third louver 20, and is thus less likely to be emitted from the fourth light emission main surface 20B. In this way, the side lobe light that may occur in the emission light of the backlight device 112 can be sufficiently reduced.

As illustrated in FIG. 25, the third louver 20 has the ratio acquired by dividing the width W6 of the third light-transmitting portion 20D by the height H3 equal to "tan 45°". In this way, a maximum absolute value of an angle formed by light transmitted through the third light-transmitting portion 20D with respect to the Z-axis direction is 45°. As compared to when a ratio acquired by dividing a width of the third light-transmitting portion 20D by a height is greater than "tan 45°", side lobe light can be reduced. Further, as compared to when a ratio acquired by dividing a width of the third light-transmitting portion 20D by a height is smaller than "tan 45°", light provided with the anisotropy refraction action by the linear Fresnel lens sheet 19 has an emission angle less likely to be excessively restricted by the third louver 20. In this way, a brightness distribution according to emission light of the third louver 20 is made uniform.

A detailed configuration of the linear Fresnel lens sheet 19 will be described. As illustrated in FIG. 25, the plurality of linear Fresnel lenses 19C aligned along the X-axis direction are configured such that the inclination angle θ10 of the first inclined surface 19C1 with respect to the X-axis direction changes according to a position in the X-axis direction. Specifically, the plurality of linear Fresnel lenses 19C include the central side linear Fresnel lens 19CC, and the end side linear Fresnel lens 19CE located closer to the end side in the X-axis direction in the linear Fresnel lens sheet 19 than the central side linear Fresnel lens 19CC. When any linear Fresnel lens 19C disposed in a position other than both ends in the X-axis direction among the plurality of linear Fresnel lenses 19C is the "central side linear Fresnel lens 19CC", the linear Fresnel lens 19C located closer to the end side in the X-axis direction than the "central side linear Fresnel lens 19CC" is the "end side linear Fresnel lens 19CE". Then, an angle θ10E formed by the first inclined surface 19C1 of the end side linear Fresnel lens 19CE with respect to the X-axis direction is greater than an angle θ10C of the first inclined surface 19C1 of the central side linear Fresnel lens 19CC with respect to the X-axis direction. According to such a configuration, the anisotropy refraction action provided to light by the first inclined surface 19C1 of the end side linear Fresnel lens 19CE is stronger than the anisotropy refraction action provided to light by the first inclined surface 19C1 of the central side linear Fresnel lens 19CC. In other words, in the third light emission main surface 19B of the linear Fresnel lens sheet 19, emission light from an end side portion in the X-axis direction has stronger directivity toward the central side in the X-axis direction than emission light from a central side portion in the X-axis direction. Since excessively restricting an emission angle of emission light is avoided in the third louver 20 on which emission light from the third light emission main surface 19B is incident, brightness of the emission light is made uniform between a central side portion and both end side portions of the fourth light emission main surface 20B of the third louver 20 in the X-axis direction.

As illustrated in FIG. 25, the plurality of linear Fresnel lenses 19C aligned along the X-axis direction have the same apex angle (first apex angle) θ12. In other words, an apex angle θ12C of the central side linear Fresnel lens 19CC is equal to an apex angle θ12E of the end side linear Fresnel lens 19CE. According to such a configuration, processing of a mold used for molding is facilitated when the linear Fresnel lens sheet 19 is manufactured by resin molding. Then, the plurality of linear Fresnel lenses 19C are configured such that an inclination angle θ11 of the second inclined surface 19C2 with respect to the X-axis direction changes according to a position in the X-axis direction. An angle θ11E formed by the second inclined surface 19C2 of the end side linear Fresnel lens 19CE with respect to the X-axis direction is smaller than an angle θ11C of the second inclined surface 19C2 of the central side linear Fresnel lens 19CC with respect to the X-axis direction. According to this configuration, side lobe light caused by the second inclined surface 19C2 of the end side linear Fresnel lens 19CE tends to be greater than side lobe light caused by the second inclined surface 19C2 of the central side linear Fresnel lens 19CC. In contrast, since an emission angle of emission light from the fourth light emission main surface 20B is restricted by two third light blocking portions 20C provided in the third louver 20, the side lobe light caused by the second inclined surface 19C2 of the end side linear Fresnel lens 19CE can be sufficiently reduced.

As illustrated in FIG. 25, the plurality of linear Fresnel lenses 19C have a constant apex angle θ12 of 110°. The plurality of linear Fresnel lenses 19C have the inclination angle θ10 of the first inclined surface 19C1 with respect to the X-axis direction in a range from 0° to 24°, and have the inclination angle θ11 of the second inclined surface 19C2 with respect to the X-axis direction in a range from 46° to 70°. Specifically, in the linear Fresnel lens 19C (central side linear Fresnel lens 19CC) located at the center of the linear Fresnel lens sheet 19 in the X-axis direction among the plurality of linear Fresnel lenses 19C, the inclination angle θ10 (θ10C) of the first inclined surface 19C1 with respect to the X-axis direction is approximately 0°, the inclination angle θ11 (θ11C) of the second inclined surface 19C2 with respect to the X-axis direction is approximately 70°, and the apex angle θ12 (θ12C) is 110°. In contrast, in the linear Fresnel lens 19C (end side linear Fresnel lens 19CE) located at both ends of the linear Fresnel lens sheet 19 in the X-axis direction among the plurality of linear Fresnel lenses 19C, the inclination angle θ10 (θ10E) of the first inclined surface 19C1 with respect to the X-axis direction is approximately 24°, the inclination angle θ11 (θ11E) of the second inclined surface 19C2 with respect to the X-axis direction is approximately 46°, and the apex angle θ12 (θ12E) is 110°.

The inclination angle θ10 and the inclination angle θ11 of the linear Fresnel lens 19C change according to a position of the linear Fresnel lens sheet 19 in the X-axis direction as follows. In other words, in the plurality of linear Fresnel lenses 19C, the inclination angle θ10 of the first inclined surface 19C1 with respect to the X-axis direction changes so as to continuously and gradually decrease from the central position toward both end positions in the X-axis direction. In the plurality of linear Fresnel lenses 19C, the inclination angle θ11 of the second inclined surface 19C2 with respect to the X-axis direction changes so as to continuously and gradually increase from the central position toward both end positions in the X-axis direction.

When the angle θ10 formed by the first inclined surface 19C1 with respect to the X-axis direction is greater than 24° and the angle θ11 formed by the second inclined surface 19C2 with respect to the X-axis direction is smaller than 46°, side lobe light that is difficult to block in the third light blocking portion 20C of the third louver 20 may become excessive. Further, when the angle θ10 formed by the first inclined surface 19C1 with respect to the X-axis direction is smaller than 0° and the angle θ11 formed by the second inclined surface 19C2 with respect to the X-axis direction is greater than 70°, side lobe light that is difficult to block in the third light blocking portion 20C of the third louver 20 may also become excessive. In this regard, as descried above, in the plurality of linear Fresnel lenses 19C, when the angle θ10 formed by the first inclined surface 19C1 with respect to the X-axis direction is in a range from 0° to 24° and the angle θ11 formed by the second inclined surface 19C2 with respect to the X-axis direction is in a range from 46° to 70°, side lobe light that is difficult to block in the third light blocking portion 20C of the third louver 20 can be sufficiently suppressed.

As described above, according to the present embodiment, the backlight device 112 includes: the linear Fresnel lens sheet (second sheet) 19 including one main surface as the third light entering main surface (seventh main surface) 19A configured to face the first light emission main surface 118B and receive incident light, and including an other main surface as the third light emission main surface (eighth main surface) 19B configured to emit light; and the third louver (third sheet) 20 including one main surface as the fourth light entering main surface (ninth main surface) 20A configured to face the third light emission main surface 19B and receive incident light, and including an other main surface as the fourth light emission main surface (tenth main surface) 20B configured to face the second opposite main surface 125C and emit light, wherein the linear Fresnel lens sheet 19 includes the linear Fresnel lens (fourth lens) 19C disposed on the third light entering main surface 19A or the third light emission main surface 19B, the third louver 20 includes at least the two third light blocking portions (second light blocking portions) 20C disposed at an interval in the first direction and configured to block light, and the third light-transmitting portion (second light-transmitting portion) 20D disposed between the two third light blocking portions 20C and configured to transmit light, the linear Fresnel lens 19C includes the first inclined surface (seventh inclined surface) 19C1 having an inclination rising from the end side in the first direction in the linear Fresnel lens sheet 19 toward the central side, and the third louver 20 has a ratio acquired by dividing the width W6 of the third light-transmitting portion 20D by the height H3 of the third light-transmitting portion 20D that is greater than a ratio acquired by dividing the width W1 of the first light-transmitting portion 118D by the height H1.

When light emitted from the first light emission main surface 118B of the first louver 118 is incident on the third light entering main surface 19A of the linear Fresnel lens sheet 19, the light is refracted by the first inclined surface 19C1 of the linear Fresnel lens 19C and emitted from the third light emission main surface 19B. Since the first inclined surface 19C1 has the inclination rising from the end side in the first direction in the linear Fresnel lens sheet 19 toward the central side, the anisotropy refraction action of directing toward the central side in the first direction is provided to the emission light from the third light emission main surface 19B. When the light emitted from the third light emission main surface 19B is incident on the fourth light entering main surface 20A of the third louver 20, the light is transmitted through the third light-transmitting portion 20D disposed between the two third light blocking portions 20C and is emitted from the fourth light emission main surface 20B. An emission angle of the emission light from the fourth light emission main surface 20B is restricted by the two third light blocking portions 20C. The light emitted from the fourth light emission main surface 20B is incident on the second opposite main surface 125C of the second light guide plate 125.

Here, the first louver 118 has a ratio acquired by dividing the width W1 of the first light-transmitting portion 118D by the height H1 smaller than a ratio acquired by dividing the width W6 of the third light-transmitting portion 20D by the height H3. According to this configuration, a maximum absolute value of an angle formed by light transmitted through the first light-transmitting portion 118D with respect to the normal direction of the first light emission main surface 118B is smaller than a maximum absolute value of an angle formed by light transmitted through the third light-transmitting portion 20D with respect to the normal direction of the fourth light emission main surface 20B. In this way, the light emitted from the first light emission main surface 118B and incident on the third light entering main surface 19A of the linear Fresnel lens sheet 19 includes a lot of light close to the normal direction of the first light emission main surface 118B. Therefore, the light refracted by the first inclined surface 19C1 of the linear Fresnel lens 19C provided in the linear Fresnel lens sheet 19 is effectively provided with directivity toward the central side in the first direction.

On the other hand, the third louver 20 has a ratio acquired by dividing the width W6 of the third light-transmitting portion 20D by the height H3 greater than a ratio acquired by dividing the width W1 of the first light-transmitting portion 118D by the height H1. According to this configuration, a maximum absolute value of an angle formed by light transmitted through the third light-transmitting portion 20D with respect to the normal direction of the fourth light emission main surface 20B is greater than a maximum absolute value of an angle formed by light transmitted through the first light-transmitting portion 118D with respect to the normal direction of the first light emission main surface 118B. In this way, a situation where light provided with the anisotropy refraction action by the linear Fresnel lens sheet 19 has an emission angle excessively restricted by the third louver 20 can be avoided. Thus, since the anisotropy refraction action provided by the linear Fresnel lens sheet 19 is sufficiently reflected in the emission light from the fourth light emission main surface 20B, brightness of the emission light is made uniform between the central side portion and both end side portions of the fourth light emission main surface 20B in the first direction. Further, since an emission angle of the emission light from the fourth light emission main surface 20B is restricted by the two third light blocking portions 20C, side lobe light that may occur in emission light of the backlight device 112 can be reduced.

Third Embodiment

A third embodiment will be described with reference to FIGS. 26 to 29. In this third embodiment, a fifth light guide plate lens 227 with a modified configuration from that in the first embodiment described above will be indicated. Further, repetitive descriptions of structures, actions, and effects similar to those of the first embodiment described above will be omitted.

Figure 26:
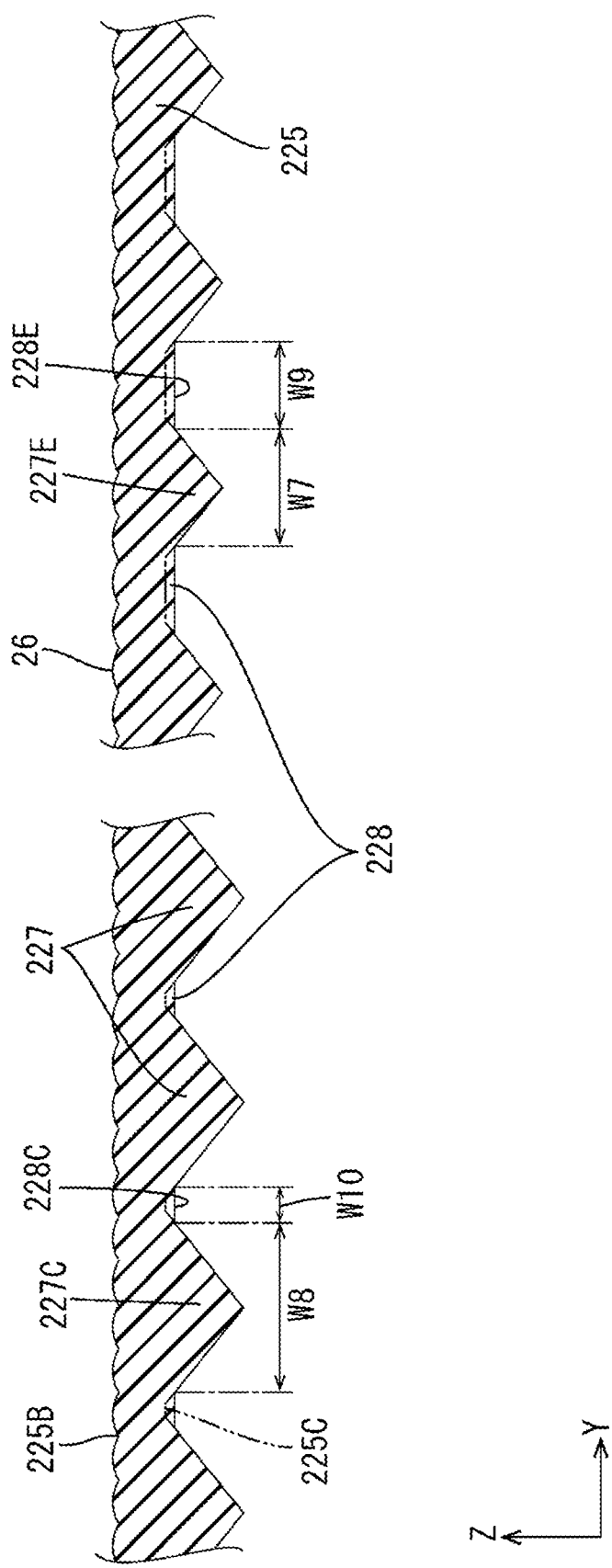
FIG. 26 is a front cross-sectional view of a second light guide plate according to a third embodiment.

As illustrated in FIG. 26, a plurality of the fifth light guide plate lenses 227 aligned in the Y-axis direction in a second opposite main surface 225C of a second light guide plate 225 according to the present embodiment are configured such that a width dimension (dimension in the Y-axis direction) changes. Specifically, the plurality of fifth light guide plate lenses 227 include a central side fifth light guide plate lens (central side third lens) 227C, and an end side fifth light guide plate lens (end side third lens) 227E located closer to an end side in the Y-axis direction in the second light guide plate 225 than the central side fifth light guide plate lens 227C. When any fifth light guide plate lens 227 disposed in a position other than both ends in the Y-axis direction among the plurality of fifth light guide plate lenses 227 is the "central side fifth light guide plate lens 227C", the fifth light guide plate lens 227 located closer to the end side in the Y-axis direction than the "central side fifth light guide plate lens 227C" is the "end side fifth light guide plate lens 227E".

Then, a width dimension (dimension in the Y-axis direction) W7 of the end side fifth light guide plate lens 227E is smaller than a width dimension W8 of the central side fifth light guide plate lens 227C. In this way, an occupied ratio of the end side fifth light guide plate lens 227E in the end side portion of the second opposite main surface 225C in the Y-axis direction is lower than an occupied ratio of the central side fifth light guide plate lens 227C in the central side portion in the Y-axis direction. In this way, in a position closer to the end side from the central side in the Y-axis direction in the second light guide plate 225, the amount of light that is repeatedly totally reflected between the end side fifth light guide plate lens 227E and a second light guide plate-light emission main surface 225B and travels along the X-axis direction is reduced, and the light is more likely to reach the end of the second light guide plate 225 in the Y-axis direction.

Figure 27:
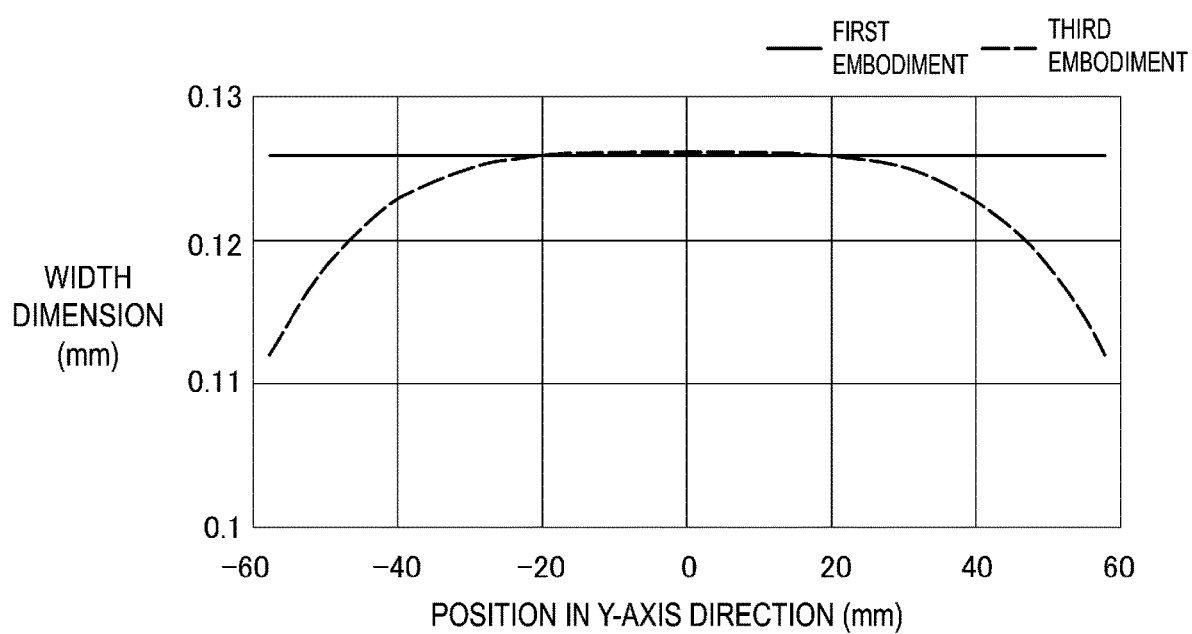
FIG. 27 is a graph showing a relationship between a position of the second light guide plate in a Y-axis direction and a width dimension of a fifth light guide plate lens.

As shown in FIG. 27, a specific numerical value of a width dimension of the fifth light guide plate lens 227 changes according to a position of the fifth light guide plate lens 227 in the second light guide plate 225 in the Y-axis direction. FIG. 27 is a graph in which a horizontal axis is a position (in units of "mm") of the second light guide plate 25 in the Y-axis direction, and a vertical axis is the width dimension (in units of "mm") of the fifth light guide plate lens 227. A reference position (0 mm) in the horizontal axis in FIG. 27 is a central position of the second light guide plate 225 in the Y-axis direction, and a position of +60 mm is both end positions of the second light guide plate 225 in the Y-axis direction. A solid line indicated in FIG. 27 is a graph of the width dimension of the fifth light guide plate lens 27 (see FIG. 3) according to the first embodiment, and a dashed line is a graph of the width dimension of the fifth light guide plate lens 227 according to the present embodiment. Note that an apex angle θ1 of the fifth light guide plate lens 227 is constant regardless of a position in the Y-axis direction.

According to FIG. 27, the width dimension of the plurality of fifth light guide plate lenses 227 is substantially constant in a central side portion of the second light guide plate 225 in the Y-axis direction (in a range from +20 mm to −20 mm). In contrast, the width dimension of the plurality of fifth light guide plate lenses 227 changes so as to continuously and gradually decrease while approaching both end positions in the Y-axis direction in both end side portions of the second light guide plate 225 in the Y-axis direction (in a range from +60 mm to +20 mm and a range from −60 mm to −20 mm). Specifically, among the plurality of fifth light guide plate lenses 227, the fifth light guide plate lens 227 (central side fifth light guide plate lens 227C) located in the central side portion of the second light guide plate 225 in the Y-axis direction has the width dimension W8 at maximum, whereas the fifth light guide plate lens 227 (end side fifth light guide plate lens 227E) located in both end positions in the Y-axis direction has the width dimension W7 at minimum.

By forming the plurality of fifth light guide plate lenses 227 as described above, as illustrated in FIG. 26, a plurality of sixth light guide plate lenses 228 disposed on the second opposite main surface 225C of the second light guide plate 225 are configured such that a width dimension (dimension in the Y-axis direction) changes. Specifically, the plurality of sixth light guide plate lenses 228 include a central side sixth light guide plate lens (central side first lens) 228C, and an end side sixth light guide plate lens (end side first lens) 228E located closer to the end side in the Y-axis direction in the second light guide plate 225 than the central side sixth light guide plate lens 228C. When any sixth light guide plate lens 228 disposed in a position other than both ends in the Y-axis direction among the plurality of sixth light guide plate lenses 228 is the "central side sixth light guide plate lens 228C", the sixth light guide plate lens 228 located closer to the end side in the Y-axis direction than the "central side sixth light guide plate lens 228C" is the "end side sixth light guide plate lens 228E".

Then, a width dimension (dimension in the Y-axis direction) W9 of the end side sixth light guide plate lens 228E is greater than a width dimension W10 of the central side sixth light guide plate lens 228C. In other words, as an occupied ratio of the fifth light guide plate lens 227 (central side fifth light guide plate lens 227C) is increased in the central side portion in the Y-axis direction of the second opposite main surface 225C of the second light guide plate 225, an occupied ratio of the sixth light guide plate lens 228 (central side sixth light guide plate lens 228C) is reduced. Conversely, as an occupied ratio of the fifth light guide plate lens 227 (end side fifth light guide plate lens 227E) is reduced in both end side portions in the Y-axis direction, an occupied ratio of the sixth light guide plate lens 228 (end side sixth light guide plate lens 228E) is increased. In this way, the amount of light reflected by a sixth light guide plate inclined surface 228A of the end side sixth light guide plate lens 228E and emitted from the second light guide plate-light emission main surface 225B increases on the end side of the second light guide plate 225 in the Y-axis direction. As described above, brightness of emission light is made uniform between the central side portion and both end side portions of the second light guide plate-light emission main surface 225B in the Y-axis direction.

Specifically, according to FIG. 27, the width dimension of the plurality of fifth light guide plate lenses 227 is substantially constant in the central side portion (in the range from +20 mm to −20 mm) of the second light guide plate 225 in the Y-axis direction, and thus the width dimension of the plurality of sixth light guide plate lenses 228 is also substantially constant. In contrast, the width dimension of the plurality of fifth light guide plate lenses 227 changes so as to continuously and gradually decrease while approaching both end positions in the Y-axis direction in both end side portions of the second light guide plate 225 in the Y-axis direction (in the range from +60 mm to +20 mm and the range from −60 mm to −20 mm), and thus the width dimension of the plurality of sixth light guide plate lenses 228 changes so as to continuously and gradually increase while approaching both end positions in the Y-axis direction. Among the plurality of sixth light guide plate lenses 228, the sixth light guide plate lens 228 (central side sixth light guide plate lens 228C) located in the central side portion of the second light guide plate 225 in the Y-axis direction has the width dimension W10 at minimum, whereas the sixth light guide plate lens 228 (end side sixth light guide plate lens 228E) located in both end positions in the Y-axis direction has the width dimension W9 at maximum.

Here, in order to validate an advantage of a backlight device 12 and a liquid crystal display device 10 according to the present embodiment, the following Comparative Experiment 2 was performed. In Comparative Experiment 2, the backlight device 12 having the configuration described in the first embodiment described above is Example 2, and the backlight device 12 having the configuration described in the paragraph before Comparative Experiment 2 is Example 3. In Comparative Experiment 2, brightness according to emission light in a state where the first LED 13 was turned on and the second LED 24 was turned off in each of the backlight devices according to Examples 2 and 3 was measured, a diagram representing a brightness distribution by shading was produced, and a graph according to light distribution (brightness angle distribution) in the Y-axis direction was produced. Further, in Comparative Experiment 2, a percentage (in units of "%") of a ratio acquired by dividing minimum brightness of calculated brightness by maximum brightness was calculated. The percentage of the calculated ratio indicates that uniformity of the brightness distribution is higher with a greater numerical value, and uniformity of the brightness distribution is lower with a smaller numerical value.

Figure 28:
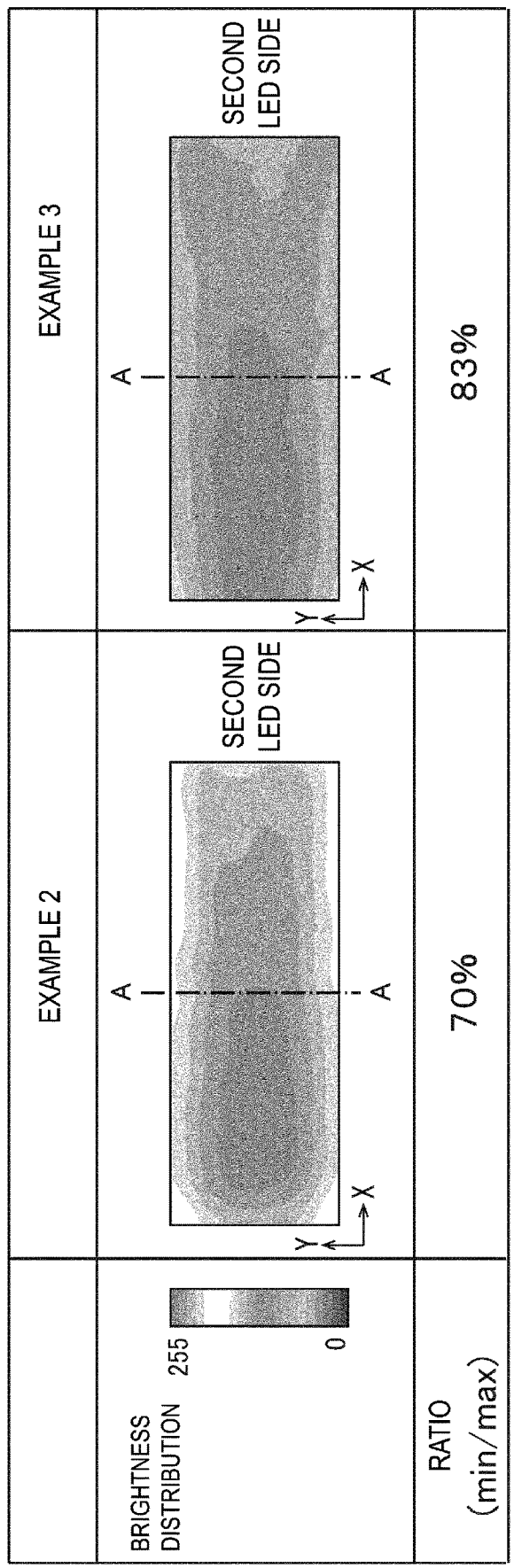
FIG. 28 is a table showing an experimental result of Comparative Experiment 2.
Figure 29:
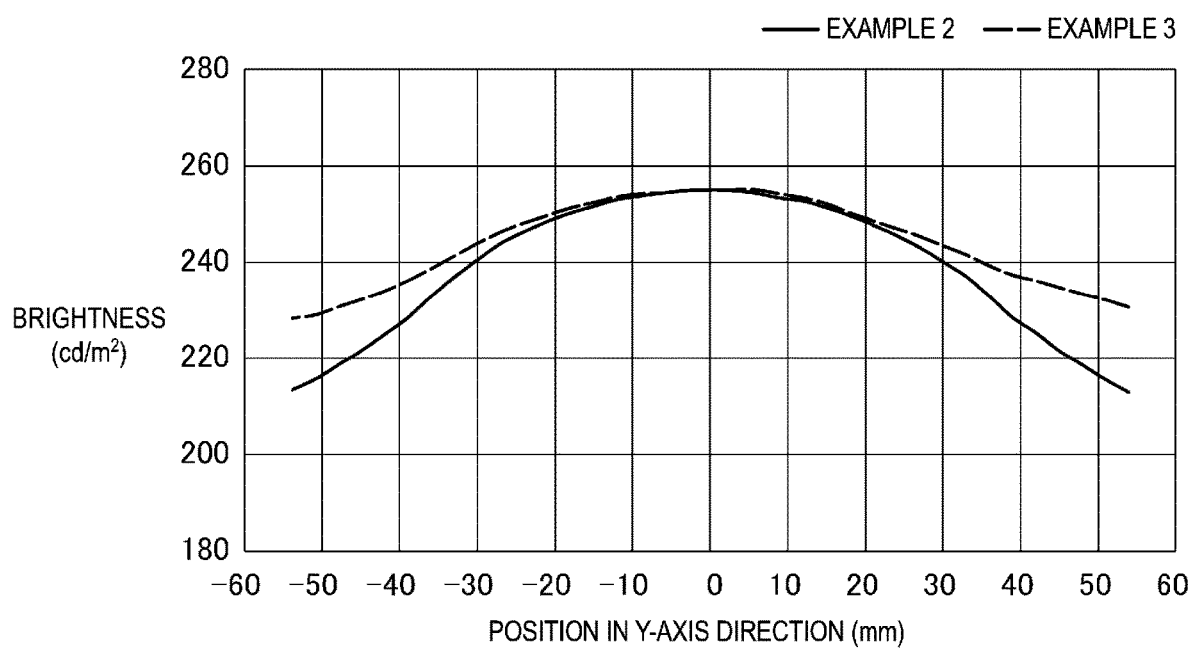
FIG. 29 is a graph showing light distribution at a central position in the Y-axis direction according to Examples 2 and 3 in Comparative Experiment 2.

An experimental result of Comparative Experiment 2 is as illustrated in FIGS. 28 and 29. FIG. 28 illustrates a diagram related to the brightness distribution in Examples 2 and 3, and the percentage of the ratio acquired by dividing minimum brightness by maximum brightness in Examples 2 and 3. In the diagram according to the brightness distribution illustrated in FIG. 28, a level of the brightness is represented by shading. FIG. 28 illustrates, in addition to the diagram according to the brightness distribution, a legend (minimum brightness is 0 gray scale, maximum brightness is 255 gray scales) according to shading of the brightness. Further, FIG. 28 illustrates a numerical value (100% and 0%) of relative brightness corresponding to the legend. FIG. 29 is a graph showing the light distribution in a central position (a position at an A-A line illustrated in the drawing according to the brightness distribution in FIG. 28) in the Y-axis direction according to Examples 2 and 3. In FIG. 29, a horizontal axis is an angle (in units of "°") in the Y-axis direction with respect to the front direction (Z-axis direction), and a vertical axis is brightness (in units of "cd/m$^2$"). Among the positive and negative symbols provided to the angles in the horizontal axis in FIG. 29, "−(negative)" refers to the left side in the Y-axis direction with respect to 0° (front direction) as reference when the backlight device is viewed from the front, and "+(positive)" refers to the right side in the Y-axis direction with respect to 0° (front direction) as reference when the backlight device is viewed from the front.

The experimental result of Comparative Experiment 2 will be described. According to FIGS. 28 and 29, in comparison between Examples 2 and 3, it is clear that, although the brightness is the same in the central side portion in the Y-axis direction, Example 3 has brightness higher than Example 2 in both end side portions in the Y-axis direction, and has a smaller difference in brightness between the central side portion and both end side portions. Accordingly, for the ratio acquired by dividing minimum brightness by maximum brightness, the ratio is 83% and high in Example 3, whereas the ratio is 70% and low in Example 2. The reason for such an experimental result is conceivably that, in Example 3, an occupied ratio of the fifth light guide plate lens 227 (end side fifth light guide plate lens 227E) is low in both end side portions in the Y-axis direction in the second opposite main surface 225C of the second light guide plate 225, and an occupied ratio of the sixth light guide plate lens 228 (end side sixth light guide plate lens 228E) is high. In Example 3, in both end side portions in the Y-axis direction of the second light guide plate 225, the amount of light that is repeatedly totally reflected between the fifth light guide plate lens 227 (end side fifth light guide plate lens 227E) and the second light guide plate-light emission main surface 225B and travels along the X-axis direction is reduced, and the light is more likely to reach the end of the second light guide plate 225 in the Y-axis direction, and the amount of light that is reflected by the sixth light guide plate inclined surface 228A of the sixth light guide plate lens 228 (end side sixth light guide plate lens 228E) and emitted from the second light guide plate-light emission main surface 225B also increases. As described above, it is inferred that, in Example 3, brightness of emission light is made uniform between the central side portion and both end side portions of the second light guide plate-light emission main surface 225B in the Y-axis direction.

As described above, according to the present embodiment, the plurality of fifth light guide plate lenses (third lenses) 227 include the central side fifth light guide plate lens (central side third lens) 227C, and the end side fifth light guide plate lens (end side third lens) 227E located closer to the end side in the second direction in the second opposite main surface 25C than the central side fifth light guide plate lens 227C, the plurality of sixth light guide plate lenses 228 include the central side sixth light guide plate lens (central side first lens) 228C, and the end side sixth light guide plate lens (end side first lens) 228E located closer to the end side in the second direction in the second opposite main surface 225C than the central side sixth light guide plate lens 228C, a dimension of the end side fifth light guide plate lens 227E in the second direction is smaller than a dimension of the central side fifth light guide plate lens 227C in the second direction, and a dimension of the end side sixth light guide plate lens 228E in the second direction is greater than a dimension of the central side sixth light guide plate lens 228C in the second direction. An occupied ratio of the end side fifth light guide plate lens 227E in the end side portion of the second opposite main surface 225C in the second direction is lower than an occupied ratio of the central side fifth light guide plate lens 227C in the central side portion in the second direction. In this way, in a position closer to the end side from the central side in the second direction in the second light guide plate 225, the amount of light that is repeatedly totally reflected between the end side fifth light guide plate lens 227E and the second light guide plate-light emission main surface 225B and travels along the first direction is reduced, and the light is more likely to reach the end of the second light guide plate 225 in the second direction. On the other hand, an occupied ratio of the end side sixth light guide plate lens 228E in the end side portion of the second opposite main surface 225C in the second direction is higher than an occupied ratio of the central side sixth light guide plate lens 228C in the central side portion in the second direction. In this way, the amount of light reflected by the sixth light guide plate inclined surface 228A of the end side sixth light guide plate lens 228E and emitted from the second light guide plate-light emission main surface 225B increases on the end side of the second light guide plate 225 in the second direction. As described above, brightness of emission light is made uniform between the central side portion and both end side portions of the second light guide plate-light emission main surface 225B in the second direction.

Fourth Embodiment

A fourth embodiment will be described with reference to FIGS. 30 to 33. In this fourth embodiment, a sixth light guide plate lens 328 with a modified configuration from that in the first embodiment described above will be indicated. Further, repetitive descriptions of structures, actions, and effects similar to those of the first embodiment described above will be omitted.

Figure 30:
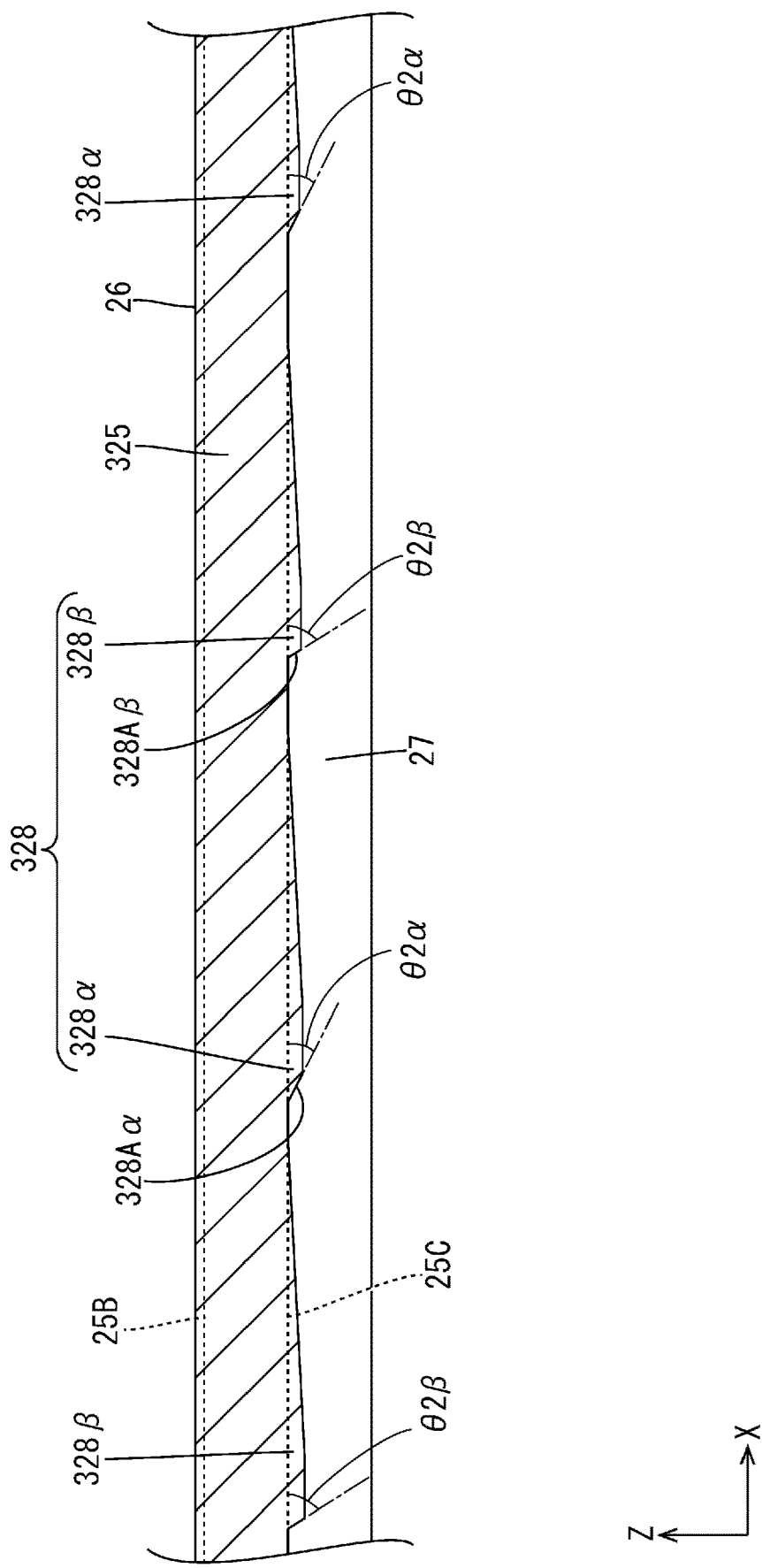
FIG. 30 is a side cross-sectional view of a second light guide plate according to a fourth embodiment.

As illustrated in FIG. 30, a plurality of two types of the sixth light guide plate lenses 328 are provided in a second light guide plate 325 according to the present embodiment. Note that a second LED 24 is disposed on the right side in FIG. 30 to the second light guide plate 325 illustrated in FIG. 30. The plurality of sixth light guide plate lenses 328 aligned along the X-axis direction include one sixth light guide plate lens (one first lens) 328α including a gentle inclined surface 328Aα as a sixth light guide plate inclined surface 328A, and another sixth light guide plate lens (another first lens) 328β including a steep inclined surface 328Aβ as the sixth light guide plate inclined surface 328A. An angle θ2β formed by the steep inclined surface 328Aβ provided in the other sixth light guide plate lens 328β with respect to the X-axis direction is greater than an angle θ2 formed by the gentle inclined surface 328Aα provided in the one sixth light guide plate lens 328α with respect to the X-axis direction. Specifically, the gentle inclined surface 328Aα provided in the one sixth light guide plate lens 328α has the angle θ2α with respect to the X-axis direction of, for example, approximately 27°. The steep inclined surface 328Aβ provided in the other sixth light guide plate lens 328β has the angle θ2β with respect to the X-axis direction of, for example, approximately 58°. The one sixth light guide plate lens 328α and the other sixth light guide plate lens 328β are each alternately and repeatedly arranged in the X-axis direction.

According to such a configuration, when light emitted from the second LED 24 and propagating inside the second light guide plate 325 is reflected (refracted) by the gentle inclined surface 328Aα that is the sixth light guide plate inclined surface 328A of the one sixth light guide plate lens 328x, the light is more likely to travel toward a side opposite (left side in FIG. 30) to the second LED 24 side in the X-axis direction with respect to the front direction. On the other hand, when the light emitted from the second LED 24 and propagating inside the second light guide plate 325 is reflected (refracted) by the steep inclined surface 328Aβ that is the sixth light guide plate inclined surface 328A of the other sixth light guide plate lens 328β, the light is more likely to travel toward the second LED 24 side (right side in FIG. 30) in the X-axis direction with respect to the front direction. Therefore, when the second LED 24 is turned on, emission light having a brightness angle distribution in which peak brightness according to the emission light is biased toward the side opposite to the second LED 24 side in the X-axis direction and the second LED 24 side in the X-axis direction can be supplied.

Next, in a backlight device 12 according to the present embodiment, Demonstration Experiment 6 was performed in order to acquire knowledge related to how light distribution changes when only the first LED 13 is turned on, when only the second LED 24 is turned on, and when both of the first LED 13 and the second LED 24 are turned on. In Demonstration Experiment 6, the backlight device 12 including the second light guide plate 325 described before the present paragraph was used to measure brightness according to emission light in each of a case where the first LED 13 was turned on and the second LED 24 was turned off, a case where the second LED 24 is turned on and the first LED 13 is turned off, and a case where both of the first LED 13 and the second LED 24 are turned on, and a graph according to light distribution (brightness angle distribution) in the X-axis direction was produced.

Figure 31:
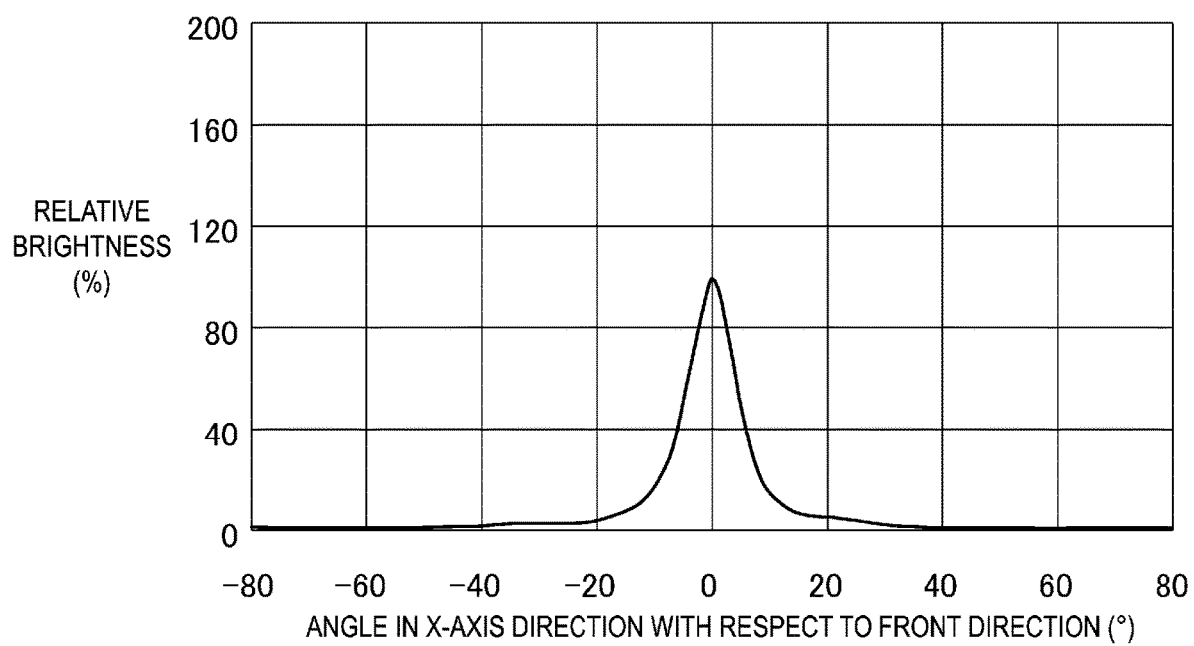
FIG. 31 is a graph according to light distribution when the first LED is turned on and the second LED is turned off in Demonstration Experiment 6.
Figure 32:
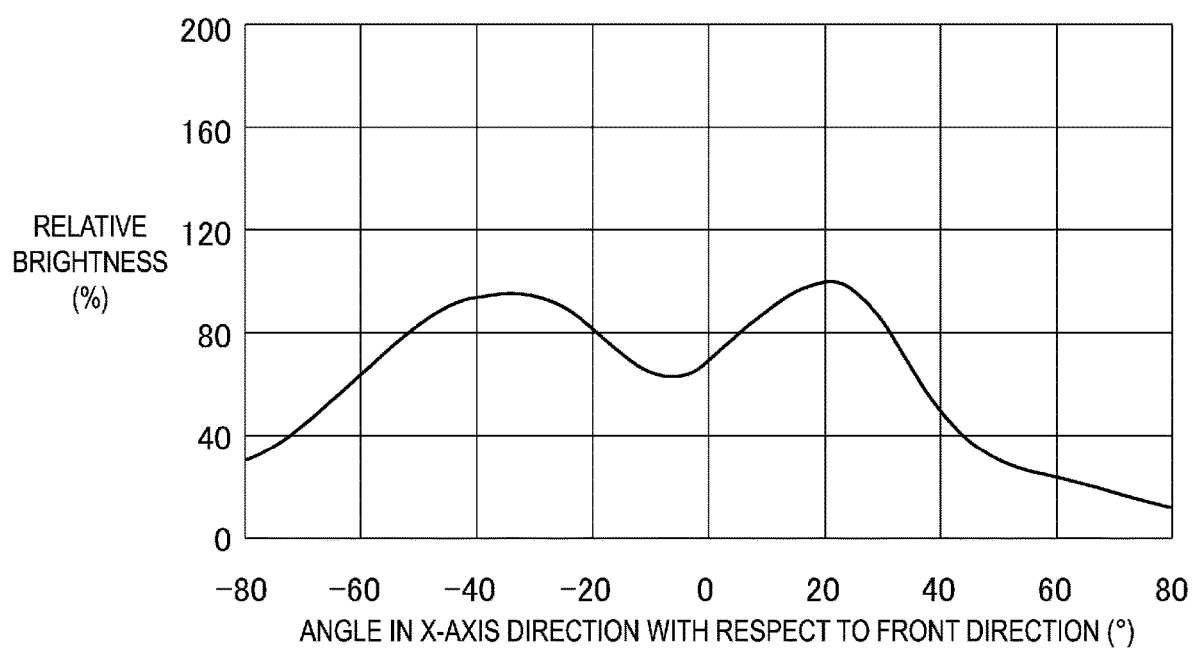
FIG. 32 is a graph according to light distribution when the second LED is turned on and the first LED is turned off in Demonstration Experiment 6.
Figure 33:
FIG. 33 is a graph according to light distribution when both of the first LED and the second LED are turned on in Demonstration Experiment 6.

An experimental result according to the light distribution in Demonstration Experiment 6 is as shown in FIGS. 31 to 33. In the graph according to the light distribution shown in FIGS. 31 to 33, a horizontal axis is an angle (in units of "°") in the X-axis direction with respect to the front direction (Z-axis direction), and a vertical axis is relative brightness (in units of "%"). The relative brightness in the vertical axis is a relative value in which peak brightness in FIG. 31 is set as a reference (100%). Positive and negative symbols provided to the angles in the horizontal axis in FIGS. 31 to 33 have the same meaning as the symbols provided to the horizontal axis in the graph in FIG. 10. FIG. 31 shows the light distribution when the first LED 13 is turned on and the second LED 24 is turned off. FIG. 32 shows the light distribution when the second LED 24 is turned on and the first LED 13 is turned off. FIG. 33 illustrates the light distribution when both of the first LED 13 and the second LED 24 are turned on.

The experimental result of Demonstration Experiment 6 will be described. According to the light distribution in FIG. 31, the peak brightness was at substantially 0°, and an emission angle range was approximately $10°. This result is similar to that in FIG. 11 of Demonstration Experiment 2. In the light distribution in FIG. 32, the peak brightness is present at two places around −40° and around +20°. It is inferred that the emission light around −40° is light reflected by the gentle inclined surface 328Aα provided in the one sixth light guide plate lens 328x, and the emission light around +20° is light reflected by the steep inclined surface 328Aβ provided in the other sixth light guide plate lens 328B. In this way, according to the light distribution in FIG. 32, it can be said that, when the second LED 24 is turned on, emission light having the light distribution in which the peak brightness according to the emission light is biased toward the side opposite to the second LED 24 side in the X-axis direction and the second LED 24 side in the X-axis direction is emitted. The light distribution in FIG. 33 is a combination of the light distribution in FIG. 31 and the light distribution in FIG. 32. In other words, in the light distribution in FIG. 33, the peak brightness is present at substantially 0°, around −40°, and around +20°, and is the highest at substantially 0°. Therefore, when both of the first LED 13 and the second LED 24 are turned on, a display image of the liquid crystal display device 10 can be visually recognized from both of a driver seat and a passenger seat in a more excellent manner.

As described above, according to the present embodiment, the plurality of sixth light guide plate lenses 328 are disposed side by side in the first direction, and the plurality of sixth light guide plate lenses 328 include the one sixth light guide plate lens (one first lens) 328α including the gentle inclined surface 328Aα as the sixth light guide plate inclined surface 328A, and include the other sixth light guide plate lens (other first lens) 328β including, as the sixth light guide plate inclined surface 328A, the steep inclined surface 328Aβ having an angle with respect to the first direction greater than an angle of the gentle inclined surface 328Aα. Light refracted by the gentle inclined surface 328Aα that is the sixth light guide plate inclined surface 328A of the one sixth light guide plate lens 328α is more likely to travel toward the side opposite to the second LED 24 side in the first direction with respect to the front direction. On the other hand, light refracted by the steep inclined surface 328Aβ that is the sixth light guide plate inclined surface 328A of the other sixth light guide plate lens 328B is more likely to travel toward the second LED 24 side in the first direction with respect to the front direction. Therefore, when the second LED 24 is turned on, emission light having a brightness angle distribution in which peak brightness according to the emission light is biased toward the side opposite to the second LED 24 side in the first direction and the second LED 24 side in the first direction can be supplied.

Fifth Embodiment

A fifth embodiment will be described with reference to FIG. 34. In this fifth embodiment, a sixth light guide plate lens 428 with a modified configuration from that in the first embodiment described above will be indicated. Further, repetitive descriptions of structures, actions, and effects similar to those of the first embodiment described above will be omitted.

Figure 34:
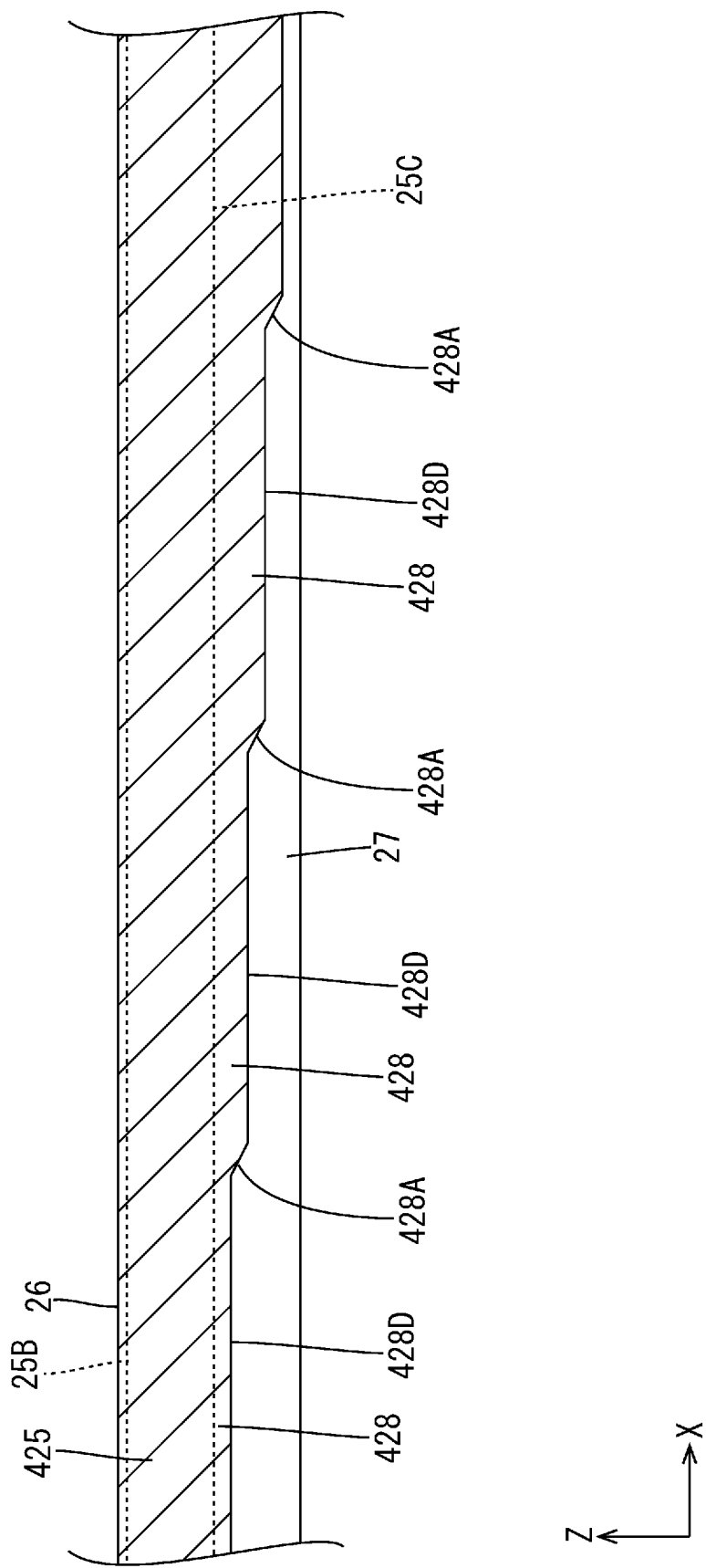
FIG. 34 is a side cross-sectional view of a second light guide plate according to a fifth embodiment.

As illustrated in FIG. 34, a second light guide plate 425 according to the present embodiment has a configuration in which the seventh light guide plate inclined surface 28B and the second plane 29 (see FIG. 2) described in the first embodiment are not provided on a second opposite main surface 425C. Accordingly, two sixth light guide plate lenses 428 adjacent to each other in the X-axis direction are connected to each other without the second plane 29 interposed therebetween. Thus, the plurality of sixth light guide plate lenses 428 aligned along the X-axis direction have a height gradually decreasing in a position farther from a second LED 24 in the X-axis direction, and conversely, has a height gradually increasing in a position closer to the second LED 24 in the X-axis direction. Note that the second LED 24 is disposed on the right side in FIG. 34 to the second light guide plate 425 illustrated in FIG. 34.

Specifically, three sixth light guide plate lenses 428 continuously aligned in the X-axis direction will be described as a representative from the plurality of sixth light guide plate lenses 428 aligned along the X-axis direction. Of the three sixth light guide plate lenses 428 aligned in the X-axis direction, a sixth light guide plate inclined surface 428A provided in the sixth light guide plate lens 428 located at the center in the X-axis direction is connected to a first plane 428D provided in the adjacent sixth light guide plate lens 428 on the side opposite (left side in FIG. 34) to the second LED 24 in the X-axis direction. The first plane 428D provided in the sixth light guide plate lens 428 located at the center in the X-axis direction is connected to the sixth light guide plate inclined surface 428A provided in the adjacent sixth light guide plate lens 428 on the second LED 24 side (right side in FIG. 34) in the X-axis direction. In this way, the seventh light guide plate inclined surface 28B and the second plane 29 described in the first embodiment are not present in a portion of the second opposite main surface 425C of the second light guide plate 425 where the sixth light guide plate lens 428 is formed, and only the sixth light guide plate inclined surface 428A and the first plane 428D are present. Moreover, an occupied ratio of the first plane 428D is higher than an occupied ratio of the sixth light guide plate inclined surface 428A. When the first LED 13 is turned on and the second LED 24 is turned off, light emitted from the first light guide plate 14 side is incident on the first plane 428D but is hardly refracted. Since an occupied ratio of the first plane 428D is high, side lobe light is less likely to occur when the first LED 13 is turned on and the second LED 24 is turned off.

As described above, according to the present embodiment, the sixth light guide plate lens 428 includes the first plane 428D adjacent to the sixth light guide plate inclined surface 428A in the first direction and disposed along the first direction, and the plurality of sixth light guide plate lenses 428 are disposed side by side in the first direction, and, among three of the sixth light guide plate lenses 428 included in the plurality of sixth light guide plate lenses 428 and aligned continuously in the first direction, the sixth light guide plate inclined surface 428A provided in the sixth light guide plate lens 428 located at the center in the first direction is connected to the first plane 428D provided in the adjacent sixth light guide plate lens 428 on the side opposite to the second LED 24 in the first direction, and the first plane 428D provided in the sixth light guide plate lens 428 located at the center in the first direction is connected to the sixth light guide plate inclined surface 428A provided in the adjacent sixth light guide plate lens 428 on the second LED 24 side in the first direction. The three sixth light guide plate lenses 428 aligned continuously in the first direction are configured such that the sixth light guide plate inclined surface 428A and the first plane 428D that are adjacent to each other are directly connected. Therefore, the plurality of sixth light guide plate lenses 428 do not include an inclined surface having an inclination rising from the second LED 24 in the first direction toward the side opposite to the second LED 24. When the sixth light guide plate lens 428 has an inclined surface having an inclination rising from the second LED 24 in the first direction toward the side opposite to the second LED 24, there is a risk that light emitted from the first light guide plate-light emission main surface 14B of the first light guide plate 14 and incident on the second opposite main surface 425C of the second light guide plate 425 is incident on the inclined surface described above and refracted, and is emitted as side lobe light traveling in the direction inclined to the side opposite to the second LED 24 side in the first direction with respect to the front direction. In this regard, the plurality of sixth light guide plate lenses 428 do not include an inclined surface having an inclination rising from the second LED 24 in the first direction toward the side opposite to the second LED 24, and thus an occurrence of the side lobe light described above can be reduced.

Sixth Embodiment

A sixth embodiment will be described with reference to FIG. 35. In this sixth embodiment, a case where an anisotropy diffuser sheet 31 is used instead of the second louver 30 from the first embodiment described above is indicated. Further, repetitive descriptions of structures, actions, and effects similar to those of the first embodiment described above will be omitted.

Figure 35:
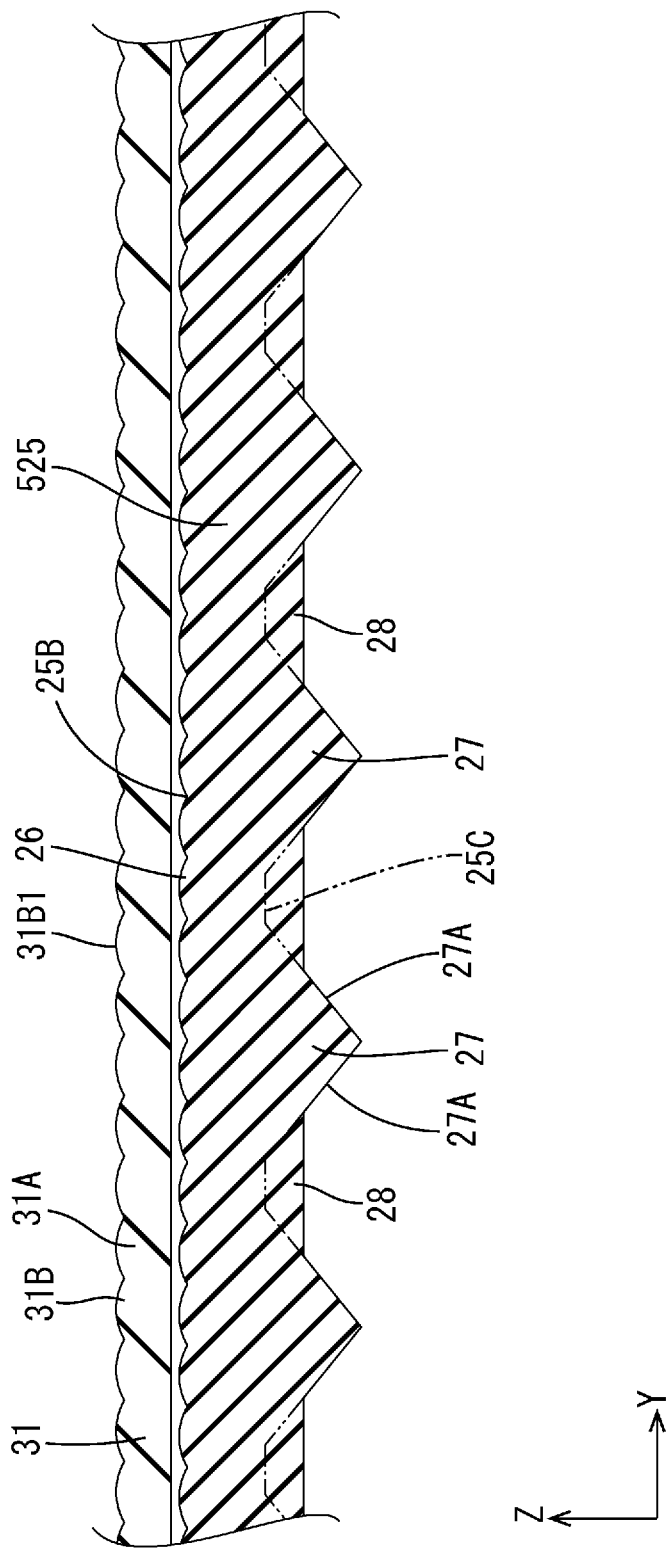
FIG. 35 is a front cross-sectional view of a second light guide plate and an anisotropy diffuser sheet according to a sixth embodiment.

As illustrated in FIG. 35, the anisotropy diffuser sheet 31 instead of the second louver 30 (see FIG. 3) described in the first embodiment is disposed on a front side of a second light guide plate 525 according to the present embodiment. The anisotropy diffuser sheet 31 is a so-called lenticular lens sheet. The anisotropy diffuser sheet 31 includes a base material 31A, and a convex-shaped cylindrical lens 31B that protrudes from a main surface on a front side of the base material 31A. The cylindrical lens 31B has a semi-circular shape in a cross section taken along the Y-axis direction and a semi-cylindrical shape linearly extending along the X-axis direction, and a surface of the cylindrical lens 31B is a third circular arc-shaped face 31B1. A plurality of the cylindrical lenses 31B are disposed side by side along the Y-axis direction in the main surface on the front side of the base material 31A. All the plurality of cylindrical lenses 31B aligned along the Y-axis direction have substantially the same contact angle, substantially the same width dimension (arrangement interval), and substantially the same height dimension. When light incident on the cylindrical lens 31B is incident on the third circular arc-shaped face 31B1 and refracted, the light is raised so as to travel at an angle close to the front direction. The third circular arc-shaped face 31B1 of the cylindrical lens 31B has a curvature in the Y-axis direction and does not have a curvature in the X-axis direction, and can thus selectively exhibit a condensing action (anisotropy condensing action) only in the Y-axis direction. By using such an anisotropy diffuser sheet 31 and adjusting a numerical value of a contact angle of the third circular arc-shaped face 31B1 of the cylindrical lens 31B, an emission angle range in the Y-axis direction of the light can be restricted. In this way, reflection of a display image on a windshield can be suppressed.

Seventh Embodiment

A seventh embodiment will be described with reference to FIG. 36. In this seventh embodiment, a fifth light guide plate lens 627 with a modified configuration from that in the first embodiment described above will be indicated. Further, repetitive descriptions of structures, actions, and effects similar to those of the first embodiment described above will be omitted.

Figure 36:
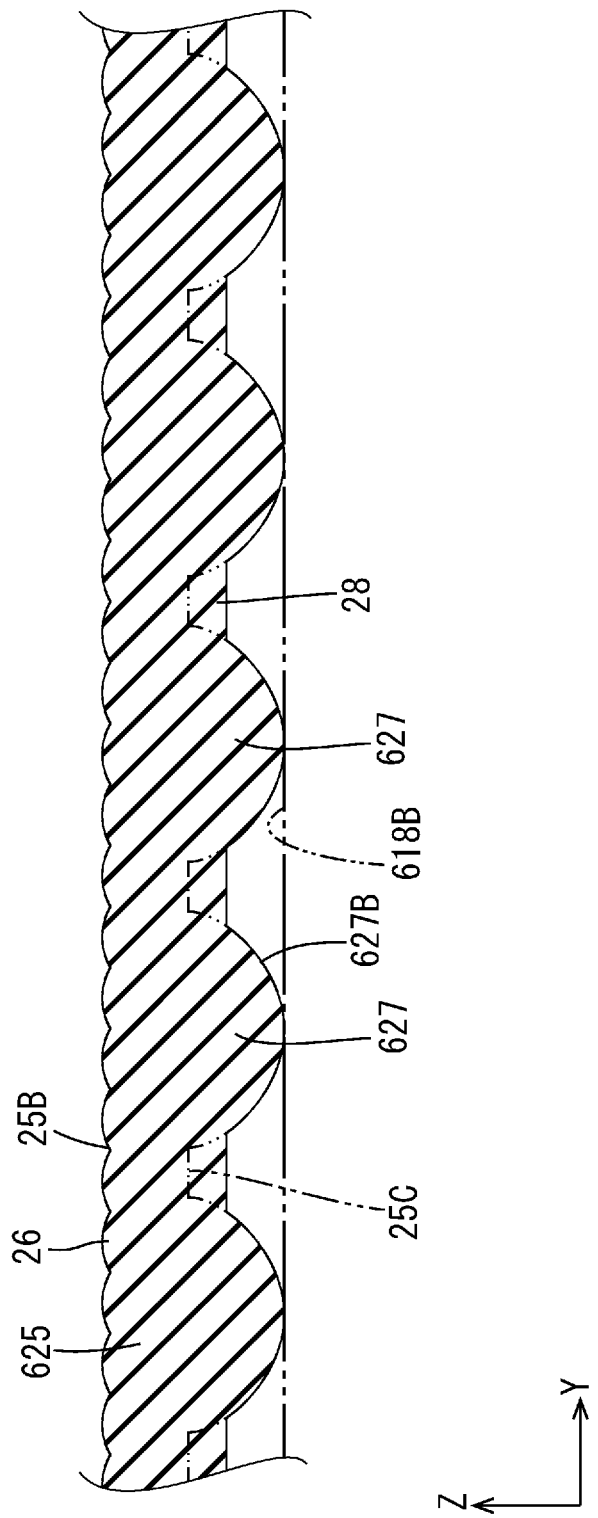
FIG. 36 is a front cross-sectional view of a second light guide plate according to a seventh embodiment.

As illustrated in FIG. 36, the fifth light guide plate lens 627 according to the present embodiment is a so-called lenticular lens. The fifth light guide plate lens 627 has a semi-circular shape in a cross section taken along the Y-axis direction and a semi-cylindrical shape linearly extending along the X-axis direction, and a surface of the fifth light guide plate lens 627 is a fourth circular arc-shaped face 627B. Even with the fifth light guide plate lens 627 having such a configuration, actions and effects similar to those in the above-described first embodiment can be obtained. In addition, in comparison with the first embodiment, the fourth circular arc-shaped face 627B of the fifth light guide plate lens 627 has a larger contact area with a first light emission main surface 618B (indicated by a two-dot chain line in FIG. 36) of a first louver 18 disposed on the back side. In this way, adhesion unevenness between a second light guide plate 625 and the first louver 18 is less likely to occur, and thus brightness unevenness is less likely to occur in emission light.

OTHER EMBODIMENTS

The techniques disclosed in the present specification are not limited to the embodiments described above and illustrated in the drawings, and the following embodiments, for example, are also included within the technical scope.

(1) Each numerical value related to the sixth light guide plate lenses 28, 228, 328, and 428 provided in the second light guide plates 25, 125, 225, 325, 425, and 625 can be changed as appropriate. For example, the angle θ2 formed by the sixth light guide plate inclined surfaces 28A, 228A, 328A, and 428A with respect to the X-axis direction is preferably changed in a range from 27° to 40°, but may be changed outside the range. Further, the width dimension W2 of the sixth light guide plate inclined surfaces 28A, 228A, 328A, and 428A can also be set constant regardless of a position in the X-axis direction. The angle θ3 formed by the seventh light guide plate inclined surface 28B with respect to the X-axis direction is preferably changed in a range from 3° to 10°, but may be changed outside the range. The width dimension W3 of the seventh light guide plate inclined surface 28B can also be set constant regardless of a position in the X-axis direction. The width dimensions W4 and W5 of the first planes 28D and 428D and the second plane 29 of the sixth light guide plate lenses 28, 228, 328, and 428 may have a numerical value other than the numerical value indicated in the first embodiment. Further, the arrangement pitch P1 of the sixth light guide plate lenses 28, 228, 328, and 428 can also be changed according to a position in the X-axis direction.

(2) The width dimension W4 of the first planes 28D and 428D provided in the sixth light guide plate lenses 28, 228, 328, and 428 can also be changed according to a position in the X-axis direction. Further, the width dimension W5 of the second plane 29 can also be set constant regardless of a position in the X-axis direction.

(3) A specific numerical value such as the contact angle θc of the fourth light guide plate lens 26 provided in the second light guide plates 25, 125, 225, 325, 425, and 625 and the apex angle θ1 of the fifth light guide plate lenses 27, 227, and 627 can be changed as appropriate.

(4) A specific material used in the second light guide plates 25, 125, 225, 325, 425, and 625 can be changed as appropriate.

(5) A specific numerical value such as the contact angle and the inclination angle of each of the light guide plate lenses 21 to 23 provided in the first light guide plate 14 can be changed as appropriate. A specific material used in the first light guide plate 14 can be changed as appropriate.

(6) A positional relationship between the second light guide plates 25, 125, 225, 325, 425, and 625 and the second LED 24 in the X-axis direction may be the same as a positional relationship between the first light guide plate 14 and the first LEDs 13 and 113 in the X-axis direction. In other words, the first LEDs 13 and 113 and the second LED 24 may be disposed on the same side in the X-axis direction.

(7) Any one or both of the first light guide plate lens 21 and the second light guide plate lens 22 provided in the first light guide plate 14 can also be omitted.

(8) Any one or both of the fourth light guide plate lens 26 and the fifth light guide plate lenses 27, 227, and 627 provided in the second light guide plates 25, 125, 225, 325, 425, and 625 can also be omitted.

(9) A thickness of the first light guide plate 14 may be configured to decrease while going away from the first LEDs 13 and 113, and the first opposite main surface 14C may be configured to be inclined.

(10) A thickness of the second light guide plates 25, 125, 225, 325, 425, and 625 may be configured to decrease while going away from the second LED 24, and the second opposite main surfaces 25C, 125C, 225C, and 425C may be configured to be inclined.

(11) A specific numerical value such as the inclination angle and the apex angle of each of the prism inclined surfaces 16B1, 16B2, 17B1, and 17B2 of each of the prisms 16B and 17B provided in each of the prism sheets 16 and 17 can be changed as appropriate. A specific material used in each of the base materials 16A and 17A of each of the prism sheets 16 and 17 can be changed as appropriate. Similarly, a specific material used in each of the prisms 16B and 17B can also be changed as appropriate.

(12) A specific cross-sectional shape of each of the prisms 16B and 17B provided in each of the prism sheets 16 and 17 can be changed as appropriate. In that case, for example, any of the prism inclined surfaces 16B1, 16B2, 17B1, and 17B2 in each of the prisms 16B and 17B may have a bent shape so as to have a plurality of inclination angles.

(13) In the first louvers 18 and 118, a specific numerical value of a ratio (tan θ) acquired by dividing a width of the first light-transmitting portion 18D by a height can be changed as appropriate in addition to tan 10°, and can be, for example, tan 12.5°, tan 15°, tan 17.5°, and the like.

(14) In the configuration described in the second embodiment, the third light entering main surface 19A of the linear Fresnel lens sheet 19 may be attached in contact with the first light emission main surface 118B of the first louver 118. In that case, the linear Fresnel lens sheet 19 can also be molded integrally with the first louver 118.

(15) In the configuration described in the second embodiment, the linear Fresnel lens sheet 19 can have a reversed configuration. In other words, the linear Fresnel lens 19C may be provided on the third light entering main surface 19A of the linear Fresnel lens sheet 19.

(16) In the configuration described in (15) described above, the third light emission main surface 19B of the linear Fresnel lens sheet 19 may be attached in contact with the fourth light entering main surface 20A of the third louver 20. In that case, the linear Fresnel lens sheet 19 can also be molded integrally with the third louver 20.

(17) In the configuration described in the second embodiment, the plurality of linear Fresnel lenses 19C provided in the linear Fresnel lens sheet 19 may include the plurality of linear Fresnel lenses 19C in which the angle θ10 of the first inclined surface 19C1 with respect to the X-axis direction (angle θ11 of the second inclined surface 19C2 with respect to the X-axis direction) is the same. In other words, the angle θ10 of the first inclined surface 19C1 with respect to the X-axis direction (angle θ11 of the second inclined surface 19C2 with respect to the X-axis direction) may not be different in all the linear Fresnel lenses 19C.

(18) In the configuration described in the second embodiment, a specific numerical value of each angle (the angle θ10 of the first inclined surface 19C1 with respect to the X-axis direction, the angle θ11 of the second inclined surface 19C2 with respect to the X-axis direction, and the apex angle θ12 formed between the first inclined surface 19C1 and the second inclined surface 19C2) in the linear Fresnel lens 19C provided in the linear Fresnel lens sheet 19 can be changed as appropriate. In that case, the angle θ10 of the first inclined surface 19C1 with respect to the X-axis direction is preferably in a range from 0° to 24°, and the angle θ11 of the second inclined surface 19C2 with respect to the X-axis direction is preferably in a range from 46° to 70°, but may fall outside these ranges. Further, when the angle θ10 of the first inclined surface 19C1 with respect to the X-axis direction is in the range from 0° to 24° and the angle θ11 of the second inclined surface 19C2 with respect to the X-axis direction is in the range from 46° to 70°, a numerical value of the apex angle θ12 formed between the first inclined surface 19C1 and the second inclined surface 19C2 can be set to be a numerical value (for example, 80°, 90°, 100°, 120°, and the like) other than 110°. Further, when the angle θ10 of the first inclined surface 19C1 with respect to the X-axis direction is outside the range from 0° to 24° and the angle θ11 of the second inclined surface 19C2 with respect to the X-axis direction is outside the range from 46° to 70°, a numerical value of the apex angle θ12 formed between the first inclined surface 19C1 and the second inclined surface 19C2 can be set to be a numerical value (for example, 80°, 90°, 100°, 120°, and the like) other than 110°. Further, a specific material used in the linear Fresnel lens sheet 19 can be changed as appropriate.

(19) In the configuration described in the second embodiment, in the third louver 20, a specific numerical value of a ratio (tan θ) acquired by dividing a width of the third light-transmitting portion 20D by a height can be changed as appropriate in addition to tan 45°, and can be, for example, tan 50°, and the like.

(20) The configuration described in the second embodiment can also be combined with the configurations described in the third embodiment to the seventh embodiment.

(21) In the configuration described in the third embodiment, a specific rate of change and the like at which a width dimension of the central side fifth light guide plate lens 227C (central side sixth light guide plate lens 228C) and a width dimension of the end side fifth light guide plate lens 227E (end side sixth light guide plate lens 228E) change according to a position in the Y-axis direction can be changed as appropriate in addition to the data illustrated in FIG. 27.

(22) In the configuration described in the fourth embodiment, the specific arrangement of the two types of sixth light guide plate lenses 328 can be changed as appropriate. For example, the plurality of one of the sixth light guide plate lenses 328α and the plurality of the other of the sixth light guide plate lenses 328β may be alternately disposed side by side in an order in which the plurality of one of the sixth light guide plate lenses 328α are continuously disposed and then the plurality of the other of the sixth light guide plate lenses 328β are continuously disposed.

(23) In the configuration described in the fourth embodiment, a specific numerical value of the angle θ2α formed by the gentle inclined surface 328Aα of the one sixth light guide plate lens 328α with respect to the X-axis direction and the angle θ2β formed by the steep inclined surface 328Aβ of the other sixth light guide plate lens 328β with respect to the X-axis direction can be changed as appropriate in addition to the numerical value described above.

(24) The configuration described in the fifth embodiment can also be combined with the configuration described in the fourth embodiment.

(25) The cylindrical lens 31B provided in the anisotropy diffuser sheet 31 described in the sixth embodiment may be configured to extend in a serpentine manner along the X-axis direction.

(26) The second louver 30 and the anisotropy diffuser sheet 31 can also be removed.

(27) A light source such as an organic electro luminescence (EL) may be used instead of the first LEDs 13 and 113 and the second LED 24.

(28) A reflective polarizing sheet instead of a polarizer may be attached to the main surface on the back side (outer side) of the array substrate constituting the liquid crystal panel 11. The reflective polarizing sheet includes a polarization layer having a specific polarization axis (transmission axis), a multilayer film in which layers having mutually different refractive indices are alternately layered, a protection layer, and the like. The polarization layer has a polarization axis and an absorption axis orthogonal to the polarization axis, so that linearly polarized light parallel to the polarization axis can be selectively transmitted and circularly polarized light can be converted to linearly polarized light along the polarization axis. The polarization axis of the polarization layer has an orthogonal relationship to the polarization axis of the polarizer attached to the main surface at the outer side of the CF substrate. The multilayer film has a multilayer structure, and has a reflection characteristic that the reflectivity for the s-waves included in light is generally higher than the reflectivity for the p-waves. The reflective polarizing sheet being provided with the multilayer film can reflect s-waves that are originally to be absorbed by the polarization layer toward the back side to allow the s-waves to be reused, thereby enhancing the usage efficiency (and then, brightness) of light.

(29) Instead of the first prism sheets 16 and 116 and the second prism sheet 17, a prism sheet with a prism provided on the light entering main surface side can also be used. The prism sheet has a configuration in which the light entering main surface faces the first light guide plate-light emission main surface 14B of the first light guide plate 14, the light emission main surface is disposed so as to face the first light entering main surface 18A of the first louvers 18 and 118, and a plurality of prisms are provided side by side along the X-axis direction on the light entering main surface. Even when such a prism sheet is used, light having less side lobe light can be supplied to the first louvers 18 and 118, and the amount of transmitted light of the first light-transmitting portion 18D can be sufficiently ensured.

(30) The liquid crystal display devices 10 and 110 for vehicle application may be installed in a position other than the front of a passenger seat of a passenger vehicle. For example, the liquid crystal display devices 10 and 110 may be installed in a position between a passenger seat and a driver seat, and the like. An angle range of a required viewing angle is also changed due to a change in an arrangement of the liquid crystal display devices 10 and 110. Accordingly, each configuration (such as a ratio between a width and a height of each of the light-transmitting portions 18D and 30D, and an inclination angle of each of the inclined surfaces 28A and 28B of the sixth light guide plate lenses 28, 228, 328, and 428) of the first louvers 18 and 118, the third louver 20, the sixth light guide plate lenses 28, 228, 328, and 428, and the like may be changed. Further, in the configuration described in the second embodiment, in addition to the configuration above, each configuration (such as a ratio between a width and a height of the third light-transmitting portion 20D, and an inclination angle of each of the inclined surfaces 19C1 and 19C2 of the linear Fresnel lens 19C) of the linear Fresnel lens sheet 19 and the third louver 20 may be changed.

(31) The liquid crystal display devices 10 and 110 can, in addition to vehicle application, also be used in devices that require restricting a viewing angle, such as automatic teller machines (ATMs), notebook computers, and tablet computers, for example. When an application of the liquid crystal display devices 10 and 110 is changed, an angle range of a required viewing angle is also changed. Accordingly, each configuration (such as a ratio between a width and a height of each of the light-transmitting portions 18D and 30D, and an inclination angle of each of the inclined surfaces 28A and 28B of the sixth light guide plate lenses 28, 228, 328, and 428) of the first louvers 18 and 118, the third louver 20, the sixth light guide plate lenses 28, 228, 328, and 428, and the like may be changed. Further, in the configuration described in the second embodiment, in addition to the configuration above, each configuration (such as a ratio between a width and a height of the light-transmitting portion 20D, and an inclination angle of each of the inclined surfaces 19C1 and 19C2 of the linear Fresnel lens 19C) of the linear Fresnel lens sheet 19 and the third louver 20 may be changed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An illumination device comprising:
a first light source;
a first light guide plate including at least a part of an outer circumferential end face as a first end face configured to face the first light source and receive incident light, one main surface as a first main surface configured to emit light, and another main surface as a second main surface;
a first sheet one main surface as a third main surface configured to face the first main surface and receive incident light, and another main surface as a fourth main surface configured to emit light;
a second light source; and
a second light guide plate including at least a part of an outer circumferential end face as a second end face configured to face the second light source and receive incident light, one main surface as a fifth main surface configured to emit light, and another main surface as a sixth main surface configured to face the fourth main surface,
wherein the first sheet further includes at least two first light blocking portions and a first light-transmitting portion, the at least two first light blocking portions being disposed at an interval in a first direction including a direction from the first light source toward the first light guide plate and being configured to block light, and the first light-transmitting portion being disposed between the at least two first light blocking portions and being configured to transmit light,
the sixth main surface of the second light guide plate is provided with a first lens including a first inclined surface having an inclination rising from a side opposite the second light source in the first direction toward a second light source side, the sixth main surface of the second light guide plate is further provided with a plurality of third lenses disposed side by side at an interval along a second direction orthogonal to both of the first direction and a normal direction of the first main surface of the first light guide plate, the plurality of third lenses extending along the first direction, and a plurality of first lenses, including the first lens, is disposed in an alternating manner with the plurality of third lenses in the second direction.

2. The illumination device according to claim 1, wherein the first inclined surface has an angle formed with respect to the first direction in a range from 27° to 40°.

3. The illumination device according to claim 1, wherein the first lens further includes a second inclined surface having an inclination rising from the second light source in the first direction toward the side opposite the second light source.

4. The illumination device according to claim 3, wherein the second inclined surface has an angle formed with respect to the first direction in a range from 3° to 10°.

5. The illumination device according to claim 3, wherein the first lens further includes a first plane located between the first inclined surface and the second inclined surface in the first direction and disposed along the first direction.

6. The illumination device according to claim 3, wherein the plurality of first lenses is further disposed side by side in the first direction, and the sixth main surface of the second light guide plate is further provided with a second plane located between two of the plurality of first lenses adjacent to each other in the first direction and disposed along the first direction.

7. The illumination device according to claim 1, wherein the first lens further includes a first plane adjacent to the first inclined surface in the first direction and disposed along the first direction, and the plurality of first lenses is further disposed side by side in the first direction, and among three first lenses included in the plurality of first lenses and aligned continuously in the first direction, the first inclined surface provided in the first lens located at a center in the first direction is connected to the first plane provided in an adjacent first lens on the side opposite the second light source in the first direction, and the first plane provided in the first lens located at the center in the first direction is connected to the first inclined surface provided in another adjacent first lens on the second light source side in the first direction.

8. The illumination device according to claim 1, wherein the plurality of third lenses includes a central side third lens and an end side third lens located closer to an end side in the second direction in the sixth main surface than the central side third lens, the plurality of first lenses further includes a central side first lens and an end side first lens located closer to the end side in the second direction in the sixth main surface than the central side first lens, a dimension of the end side third lens in the second direction is smaller than a dimension of the central side third lens in the second direction, and a dimension of the end side first lens in the second direction is greater than a dimension of the central side first lens in the second direction.

9. The illumination device according to claim 1, further comprising:

a first prism sheet one main surface facing the first main surface, and a plurality of first prisms disposed side by side along the first direction and configured to extend along the second direction; and a second prism sheet located on a side opposite the first light guide plate with respect to the first prism sheet, the second prism sheet including a plurality of second prisms disposed side by side along the first direction and configured to extend along the second direction, wherein each of the plurality of first prisms includes a third inclined surface having an inclination rising from a first light source side in the first direction in the first prism sheet toward a side opposite the first light source, and a fourth inclined surface having an inclination rising from the side opposite the first light source in the first direction in the first prism sheet toward the first light source side, each of the plurality of second prisms includes a fifth inclined surface having an inclination rising from the first light source side in the first direction in the second prism sheet toward the side opposite the first light source, and a sixth inclined surface having an inclination rising from the side opposite the first light source in the first direction in the second prism sheet toward the first light source side, and an angle formed by the fifth inclined surface in the second prism with respect to the first direction is smaller than an angle formed by the third inclined surface in the first prism with respect to the first direction.

10. The illumination device according to claim 1, further comprising:

a second sheet one main surface as a seventh main surface configured to face the fourth main surface and receive incident light, and another main surface as an eighth main surface configured to emit light; and a third sheet one main surface as a ninth main surface configured to face the eighth main surface and receive incident light, and another main surface as a tenth main surface configured to face the sixth main surface and emit light, wherein the second sheet further includes a fourth lens disposed on the seventh main surface or the eighth main surface, the third sheet further includes at least two second light blocking portions and a second light-transmitting portion, the at least two second light blocking portions being disposed at an interval in the first direction and being configured to block light, and the second light-transmitting portion being disposed between the at least two second light blocking portions and being configured to transmit light, the fourth lens includes a seventh inclined surface having an inclination rising from an end side in the first direction in the second sheet toward a central side, and the third sheet has a ratio, acquired by dividing a width of the second light-transmitting portion by a height of the second light-transmitting portion, being greater than a ratio acquired by dividing a width of the first light-transmitting portion by a height of the first light-transmitting portion.

11. The illumination device according to claim 1,
wherein the first light source is disposed on one side in the first direction with respect to the first light guide plate, and
the second light source is disposed on another side in the first direction with respect to the second light guide plate.

12. A display device comprising:
the illumination device according to claim 1; and
a display panel configured to perform display by using light emitted from the illumination device.

13. An illumination device comprising:
a first light source;
a first light guide plate including at least a part of an outer circumferential end face as a first end face configured to face the first light source and receive incident light, one main surface as a first main surface configured to emit light, and another main surface as a second main surface;
a first sheet one main surface as a third main surface configured to face the first main surface and receive incident light, and another main surface as a fourth main surface configured to emit light;
a second light source; and
a second light guide plate including at least a part of an outer circumferential end face as a second end face configured to face the second light source and receive incident light, one main surface as a fifth main surface configured to emit light, and another main surface as a sixth main surface configured to face the fourth main surface,
wherein the first sheet further includes at least two first light blocking portions and a first light-transmitting portion, the at least two first light blocking portions being disposed at an interval in a first direction including a direction from the first light source toward the first light guide plate and being configured to block light, and the first light-transmitting portion being disposed between the at least two first light blocking portions and being configured to transmit light,
the sixth main surface of the second light guide plate is provided with a first lens including a first inclined surface having an inclination rising from a side opposite the second light source in the first direction toward a second light source side, and
the fifth main surface of the second light guide plate is provided with a plurality of second lenses disposed side by side along a second direction orthogonal to both of the first direction and a normal direction of the first main surface of the first light guide plate, the plurality of second lenses extending along the first direction.

14. An illumination device according to claim 1, comprising:
a first light source;
a first light guide plate including at least a part of an outer circumferential end face as a first end face configured to face the first light source and receive incident light, one main surface as a first main surface configured to emit light, and another main surface as a second main surface;
a first sheet one main surface as a third main surface configured to face the first main surface and receive incident light, and another main surface as a fourth main surface configured to emit light;
a second light source; and
a second light guide plate including at least a part of an outer circumferential end face as a second end face configured to face the second light source and receive incident light, one main surface as a fifth main surface configured to emit light, and another main surface as a sixth main surface configured to face the fourth main surface,
wherein the first sheet further includes at least two first light blocking portions and a first light-transmitting portion, the at least two first light blocking portions being disposed at an interval in a first direction including a direction from the first light source toward the first light guide plate and being configured to block light, and the first light-transmitting portion being disposed between the at least two first light blocking portions and being configured to transmit light,
the sixth main surface of the second light guide plate is provided with a first lens including a first inclined surface having an inclination rising from a side opposite the second light source in the first direction toward a second light source side,
a plurality of first lenses, including the first lens, is disposed side by side in the first direction, and
the plurality of first lenses further includes one first lens including a gentle inclined surface as the first inclined surface, and another first lens including, as the first inclined surface, a steep inclined surface having an angle with respect to the first direction greater than an angle of the gentle inclined surface.

* * * * *